INVENTORS
EDWARD R. THOMAS
EDGAR H. SONNANSTINE JR. &
EDWARD J. CAREY
BY Louis A. Kline
John J. Callahan
THEIR ATTORNEYS July 31, 1962 E. R. THOMAS ETAL 3,047,227
MULTIPLIER APPARATUS
Filed Aug. 3, 1959

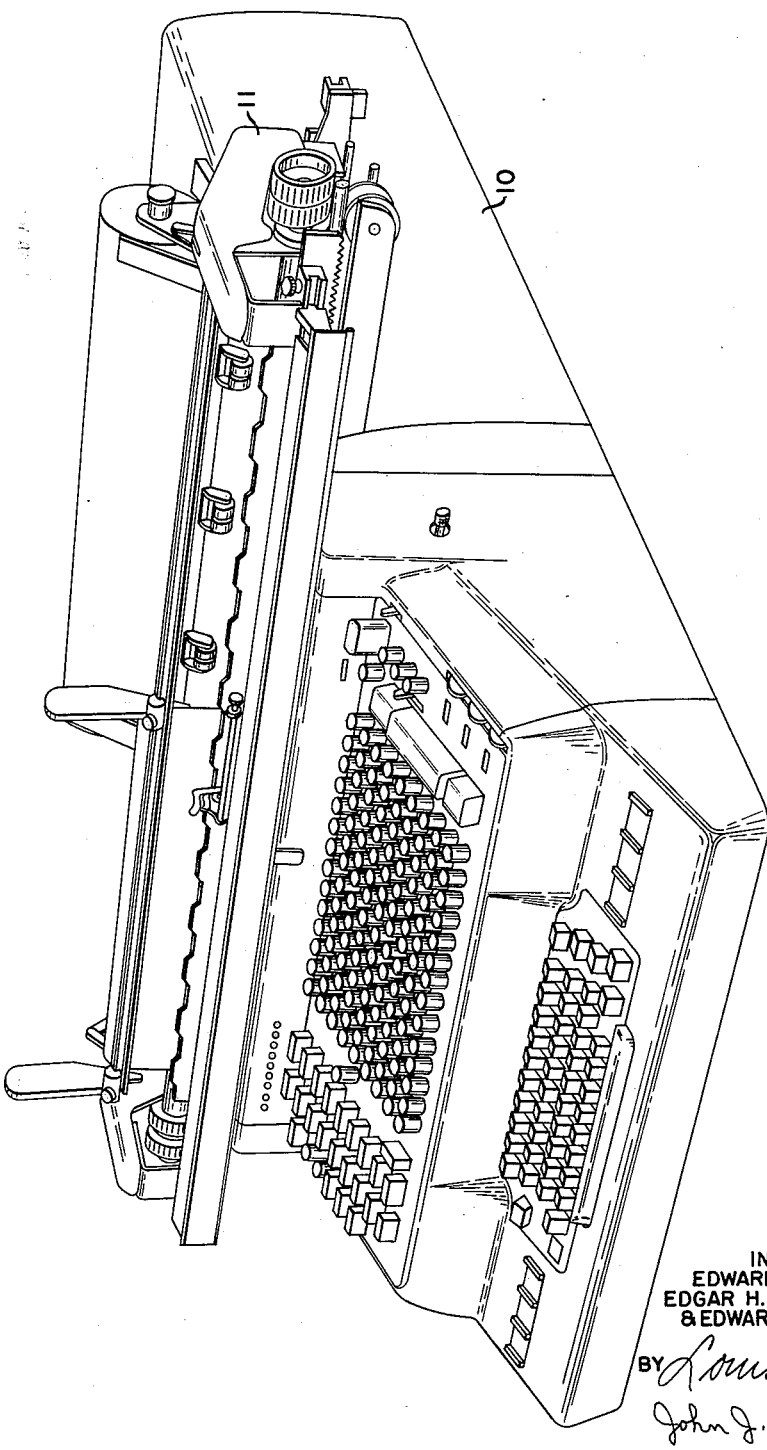

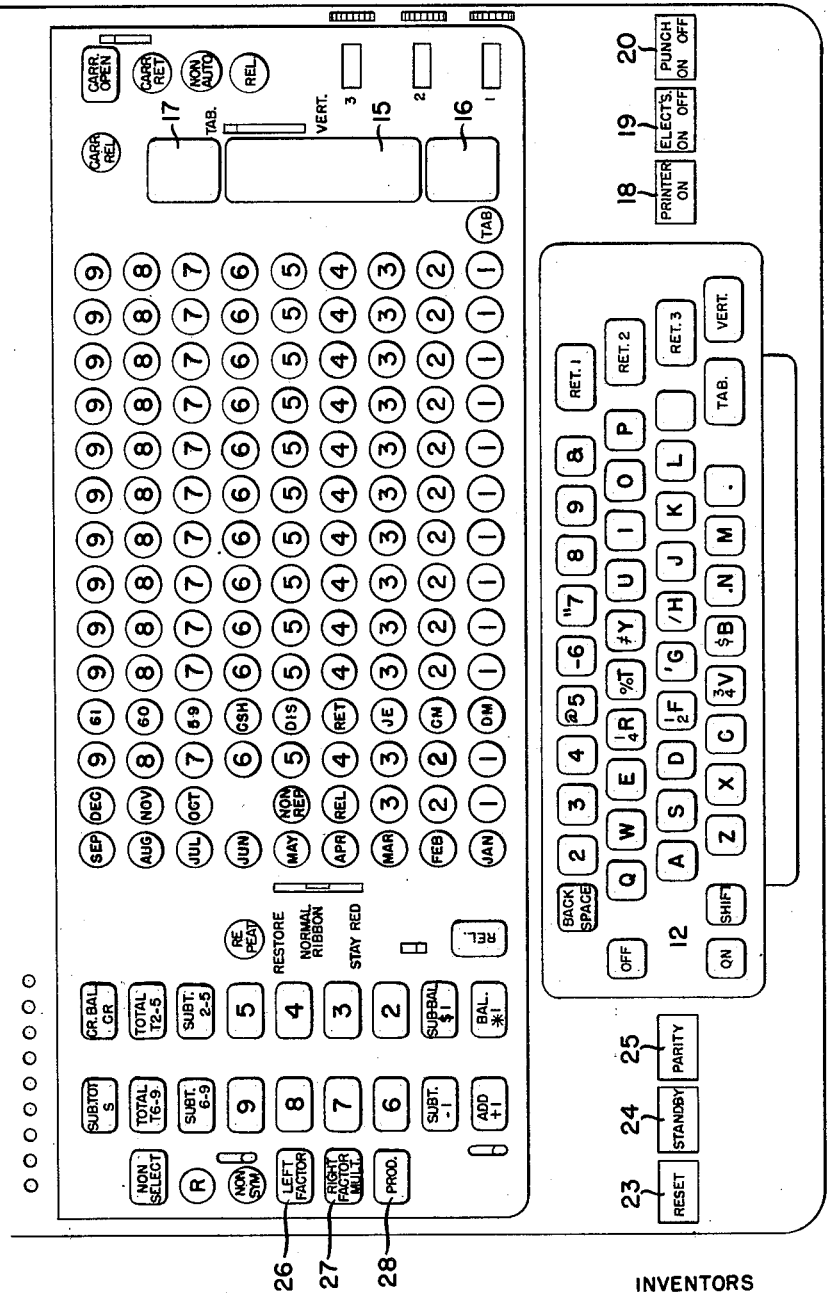

INVENTORS
EDWARD R. THOMAS
EDGAR H. SONNANSTINE JR. &
EDWARD J. CAREY
BY Louis A. Kline
John J. Callahan
THEIR ATTORNEYS

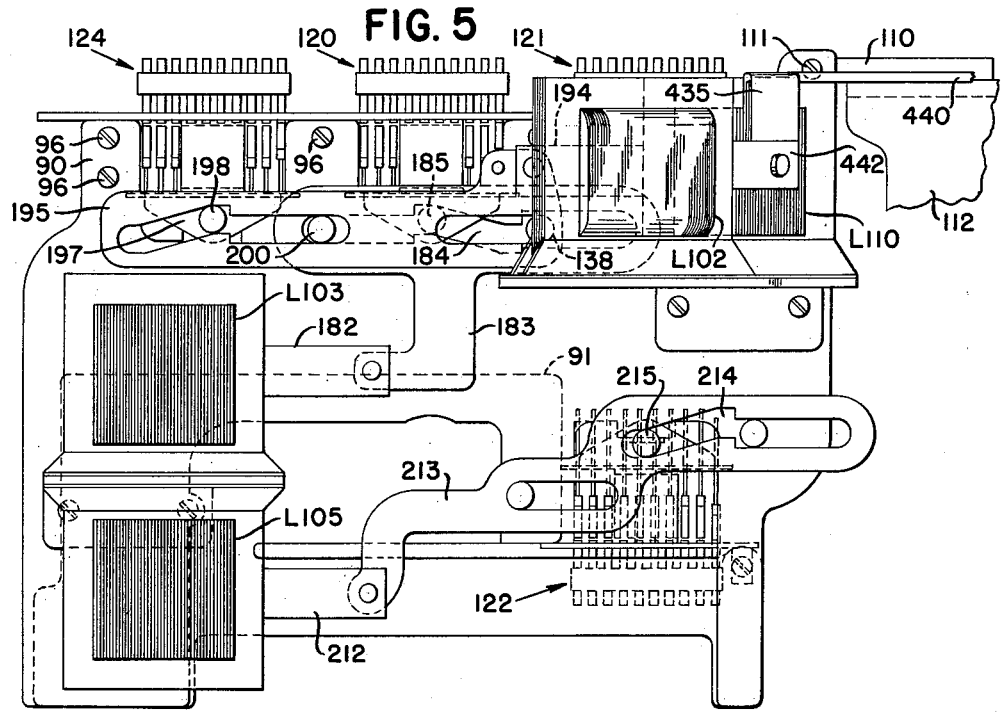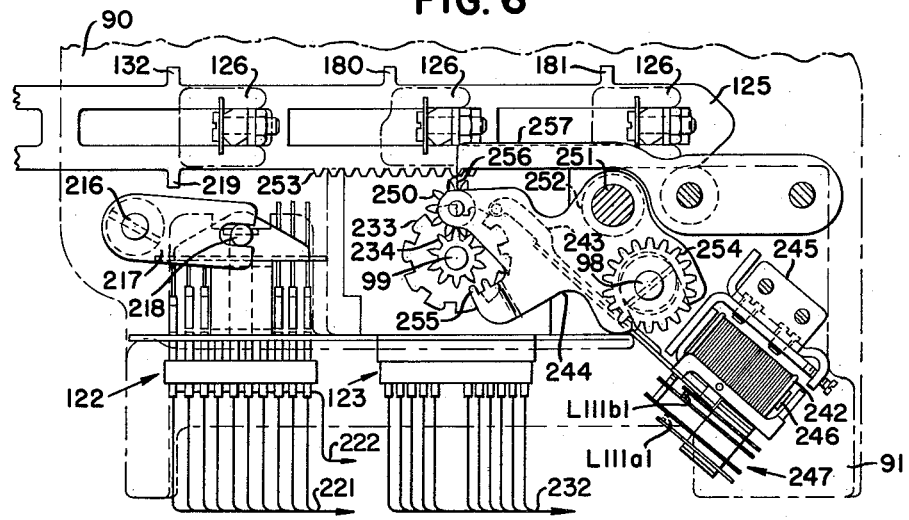

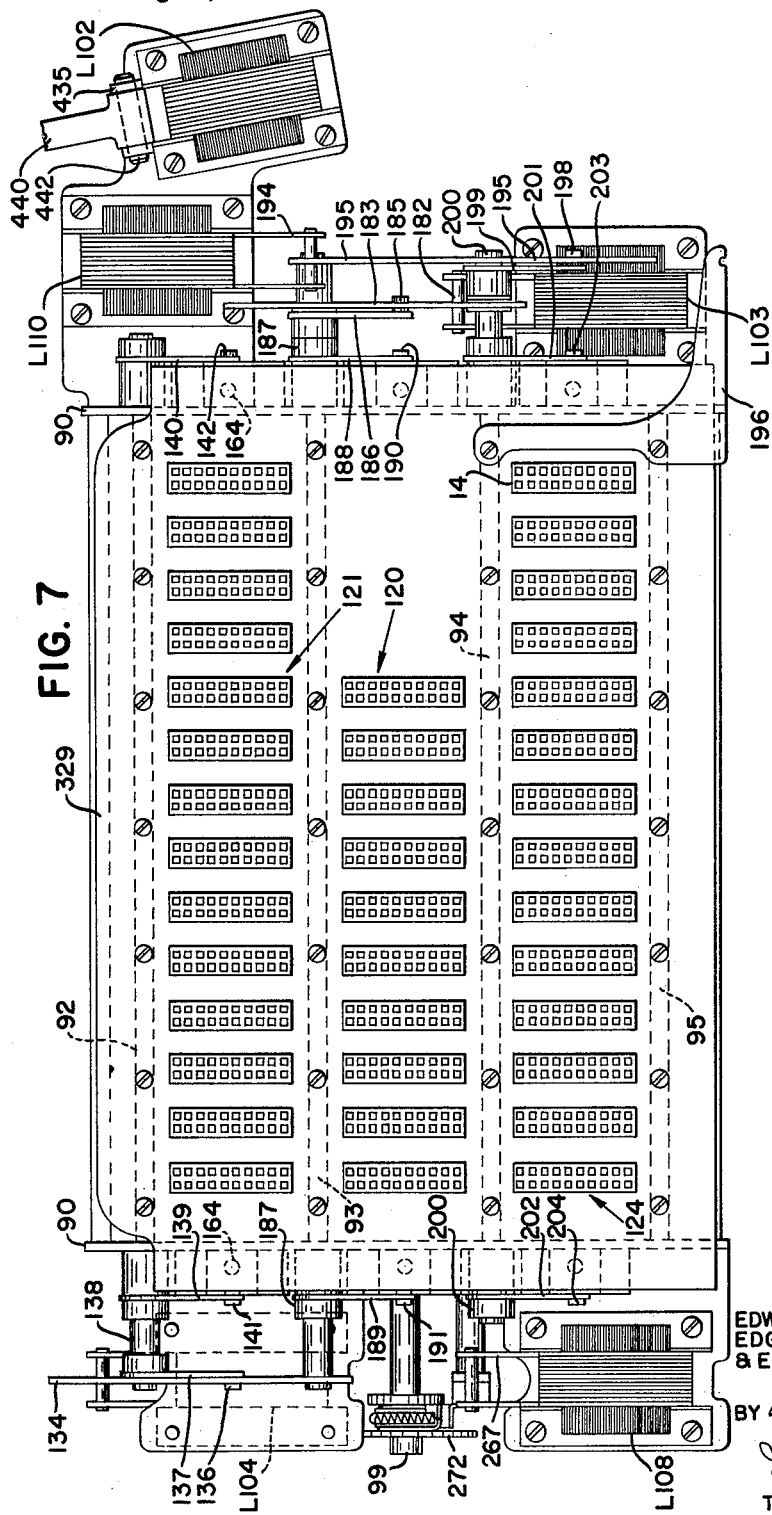

July 31, 1962  E. R. THOMAS ETAL  3,047,227
MULTIPLIER APPARATUS
Filed Aug. 3, 1959  34 Sheets-Sheet 8

INVENTORS
EDWARD R. THOMAS
EDGAR H. SONNANSTINE JR. &
EDWARD J. CAREY

BY *Louis A. Kline*
*John J. Callahan*
THEIR ATTORNEYS

July 31, 1962 E. R. THOMAS ETAL 3,047,227
MULTIPLIER APPARATUS
Filed Aug. 3, 1959 34 Sheets-Sheet 9

INVENTORS
EDWARD R. THOMAS
EDGAR H. SONNANSTINE JR. &
EDWARD J. CAREY

BY Louis A. Kline
John J. Callahan
THEIR ATTORNEYS

July 31, 1962 E. R. THOMAS ETAL 3,047,227
MULTIPLIER APPARATUS
Filed Aug. 3, 1959 34 Sheets-Sheet 11

INVENTORS
EDWARD R. THOMAS
EDGAR H. SONNANSTINE JR. &
EDWARD J. CAREY

BY Louis A. Kline
John J. Callahan
THEIR ATTORNEYS

July 31, 1962  E. R. THOMAS ETAL  3,047,227
MULTIPLIER APPARATUS
Filed Aug. 3, 1959  34 Sheets-Sheet 12

INVENTORS
EDWARD R. THOMAS
EDGAR H. SONNANSTINE JR. &
EDWARD J. CAREY

BY *Louis A. Kline*
*John J. Callahan*

THEIR ATTORNEYS

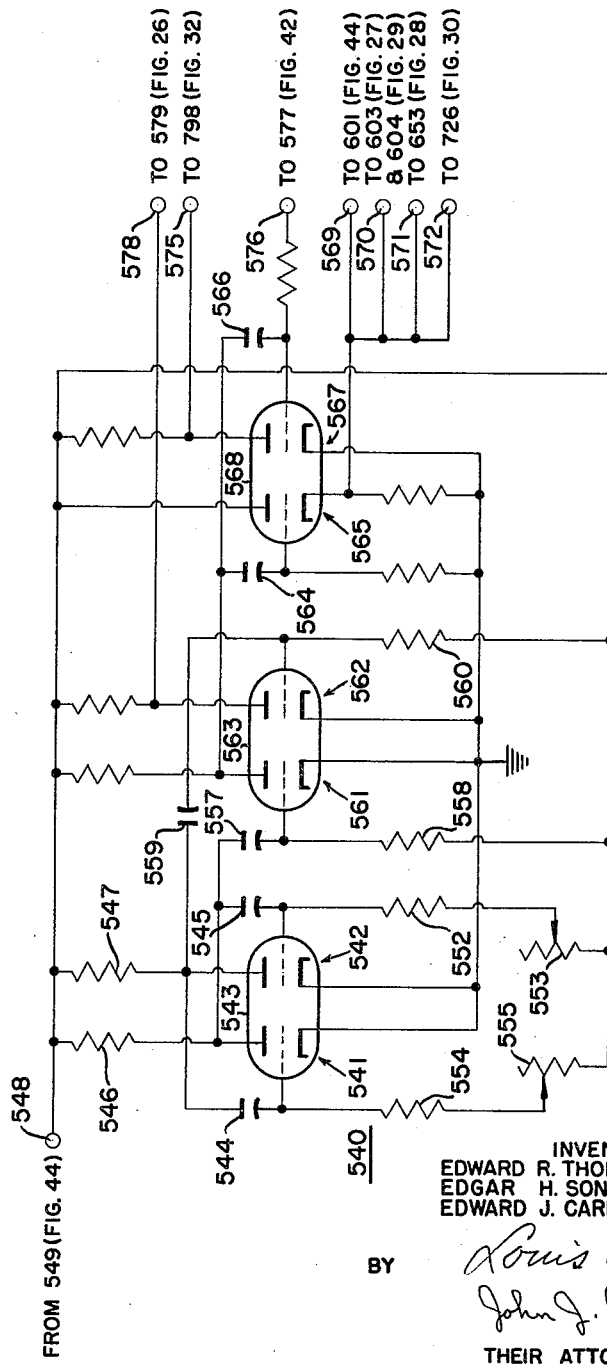

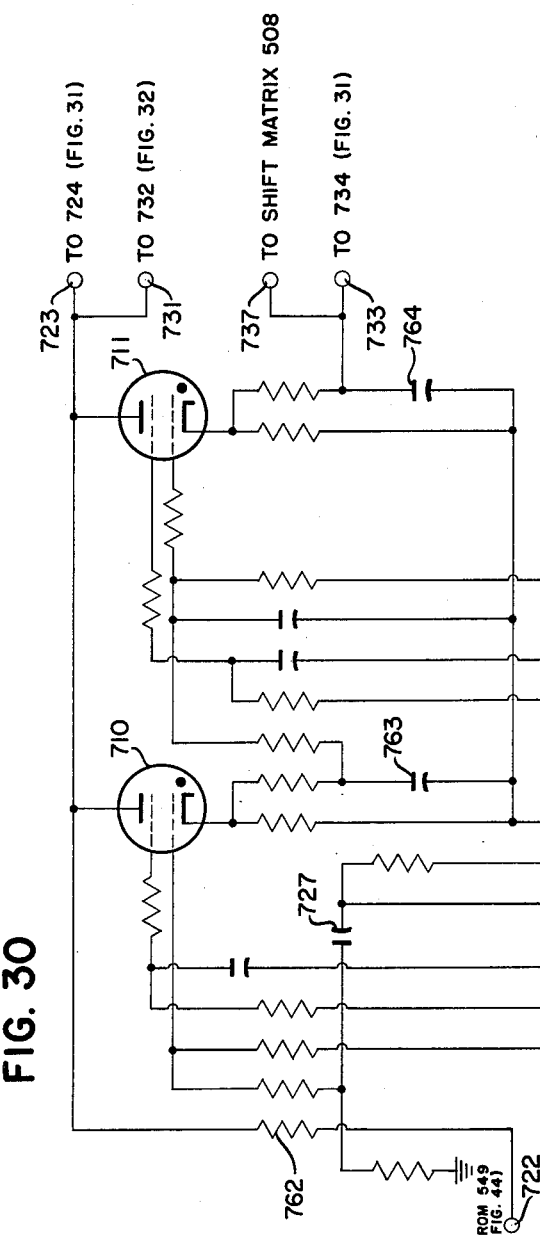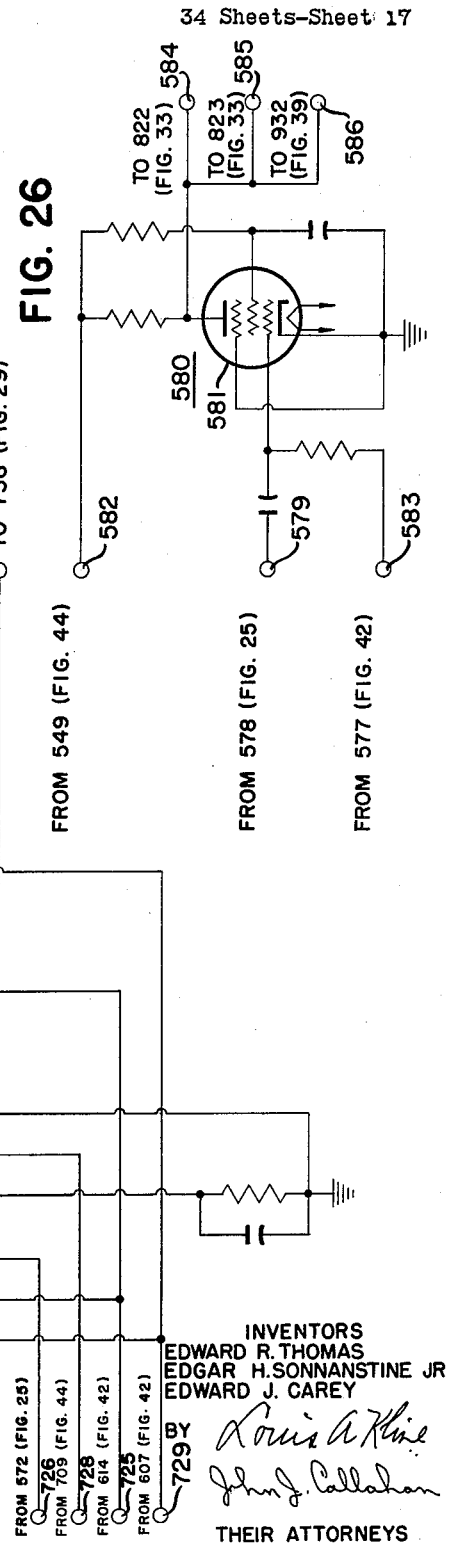

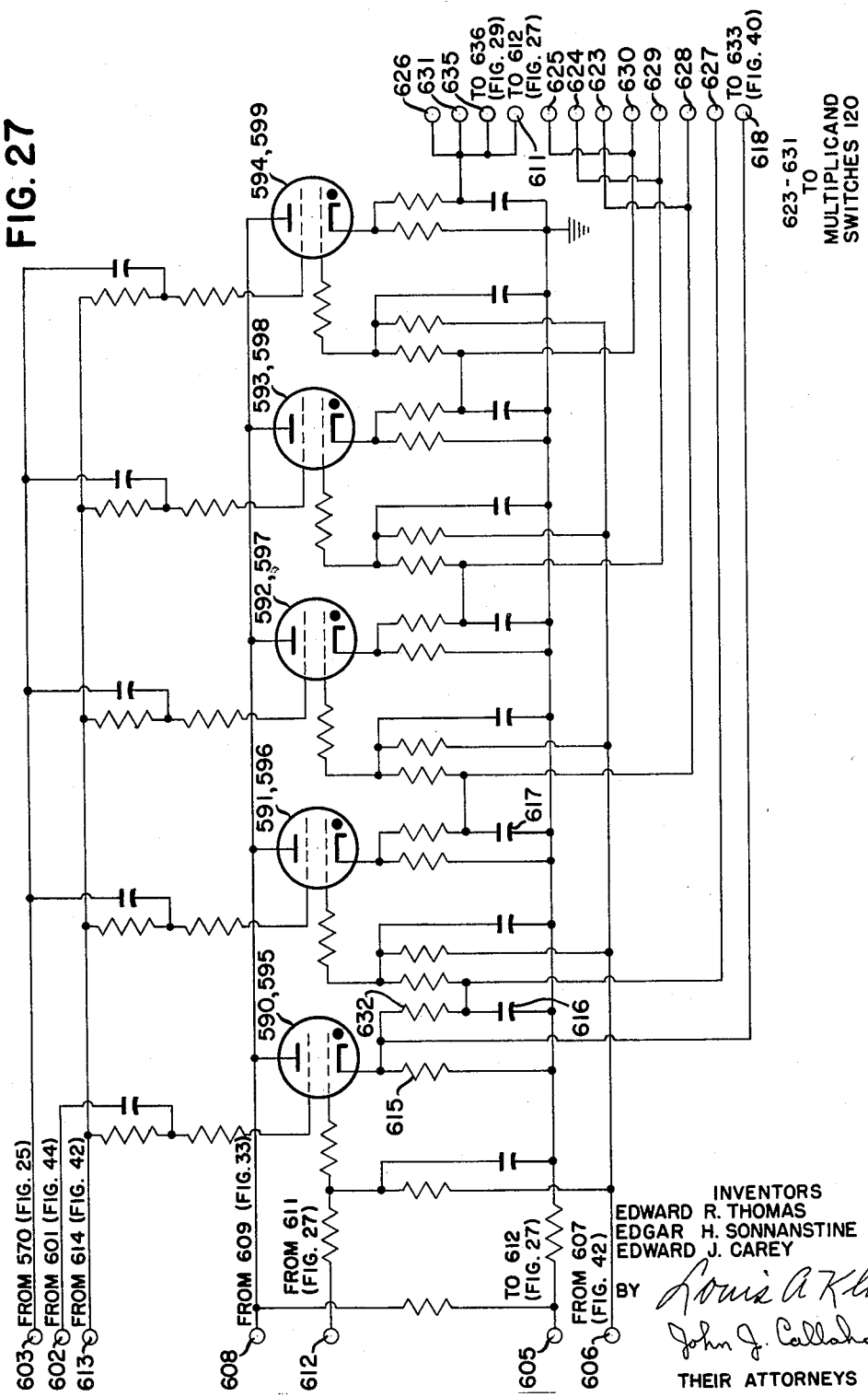

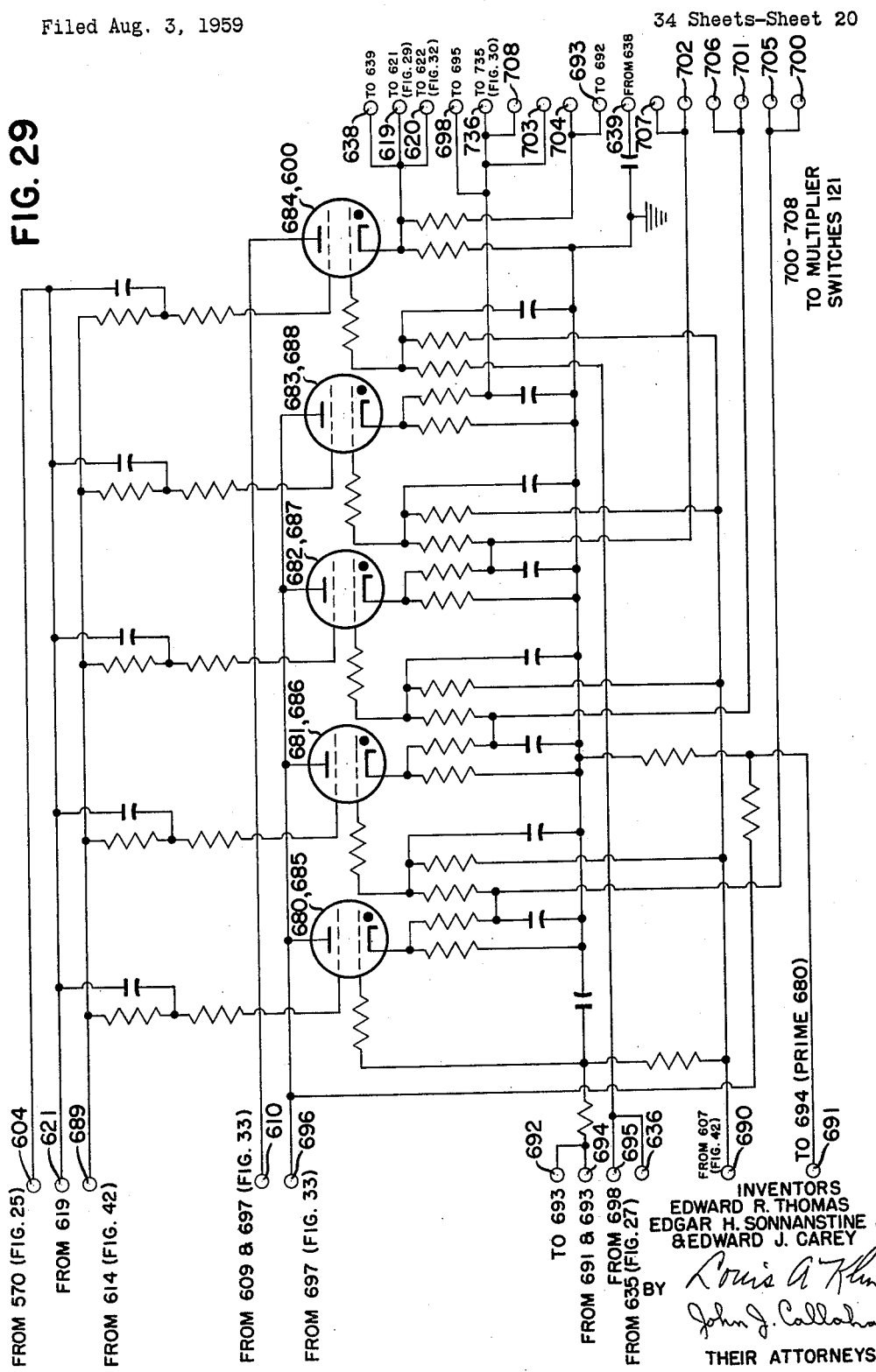

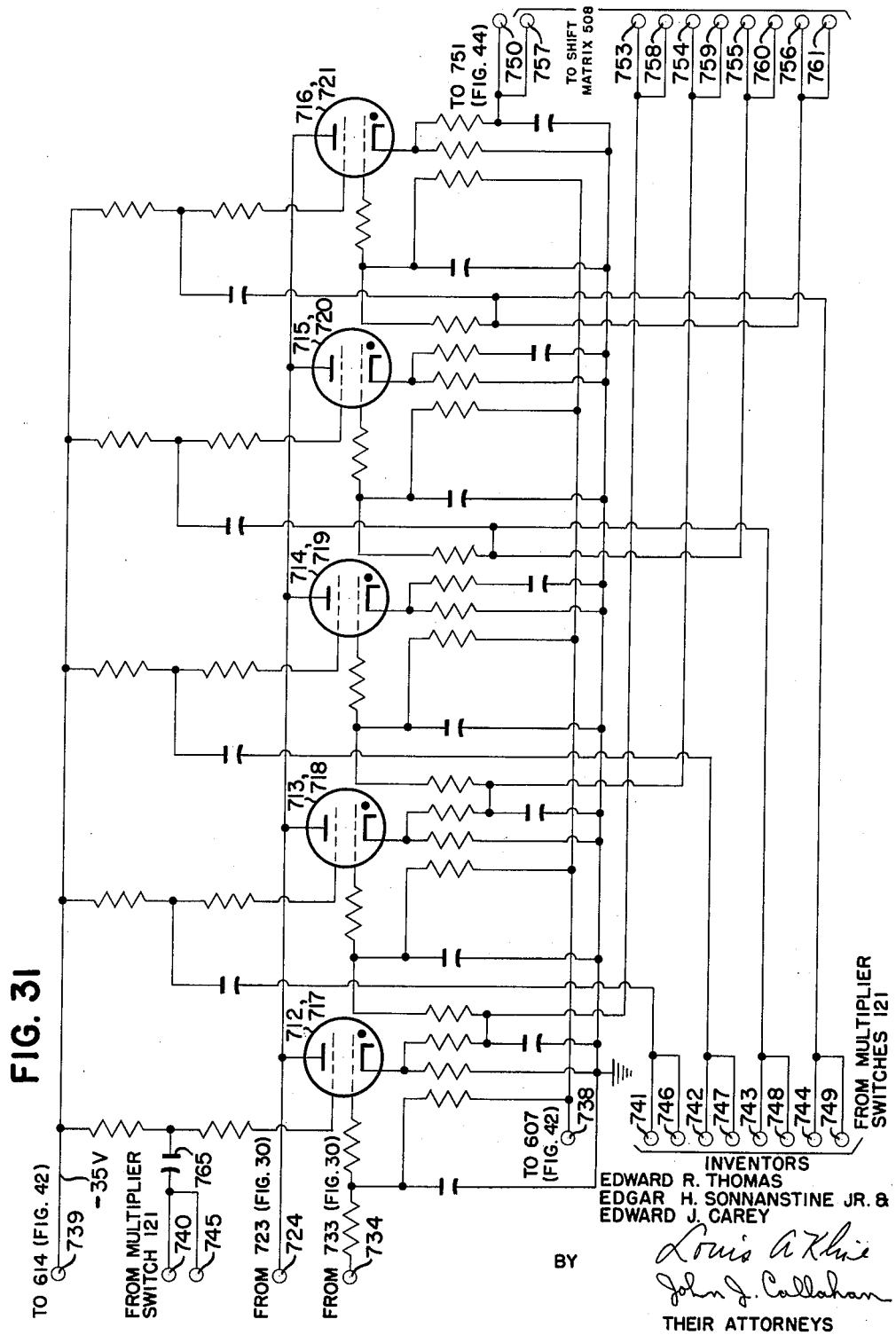

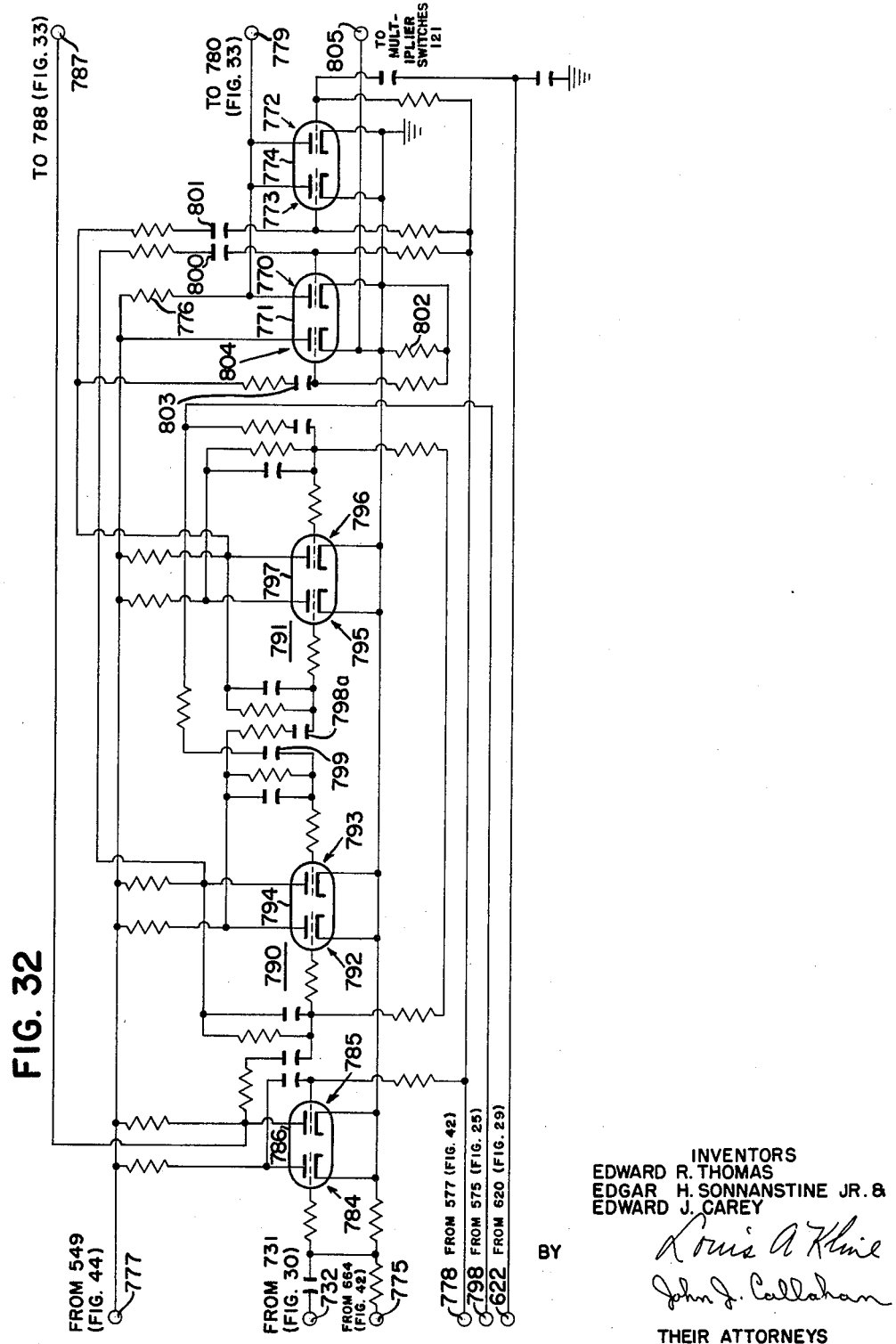

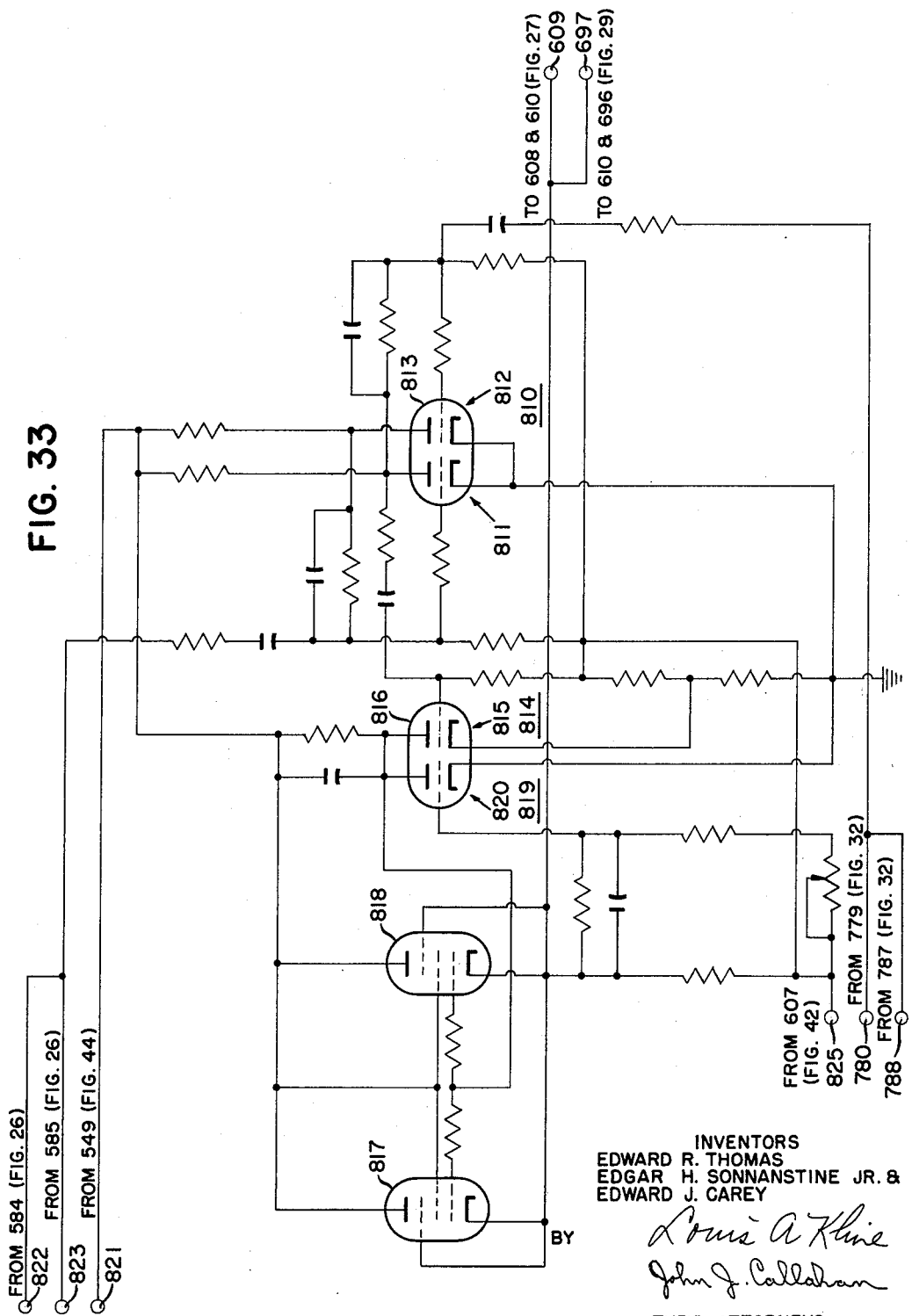

July 31, 1962     E. R. THOMAS ETAL     3,047,227
MULTIPLIER APPARATUS

Filed Aug. 3, 1959     34 Sheets-Sheet 24

INVENTORS
EDWARD R. THOMAS
EDGAR H. SONNANSTINE JR. &
EDWARD J. CAREY
BY
Louis A. Kline
John J. Callahan
THEIR ATTORNEYS July 31, 1962     E. R. THOMAS ETAL     3,047,227
MULTIPLIER APPARATUS
Filed Aug. 3, 1959     34 Sheets-Sheet 25

FIG. 38

TO OTHER PRODUCT MAGNETS 242

242 — PM — K113bc2 — 854 — FROM 1044 (FIG. 42)
853
856 — K113ac2 — FROM (FIG. 43)
855 — K113a1 — TO (FIG. 43)
+300V 850     851
852

FROM 1081 (FIG. 44)
857

FROM PRODUCT SWITCH 123
859
FROM 1088 (FIG. 44)
858
FROM CHECK SWITCH 122
860

FIG. 37

FROM 549 (FIG. 44)
846

CARRY PULSE FROM ACCUMULATOR 509
840

837     843

FROM 577 (FIG. 42)
842     841
FROM 664 (FIG. 42)
845     844
FROM 833 (FIG. 24)
839

INVENTORS
EDWARD R. THOMAS
EDGAR H. SONNANSTINE JR. &
EDWARD J. CAREY
BY Louis A. Kline
John J. Callahan
THEIR ATTORNEYS July 31, 1962

E. R. THOMAS ETAL 3,047,227

MULTIPLIER APPARATUS

Filed Aug. 3, 1959

INVENTORS
EDWARD R. THOMAS
EDGAR H. SONNANSTINE JR
& EDWARD J. CAREY
BY Louis A. Kline
John J. Callahan
THEIR ATTORNEYS July 31, 1962

E. R. THOMAS ETAL 3,047,227

MULTIPLIER APPARATUS

Filed Aug. 3, 1959

INVENTORS
EDWARD R. THOMAS
EDGAR H. SONNANSTINE JR. &
EDWARD J. CAREY

BY Louis A. Kline
John J. Callahan

THEIR ATTORNEYS

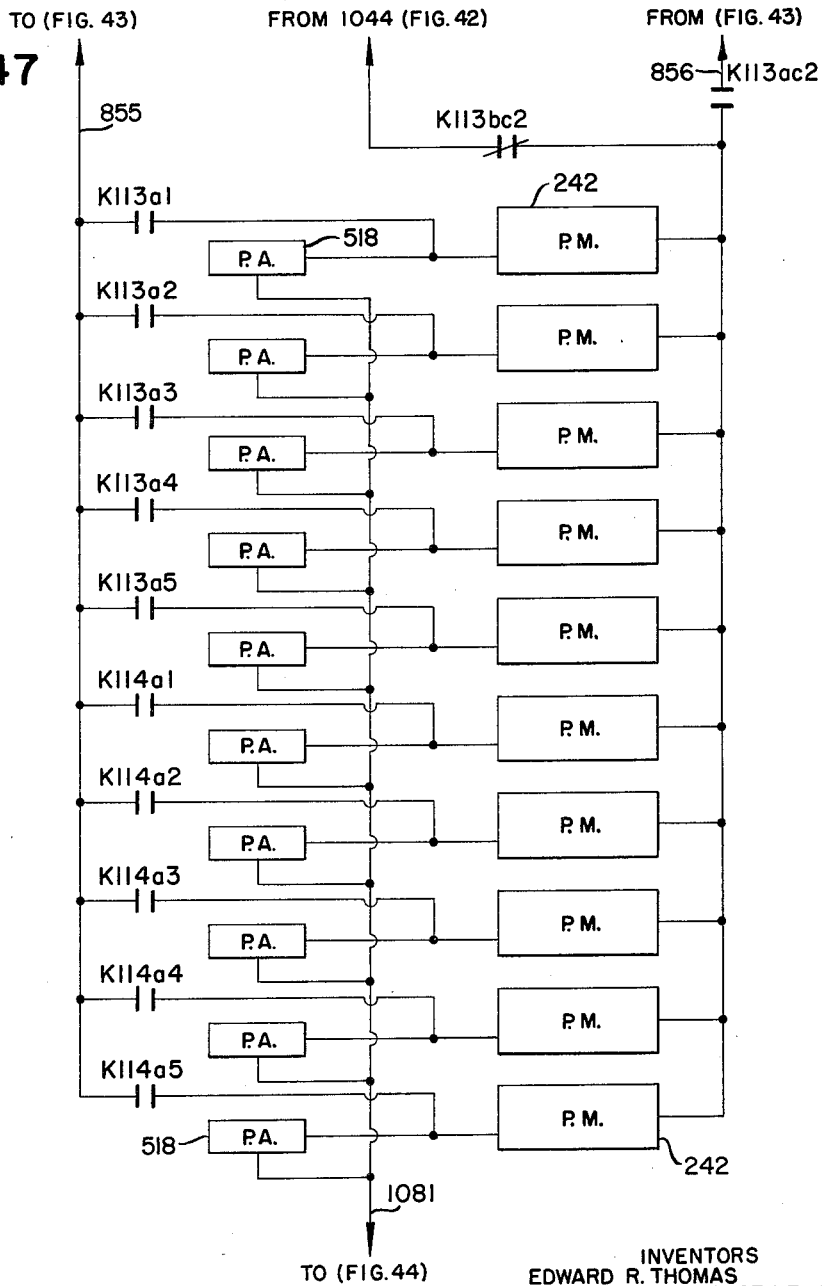

United States Patent Office 3,047,227
Patented July 31, 1962

3,047,227
MULTIPLIER APPARATUS
Edward R. Thomas, Dayton, Edgar H. Sonnanstine, Jr., West Carrollton, and Edward J. Carey, Dayton, Ohio, assignors to The National Cash Register Company, Dayton, Ohio, a corporation of Maryland (incorporated in 1926)
Filed Aug. 3, 1959, Ser. No. 831,124
16 Claims. (Cl. 235—153)

This invention relates to improvements in multipliers, and more particularly to multiplier apparatus provided with novel means for checking the operations thereof.

In the embodiment which will be described to illustrate the invention, the multiplier apparatus comprises a mechanical data entry and readout machine, to the rear of which is added an electro-mechanical structure, and an electronic multiplying device. The data entry and readout machine is an accounting machine of the type shown and described in United States Letters Patent No. 2,626,-749, issued January 27, 1953, to Raymond A. Christian et al. This accounting machine operates in its usual manner to perform desired accounting procedures and to prepare printed records. In addition, the accounting machine is capable of controlling the entry of the multiplication factors into the electronic multiplying device, and is capable of the printing of the products computed by it. The electro-mechanical structure comprises means for combining the accounting machine with the electronic multiplying device whereby factors set up on the keyboard of the former will be transferred to the latter for multiplication, and the product formed in the electronic multiplying device will be transferred to the accounting machine for printing and further computation thereby. The electro-mechanical structure comprises factor-receiving devices including switches and switch-closing members, and selecting means for the switch-closing members of the type shown and described in United States Letters Patent No. 2,332,755, issued October 26, 1943, to William H. Robertson and Eric R. Coe.

According to the present invention, the multiplier apparatus is provided with checking means which functions to insure that the product resulting from a multiplication is correct. Generally, the operation of the multiplier apparatus including the checking means is as follows: The two factors of a problem are entered or registered in respective factor-receiving devices. At the same time, one of the factors is entered or registered in a supplemental factor-receiving device. The multiplier apparatus then effects a multiplication of the two factors, and the product thereof is accumulated in a product accumulator. The product of the foregoing multiplication is then transferred to a product storage means under control of the accumulator. Next, the multiplier apparatus effects a multiplication of the ten's complement of one of the factors and the other factor, and the total of the product of the two multiplications is accumulated in the product accumulator. The multiplier apparatus then determines identity or lack of identity between the significant digits of the total in the product accumulator resulting from the two multiplications and the digits of the factor entered in the supplemental factor-receiving device. If identity is established, the operation of the electronic multiplying device is terminated, and the device is restored to a condition in which a subsequent multiplication may be initiated. With the electronic multiplying device in its restored condition, the accounting machine is free to perform any of its normal operations, and the product of a last multiplication may be transferred to the accounting machine for printing. But, if identity is not established, the electronic multiplying device continues to perform the same two multiplications over and over until identity is established or until an operator restores the electronic multiplying device to its initial operating condition. And, if identity is not established, the accounting machine is prevented from performing certain operations, such as the entering of factors into the factor-receiving means, the initiation of the operation of the electronic multiplying device, and the transfer of the product of a last multiplication from the product storage means to the accounting machine.

It is therefore an object of the present invention to provide a multiplier apparatus with novel means for checking operations thereof.

Another object of the present invention is to provide a multiplier apparatus with means for checking the computing operations thereof.

A further object of the present invention is to provide a multiplier apparatus, comprising an accounting machine and an electronic multiplying device, which is provided with means for checking the computing operations thereof.

With these and other, incidental, objects in view, the invention includes certain novel features of construction, circuits, and combinations of parts, the essential elements of which are set forth in the appended claims, and a preferred form or embodiment of which is hereinafter described with reference to the drawings which accompany and form a part of this specification.

In the drawings:

FIG. 1 is a perspective view of the accounting machine portion of the multiplier apparatus.

FIG. 2 is a plan view of the accounting machine and typewriter keyboards.

Figure 3A:
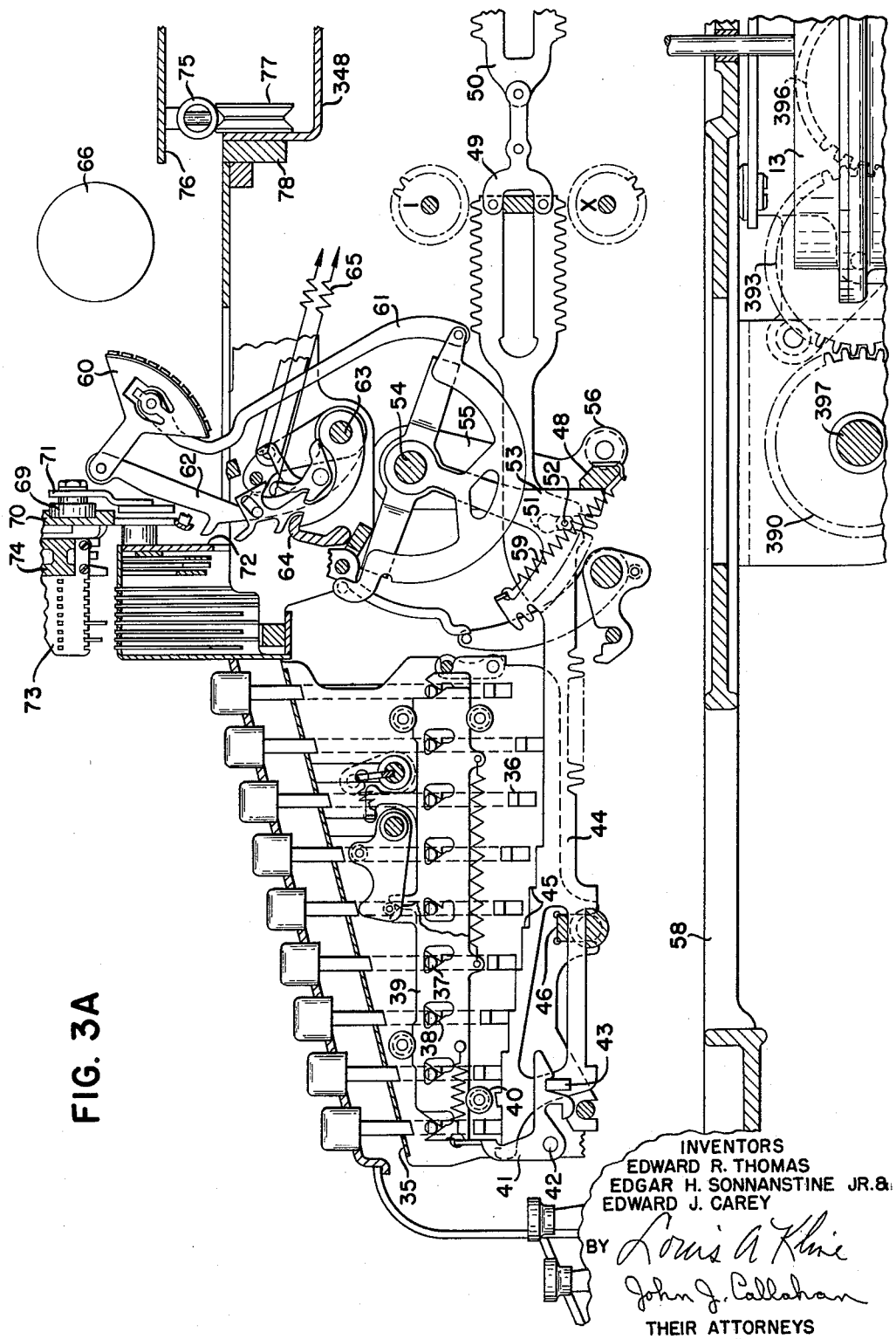
Figure 3B:
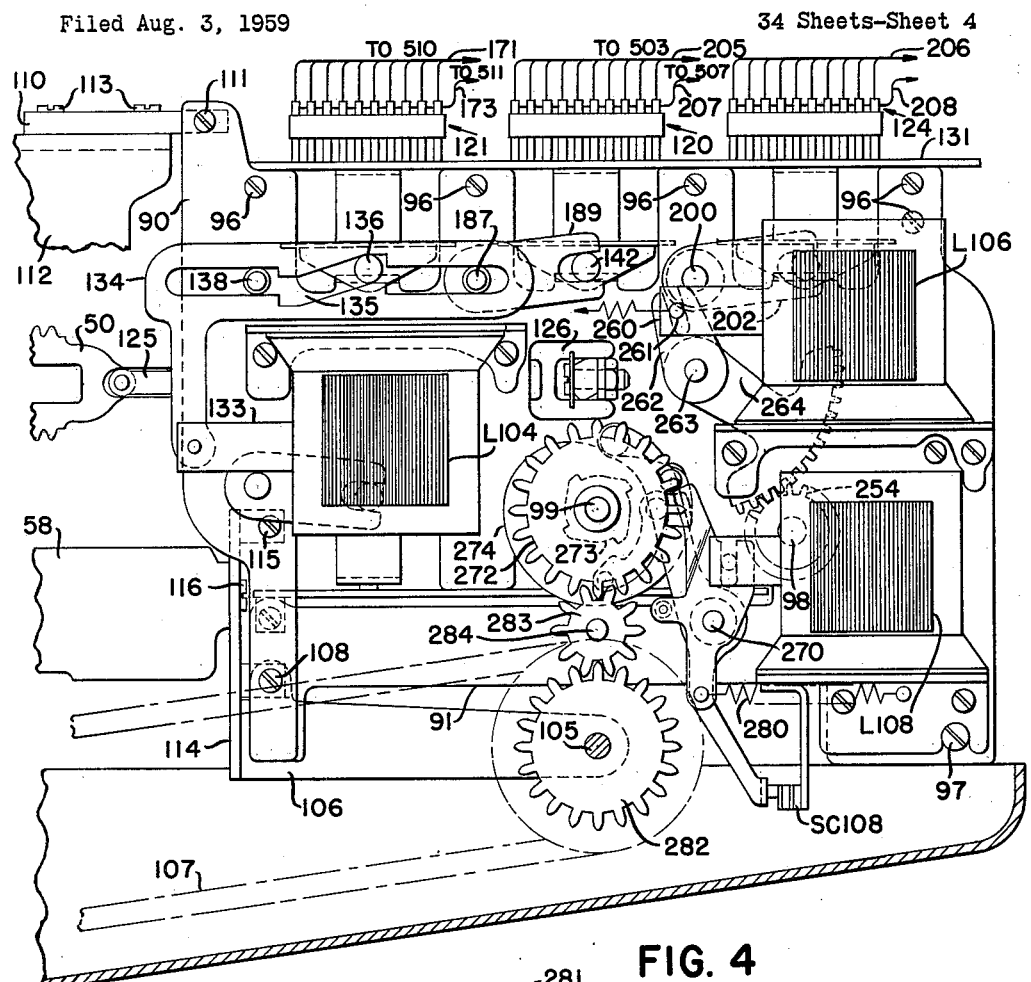

FIGS. 3A and 3B, taken together, constitute a right side elevation of the accounting machine, with the framework removed, showing also the rear addition to the accounting machine.

Figure 4:
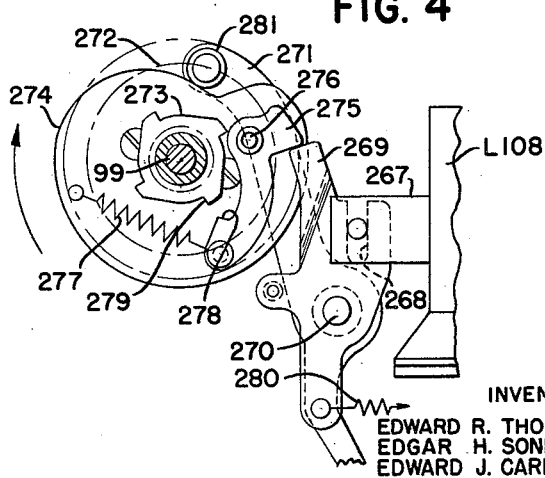

FIG. 4 is a detail view of the clutch mechanism and controls therefor which is utilized to effect the setting of the differential actuators of the accounting machine according to the product stored in the product storage means.

FIG. 5 is a left side elevation of the rear addition to the accounting machine, showing in particular the factor-receiving means which control the operation of the electronic multiplying portion of the multiplier apparatus.

FIG. 6 is a right side elevation of the rear addition to the accounting machine, showing in particular the mechanism used for setting of the differential actuators of the accounting machine according to the product stored in the product storage means.

FIG. 7 is a top plan view of the rear addition to the accounting machine, showing in particular the factor-receiving means and the mechanisms for causing them to register the digits of a factor.

Figure 8:
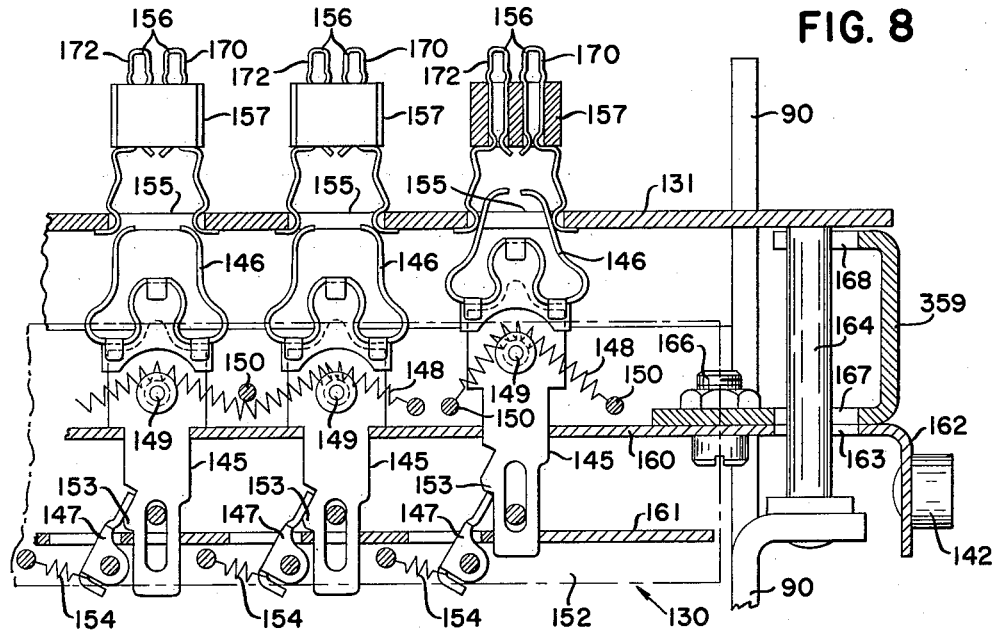

FIG. 8 is a fragmentary end view, as observed from the back of the accounting machine, of one of the factor-receiving means, showing in particular the actuating means therefor.

Figure 9:
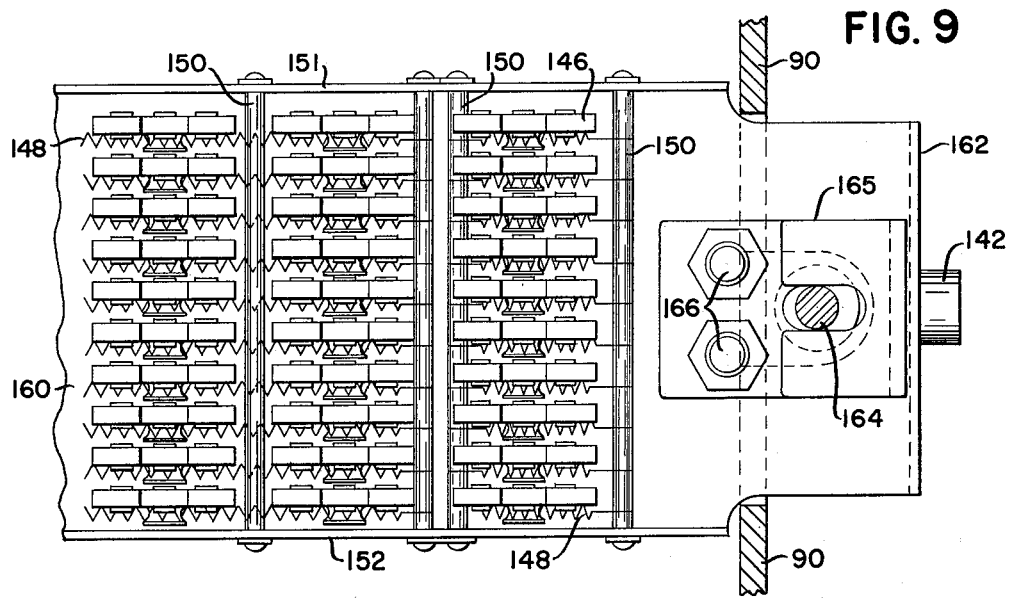

FIG. 9 is a top plan view of the structure shown in FIG. 8.

Figure 10:
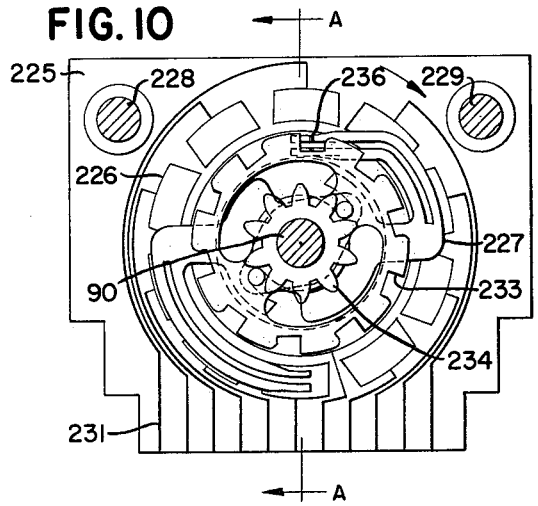
Figure 11:
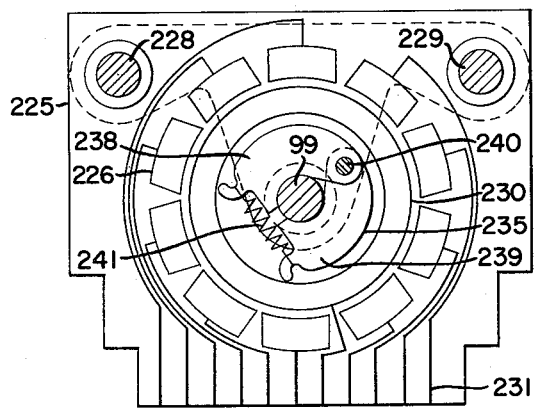

FIGS. 10 and 11 are side detail views of one of the product storage means.

Figure 12:
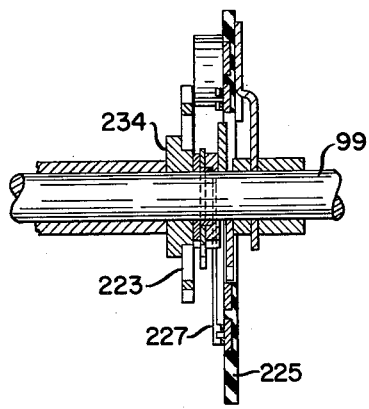

FIG. 12 is a cross-section view of the product storage means along the lines A—A of FIG. 10.

Figure 13:
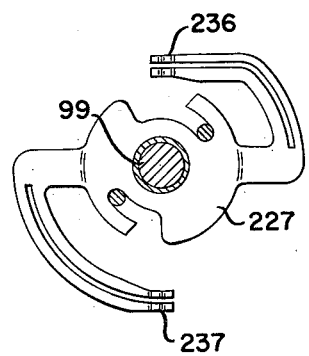

FIG. 13 is a detail view of the rotatable contact of the product storage means shown in FIG. 10.

Figure 14:
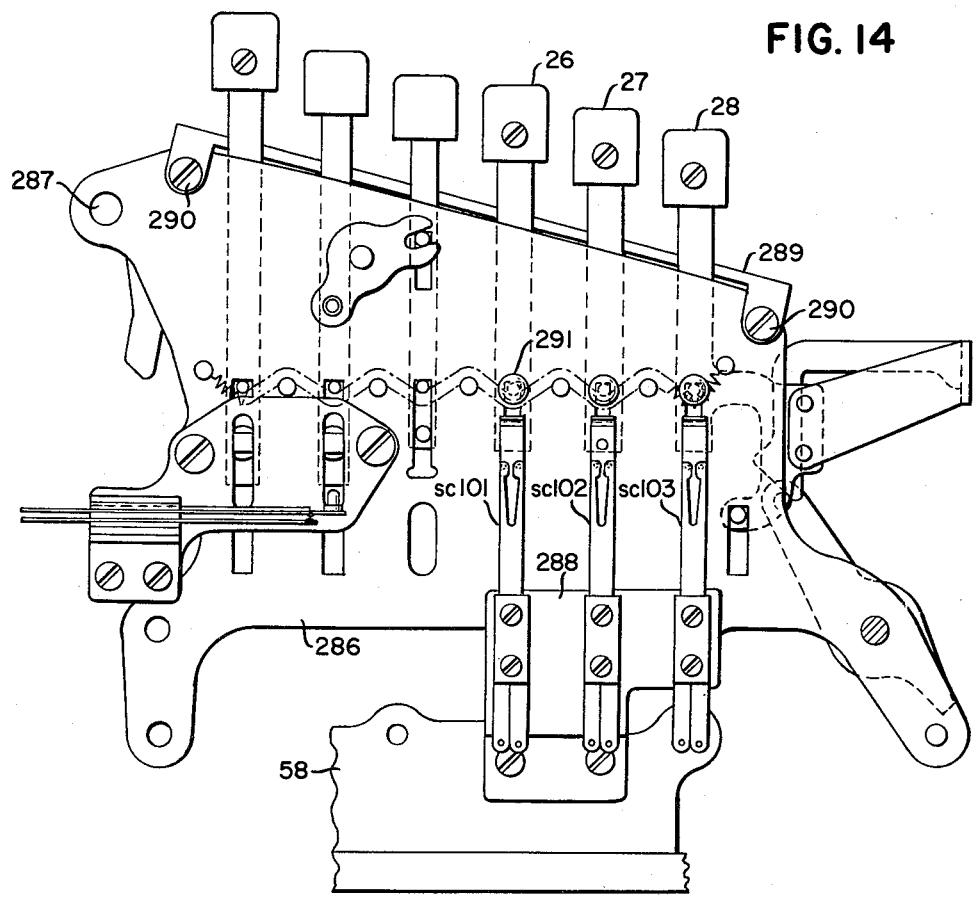

FIG. 14 is a left side elevation of the left-hand bank of function control keys of the accounting machine.

Figure 15:
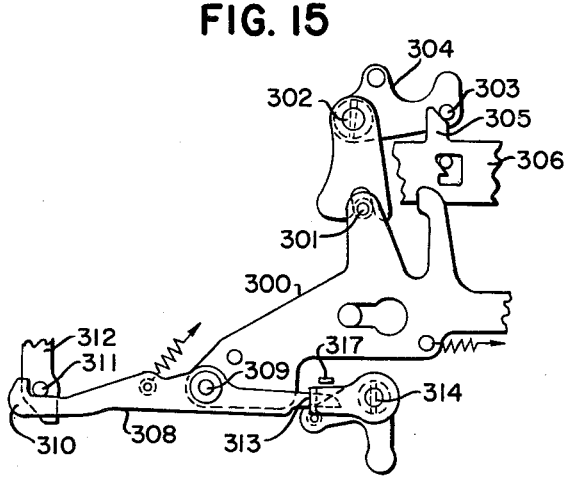

FIG. 15 is a left side elevation of the key release mechanism for the amount key banks of the accounting machine.

Figure 16:
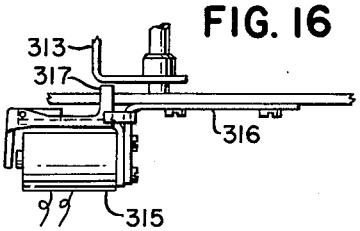

FIG. 16 is a top view of a portion of the key release mechanism shown in FIG. 15, showing in particular the means which is rendered effective on product-read-out operations to allow the differential actuators to be moved to the rear of the accounting machine.

Figure 17:
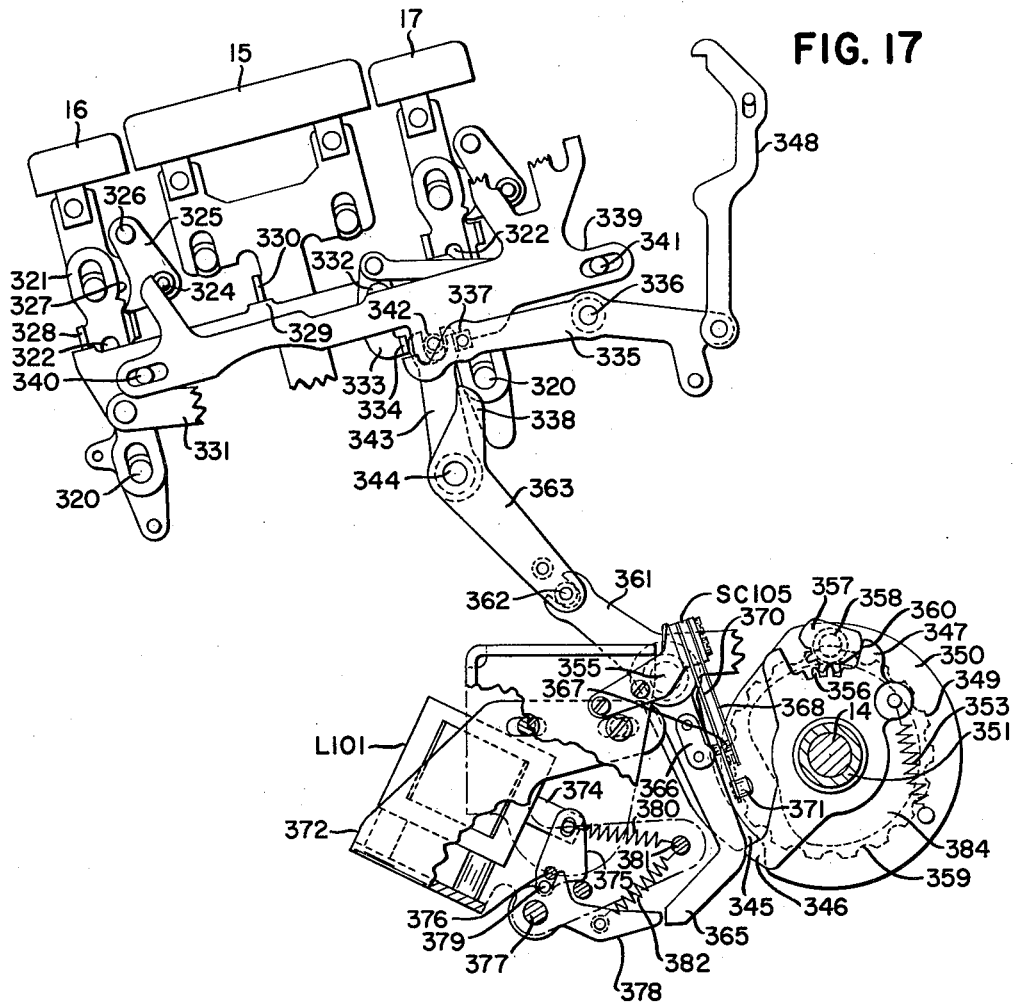

FIG. 17 is a right side elevation of the various motor bars, the accounting-machine-cycle-initiating mechanism, and the trip solenoid, the trip switch, and connected mechanism for controlling the release of the accounting machine for operation, under certain conditions.

Figure 18:
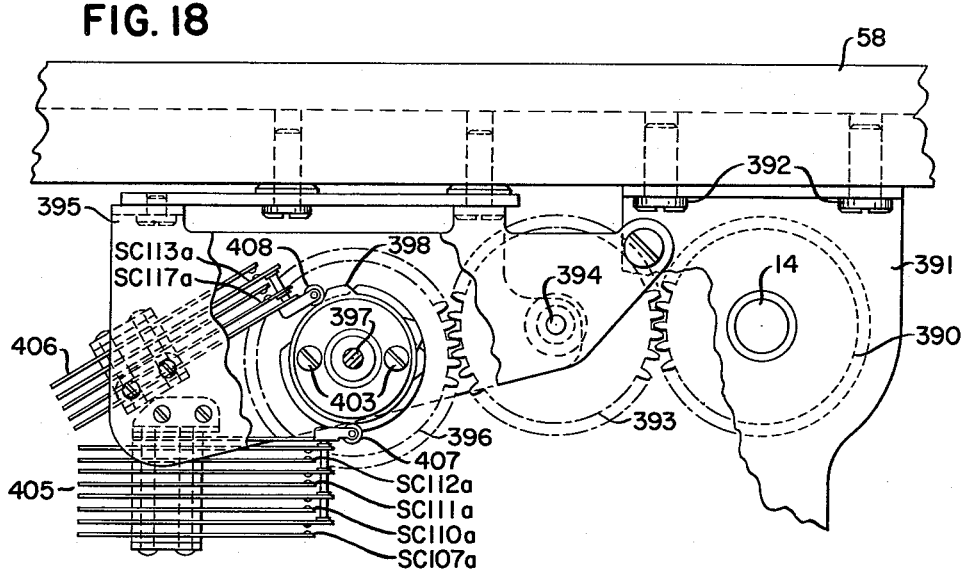

FIG. 18 is a fragmentary left side elevation of the accounting machine, showing in particular the main cam shaft and the sequence control means attached to the base thereof, for controlling the sequence of operation of the multiplier apparatus.

Figure 19:
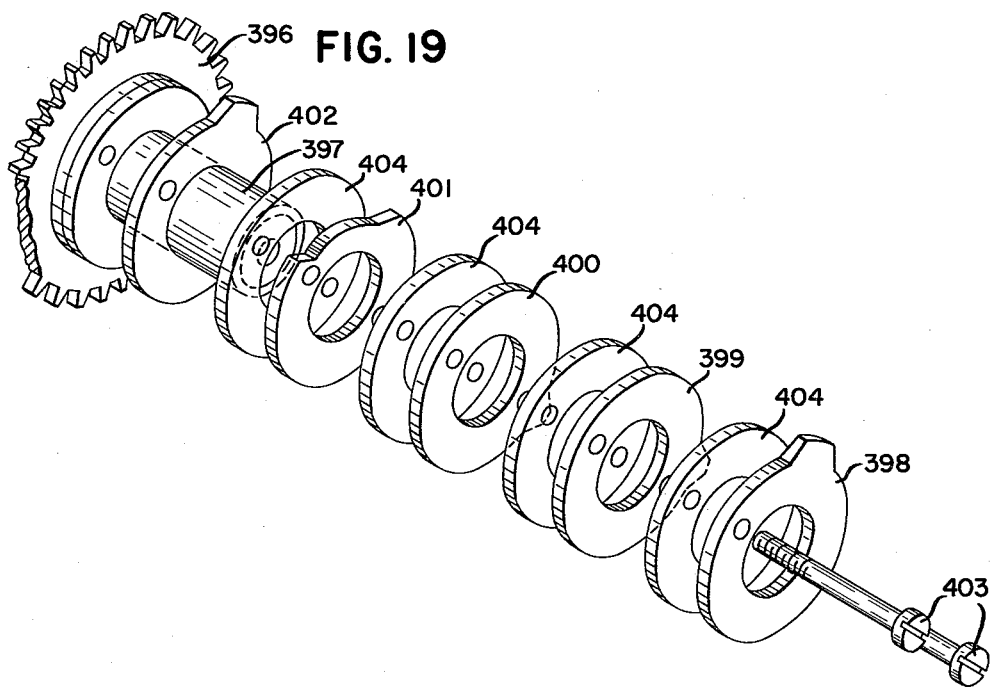

FIG. 19 is a perspective view of the sequence control means of FIG. 18, showing the various cams thereof.

Figure 20:
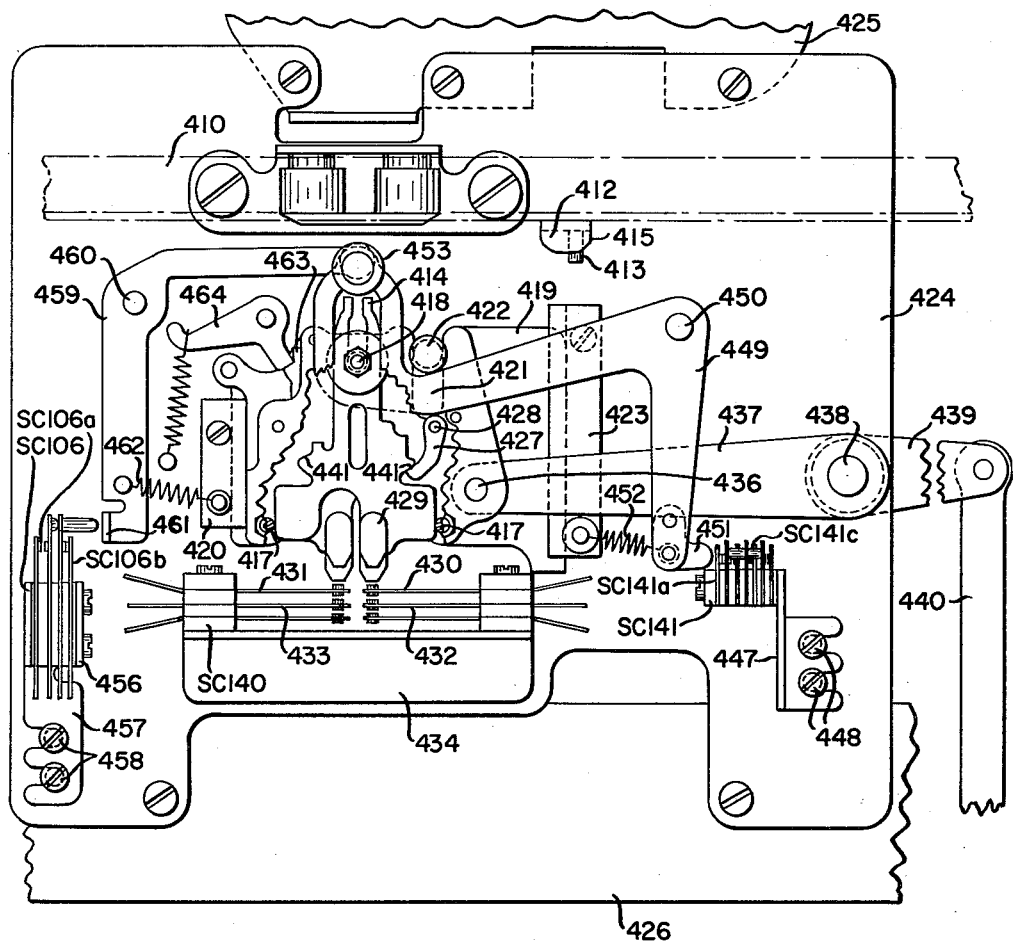

FIG. 20 is a top plan view of the carriage position switches controlled by the traveling carriage in preselected columnar positions, for controlling the operation of the multiplier apparatus and/or the recorder which may be associated therewith.

Figure 21:
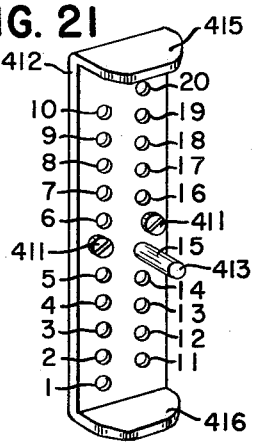

FIG. 21 is a detail view of a control plate or stop which is adapted to be mounted at the rear of the traveling carriage in preselected columnar positions for selectively controlling operation of the multiplier apparatus and/or the recorder.

Figure 22:
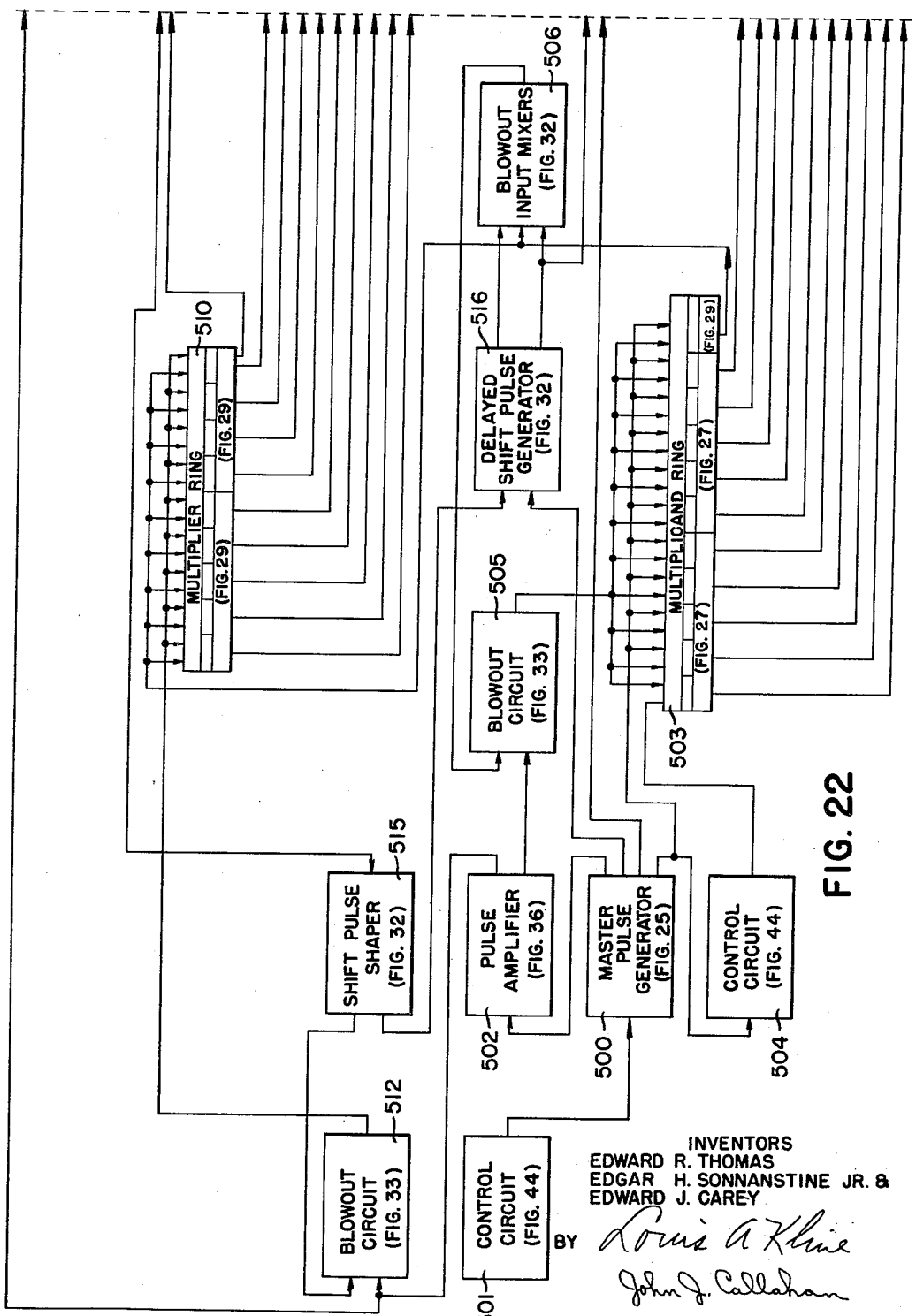
Figure 23:
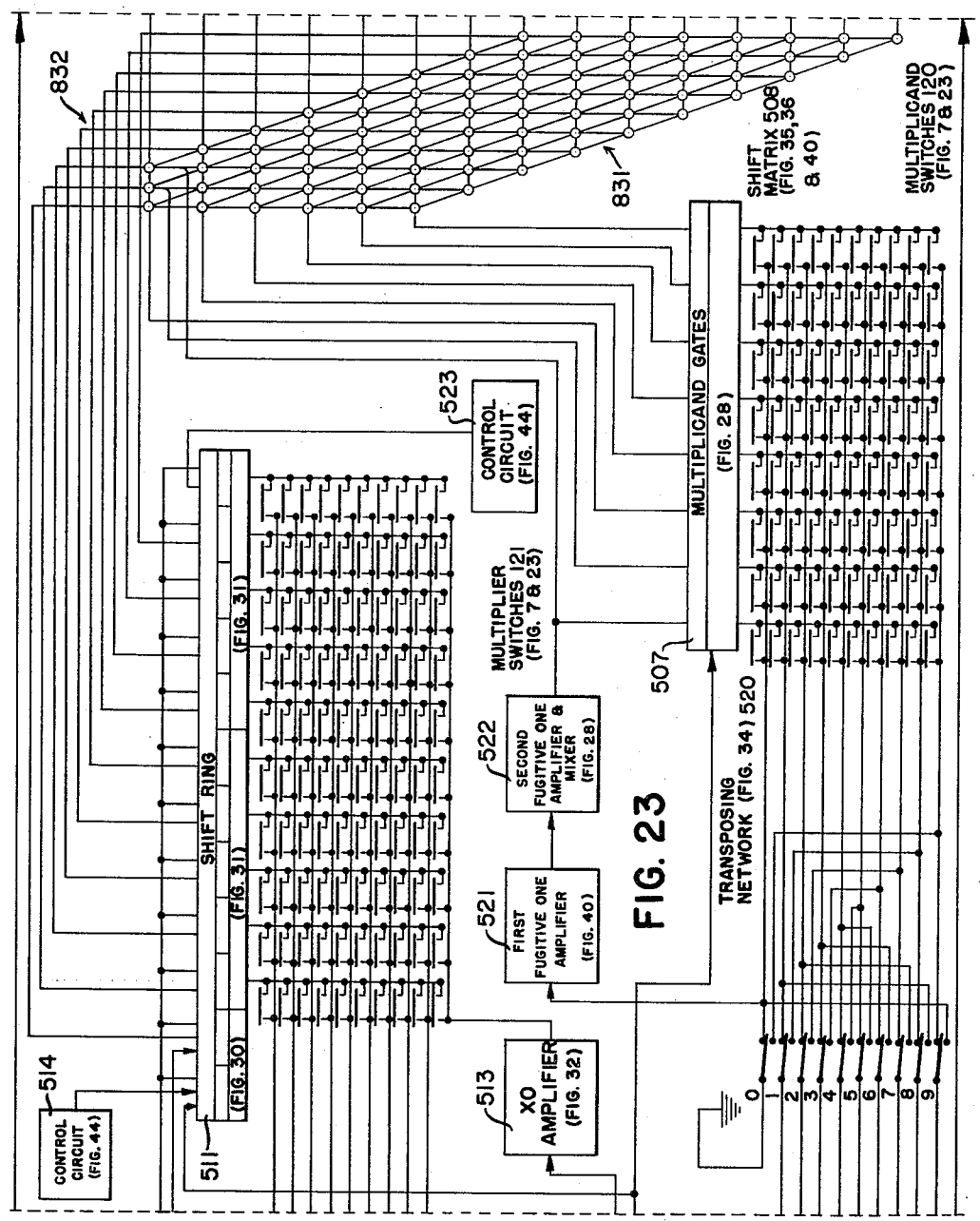
Figure 24:
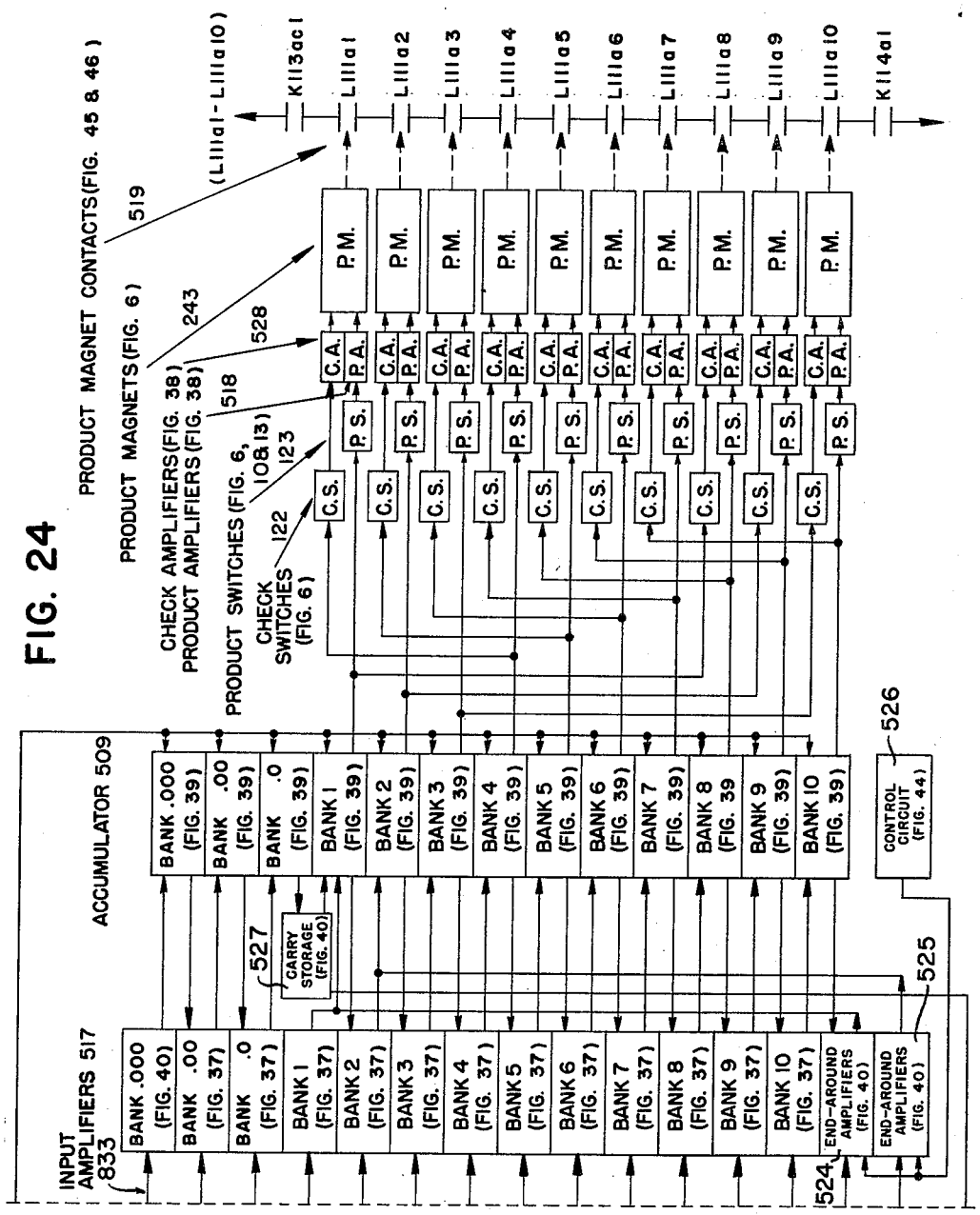

FIGS. 22 to 24 inclusive, taken together, with FIG. 22 at the left, FIG. 23 in the middle, and FIG. 24 at the right, constitute a block diagram of the electronic multiplying portion of the multiplier apparatus.

FIG. 25 is a schematic diagram of the master pulse generator indicated as 500 in FIG. 22.

FIG. 26 is a schematic diagram of the pulse amplifier indicated as 502 in FIG. 22.

FIG. 27 is a schematic diagram of the multiplicand ring indicated as 503 in FIG. 22.

Figure 28:
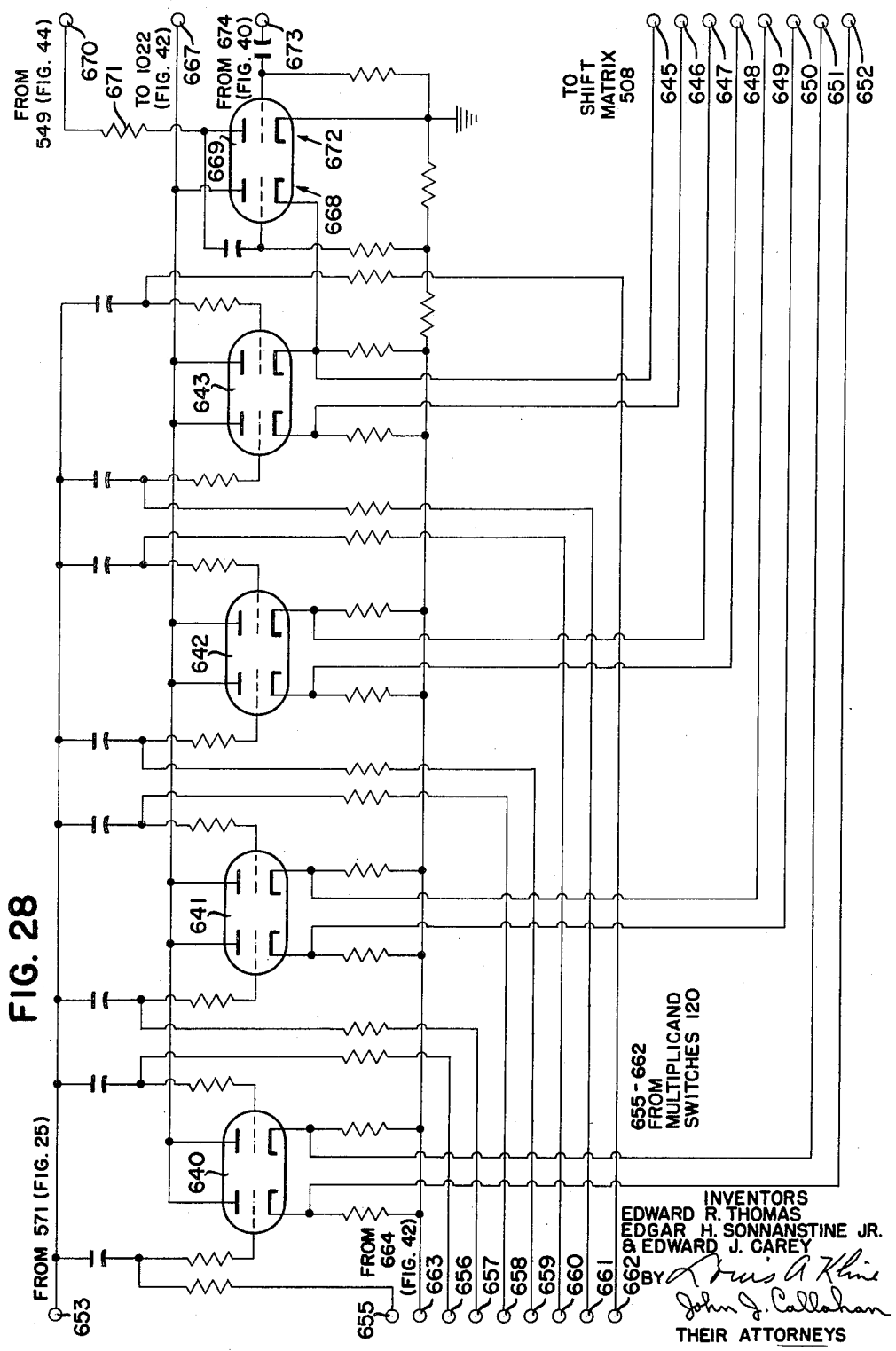

FIG. 28 is a schematic diagram of the multiplicand gates indicated as 507 in FIG. 23, and the second "fugitive one" amplifier and mixer indicated as 522 in FIG. 23.

FIG. 29 is a schematic diagram of the multiplier ring indicated as 510 in FIG. 22.

FIGS. 30 and 31, taken together, with FIG. 30 at the left, constitute a schematic diagram of the shift ring indicated as 511 in FIG. 23.

FIG. 32 is a schematic diagram of the blowout input mixers, the ×0 amplifier, the shift pulse shaper, and the delayed shift pulse generator, each indicated as 506, 513, 515, and 516, respectively, in FIGS. 22 and 23.

FIG. 33 is a schematic diagram of the blowout circuits, each indicated as 505 and 512 in FIG. 22.

Figure 34:
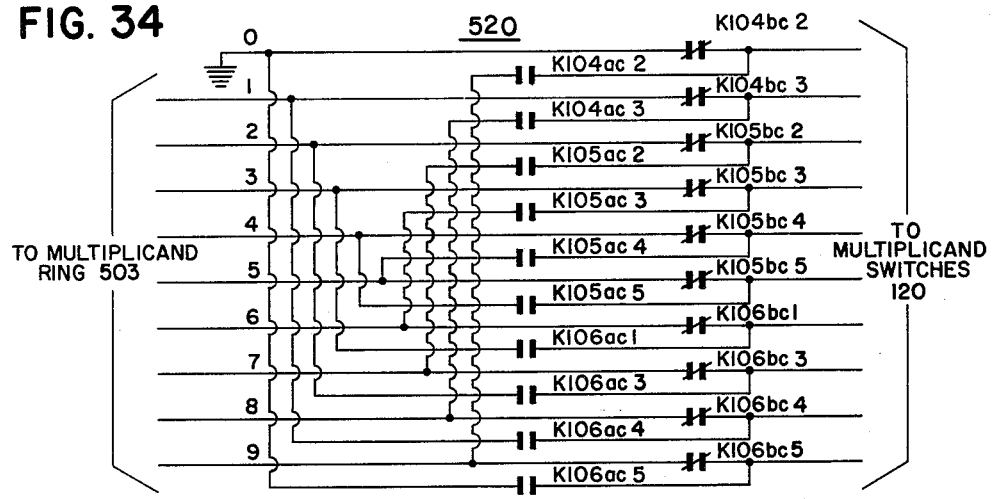

FIG. 34 is a diagram of the transposing network indicated as 520 in FIG. 23, including the necessary switches.

Figure 35:
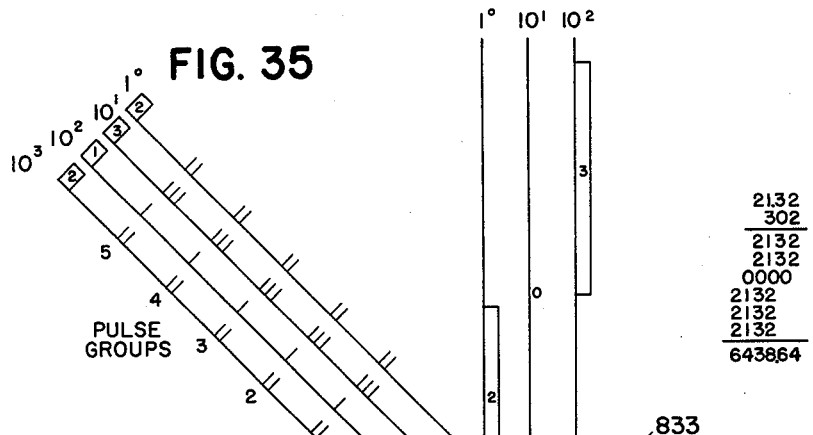

FIG. 35 is a simplified diagram of a portion of the shift matrix shown as 508 in FIG. 23, which is helpful in explaining the operation of the shift matrix.

Figure 36:
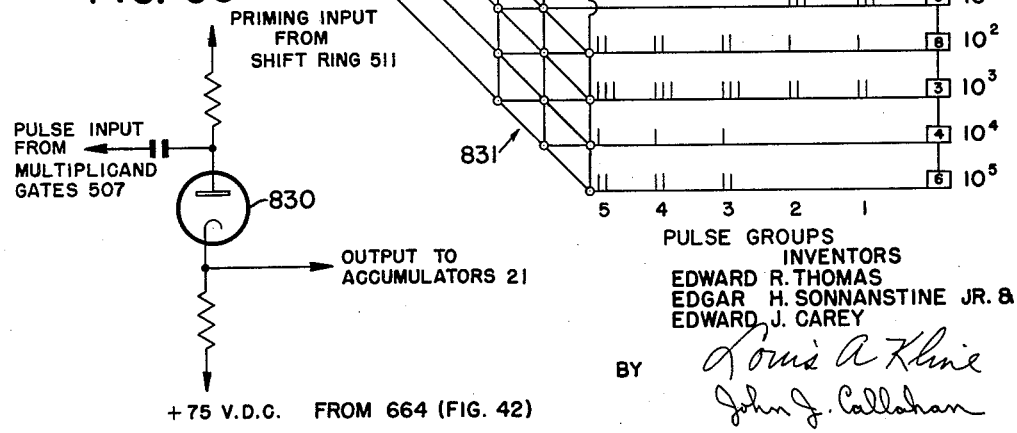

FIG. 36 is a schematic diagram of one of the diode circuits of the shift matrix shown as 508 in FIG. 23.

FIG. 37 is a schematic diagram of one of the input amplifiers indicated as 517 in FIG. 24.

FIG. 38 is a schematic diagram of one of the product amplifiers and check amplifiers indicated as 518 and 528, respectively, in FIG. 24.

Figure 39:
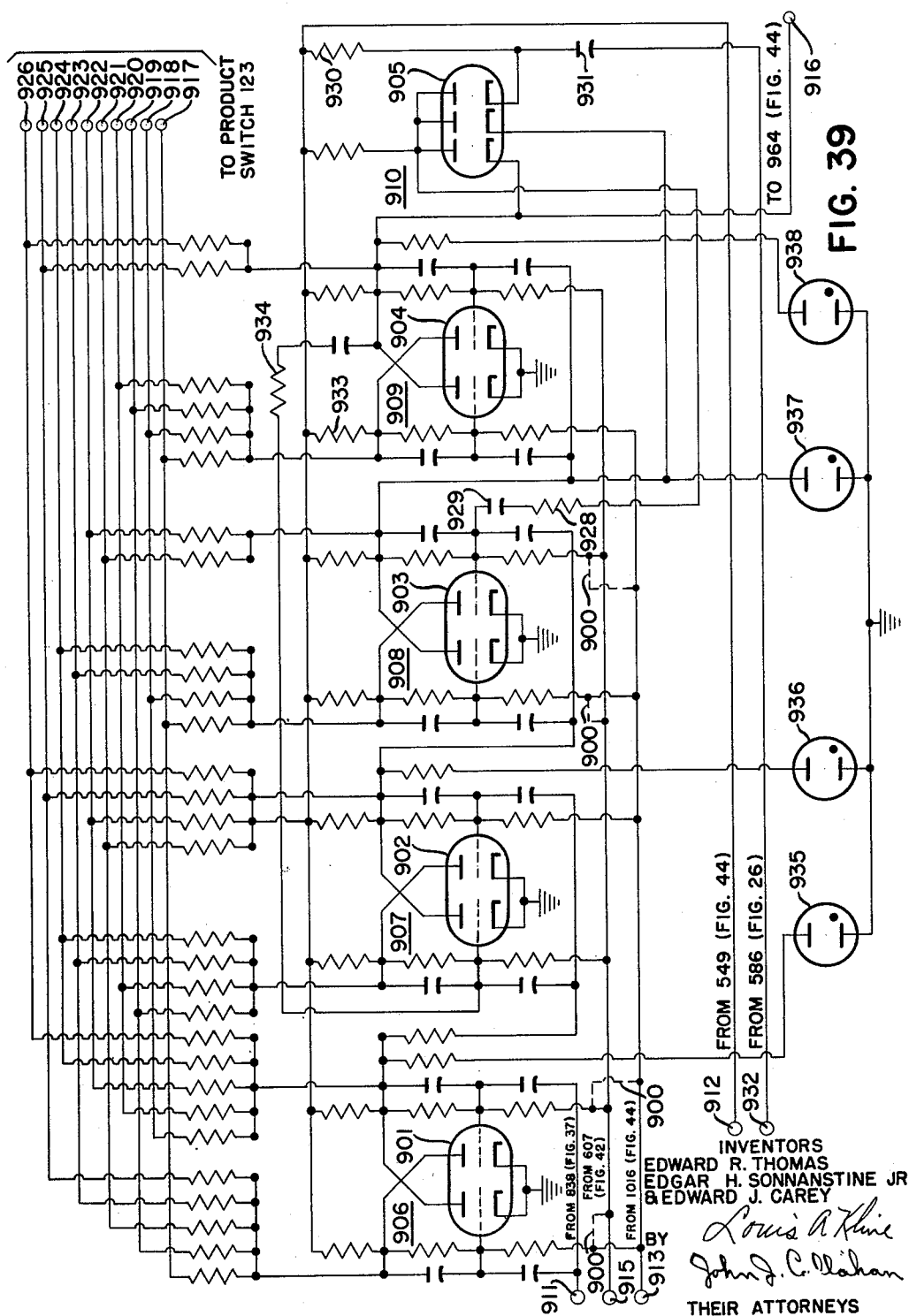

FIG. 39 is a schematic diagram of one of the accumulator banks indicated as 509 in FIG. 24.

Figure 40:
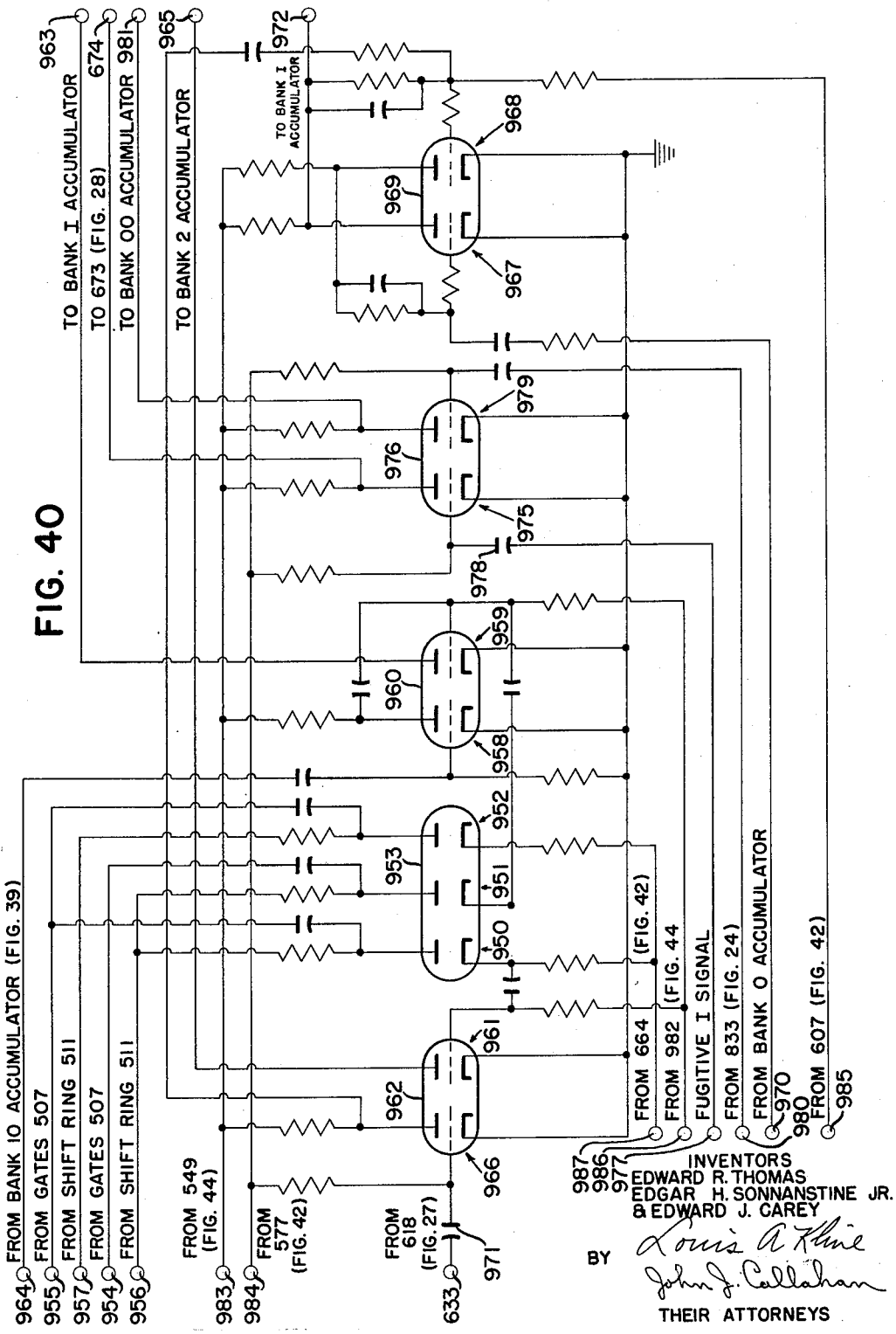

FIG. 40 is a schematic diagram of the Bank 000 input amplifier, indicated as 517 in FIG. 24; the first "fugitive one" amplifier, indicated as 521 in FIG. 23; the end-around amplifiers, indicated as 524 and 525 in FIG. 24; and the carry storage circuit, indicated as 527 in FIG. 24.

Figure 41:
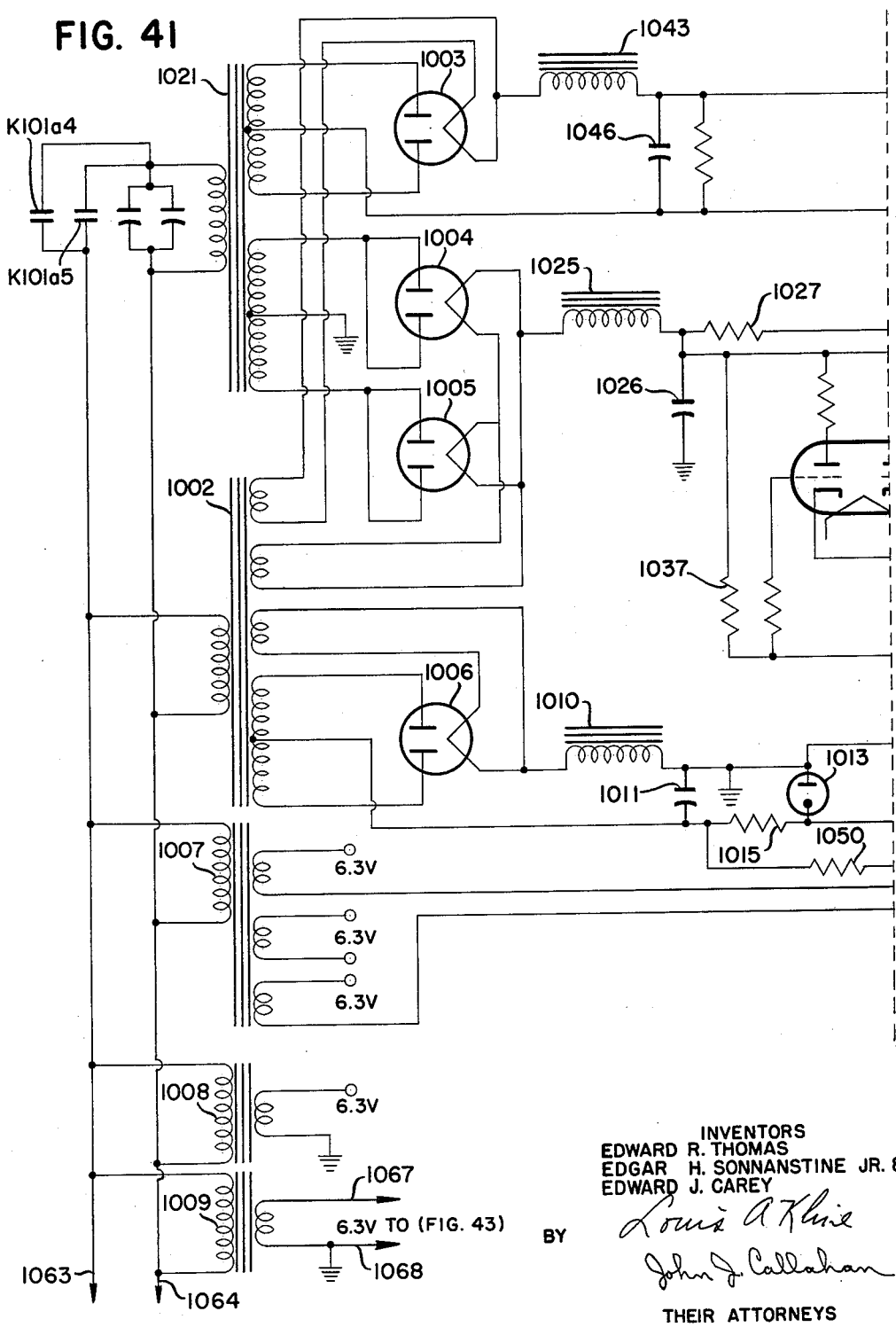
Figure 42:
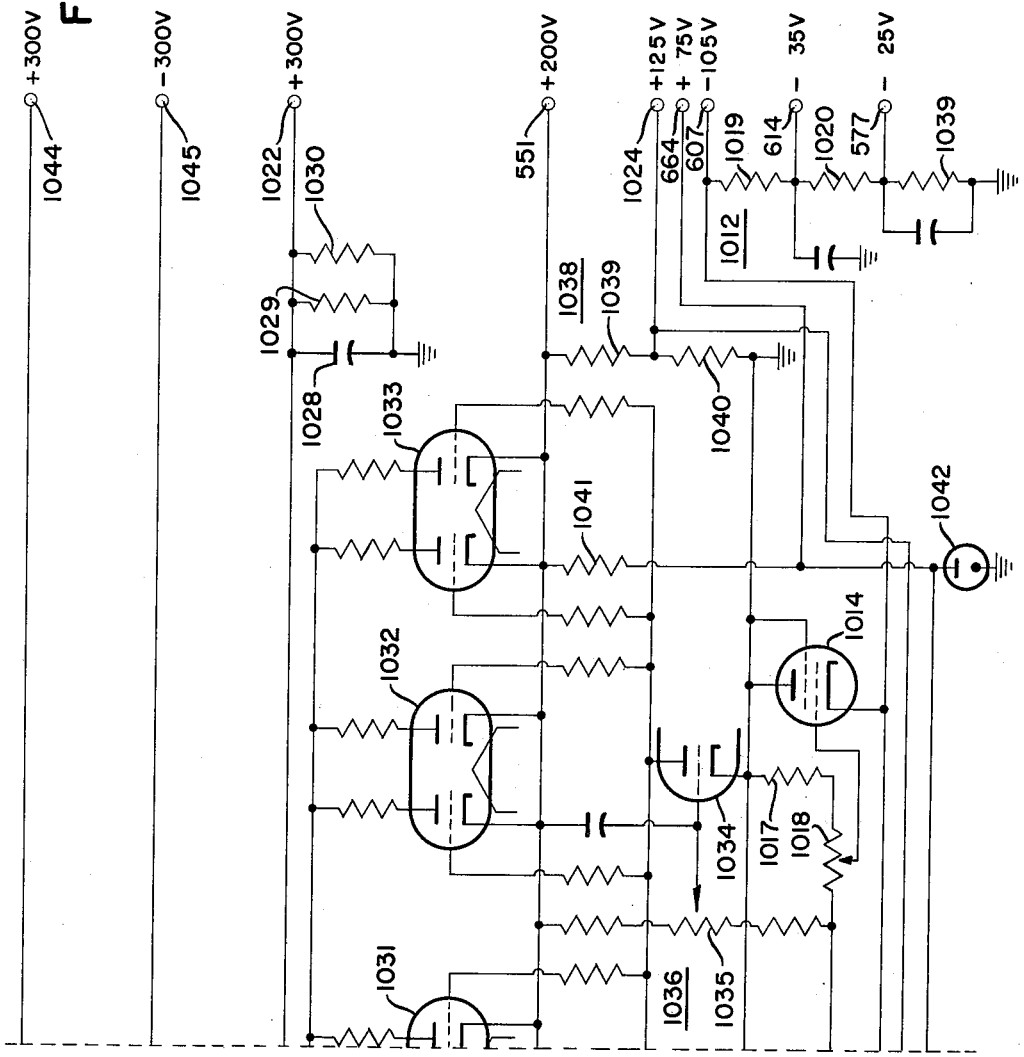

FIGS. 41 and 42, taken together, with FIG. 41 at the left, form a schematic diagram of the power supply for the electronic multiplying portion of the multiplier apparatus and its control circuits.

Figure 43:
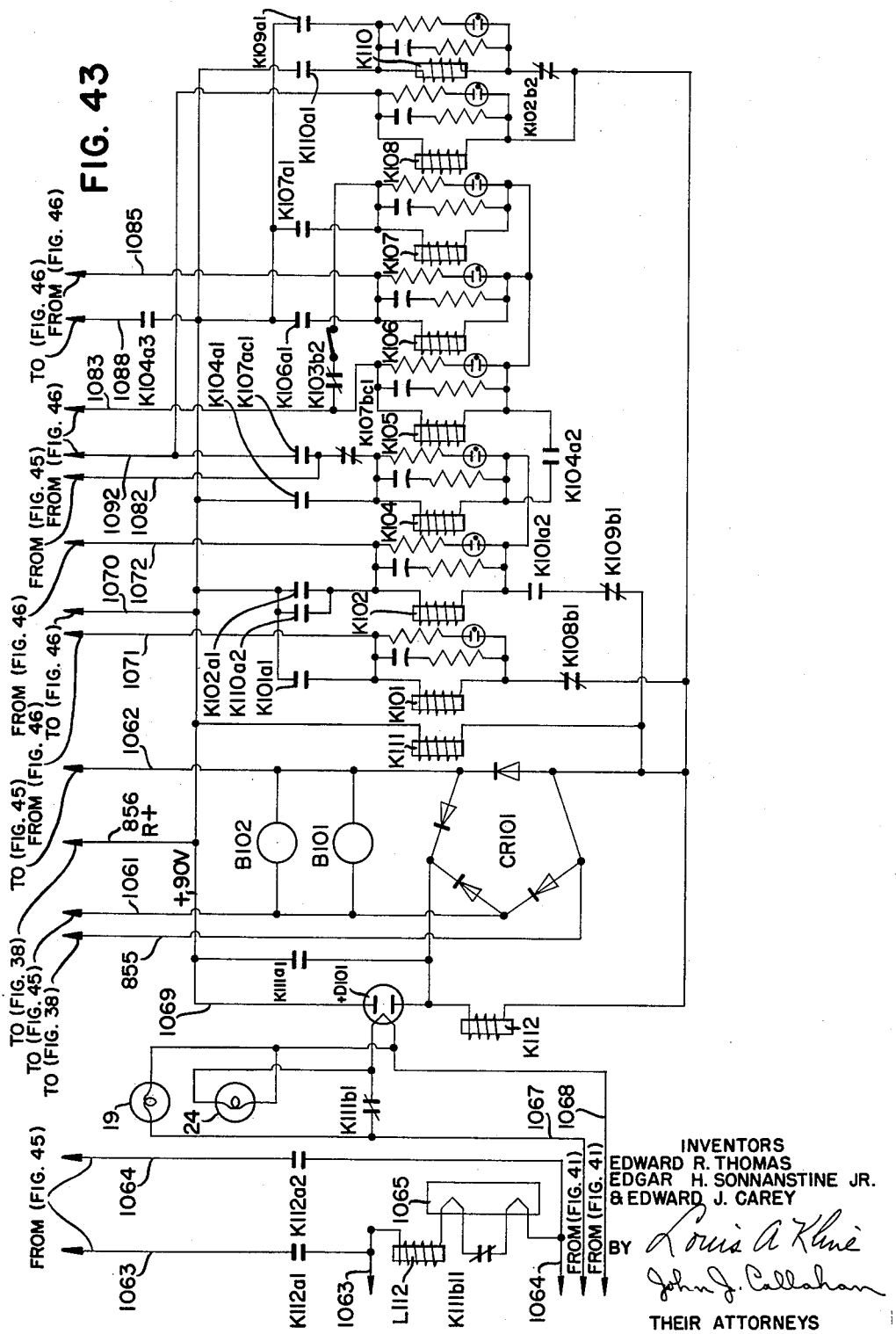
Figure 44:
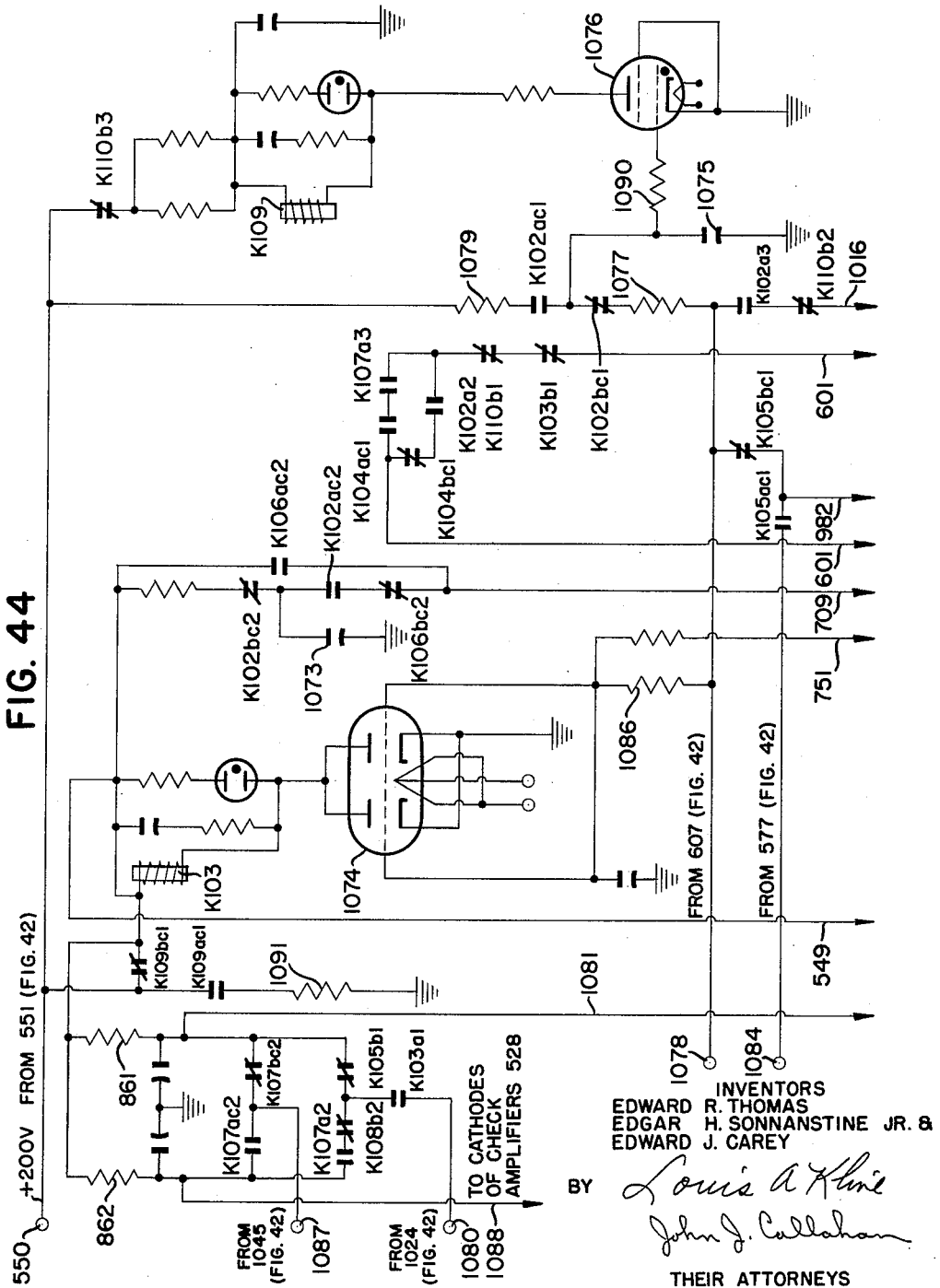

FIGS. 43 and 44 are each schematic diagrams of control circuits for controlling the operation of the electronic multiplying portion of the multiplier apparatus.

Figure 45:
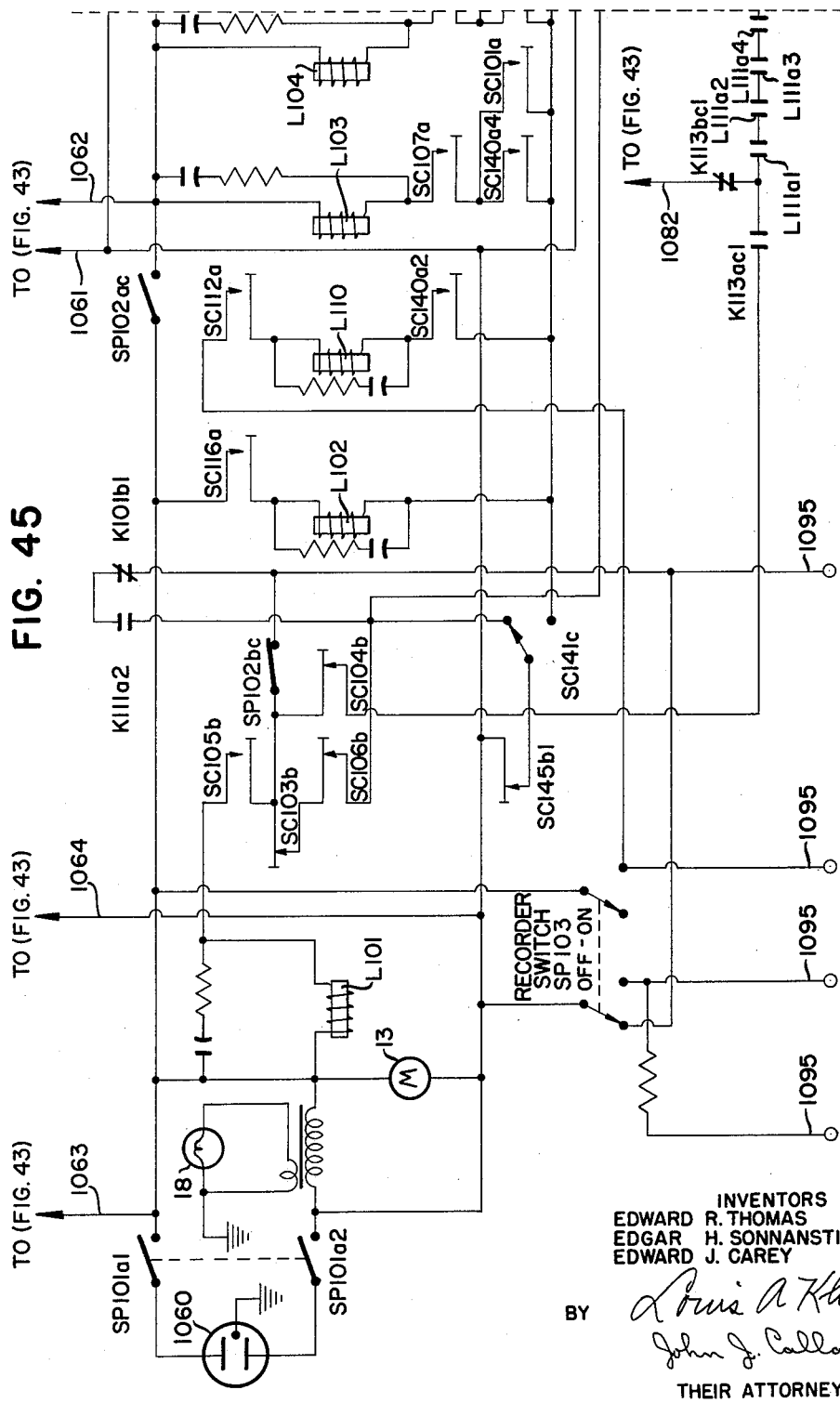
Figure 46:
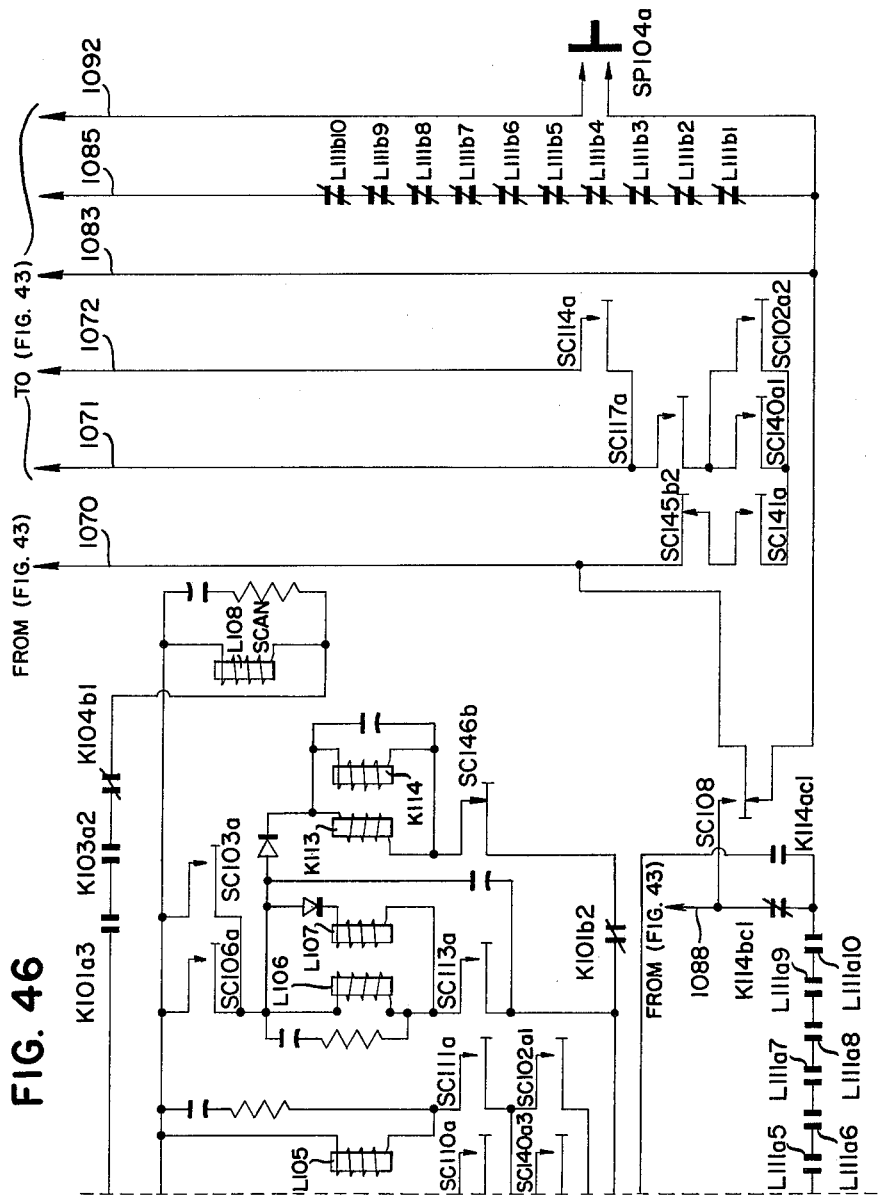

FIGS. 45 and 46, taken together, with FIG. 45 at the left, constitute a schematic diagram of control circuits utilized for coordinating the operation of the accounting machine and electronic multiplying portions of the multiplier apparatus.

FIG. 47 is a block diagram helpful in explaining the operation of the multiplier apparatus which prevents possible damage from being done thereto during a product transfer operation.

*Accounting Machine (FIGS. 1—21)*

With reference to FIG. 1 of the drawings, the mechanical portion of the multiplier apparatus is generally in the form of an accounting machine 10. The accounting machine 10 is of the type shown and described in United States Letters Patent No. 2,626,749, issued January 27, 1953, to Raymond A. Christian et al.

As the accounting machine 10 is fully shown and described in the aforesaid Patent No. 2,626,749, a detailed description of each of the various mechanisms contained therein is not considered necessary in order to obtain a full and complete understanding and appreciation of the present invention. However, in order to insure such a full and complete understanding of the present invention, there is given hereinafter a brief description of the features and functions of the major component parts thereof, along with the modifications and additions thereto which have been made in order to adapt the accounting machine for operation with the electronic multiplying means.

As shown in the perspective view of FIG. 1, a typewriter keyboard is located at the front end of the accounting machine, while just behind and somewhat above this keyboard is a keyboard on which may be set up the various additive and non-additive items and the various factors which are to be entered into the accounting machine. To the left of the amount and factor keyboard is a control keyboard containing the various function control keys, while to the right of it are located a plurality of motor bars and carriage control keys. In the center, just above the amount and factor keyboard, is located a group of type sectors for the accounting machine, while just to the left of these sectors is located a type basket for the electric typewriter. Immediately behind the aforementioned printing mechanism is a rotatable platen in which accounting forms and/or other record material may be supported. This platen is mounted on a traveling carriage 11, which is movable back and forth across the machine to selected columnar positions. Behind the paper carriage is shown that part of the machine which houses ten add-subtract totalizers and a factor-receiving and product storage and transfer mechanism. The factor-receiving and product storage and transfer mechanism has been devised and attached to the rear of the accounting machine to provide a means for transferring a multiplicand and a multiplier from the accounting machine to the electronic multiplying unit, and for storing the product formed in the electronic multiplying unit, from which it may be transferred to the accounting machine for printing and storage thereby. The electronic multiplying device may be housed in a cabinet (not shown), which cabinet may be situated to the left of a desk (not shown), on which the accounting machine may be positioned.

Referring to FIG. 2 of the drawings, at the left of the typewriter keyboard is a set of switch keys 12 for starting and stopping a continuously-running electric motor, which drives the various operating mechanisms of the accounting machine.

The machine is operated by an electric motor 13 (FIG. 3A), which directly drives a shaft (not shown), the latter rotating constantly so long as the motor circuit is closed. A main cam shaft 14 (FIGS. 17, 18, and 19) is adapted to be clutched to the motor drive shaft under control of the control keys, or by means of motor bars 15, 16, and 17 in a suitable manner.

To the right of the typewriter keyboard, there is provided a switch button 18 to cause electric power to be supplied to the accounting machine and to indicate this occurrence, and switch buttons and lights 19 and 20 for controlling, respectively, the supply of operating potential to the electronic multiplying device, and to a punch or other recorder apparatus which may be associated with the multiplier apparatus, if desired.

To the left of the typewriter keyboard, there is provided a reset button and light 23 for manual restoration of the multiplying device to its initial operating condition. When the multiplying device is in its initial operating condition, it is ready to solve a multiplication problem.

The light is energized when an operator attempts to enter into the multiplicand-receiving means a multiplicand which exceeds the capacity of the multiplicand-receiving means. A standby light 24 is provided to indicate the period of approximately forty-five seconds required for the electronic multiplying device to become conditioned to perform a multiplication operation. A parity light 25 is provided to indicate when a parity error occurs in the punch apparatus which may be associated with the multiplier apparatus.

As shown and described in the aforesaid Patent No. 2,626,749, there is located on the left-hand side of the accounting machine keyboard a group of keys for controlling the selection and operation of the various totalizers of the machine. There are three rows or banks of these function control keys. In accordance with the present invention, there is further provided in the left-hand bank a Left Factor or multiplicand key 26, a Right Factor or multiplier and multiply key 27, and a Product key 28.

The multiplicand key 26 is provided for controlling the entry of the multiplicand from the accounting machine into the electronic multiplying device. The multiplier and multiply key 27 is provided for controlling the entry of the multiplier from the accounting machine into the electronic multiplying device, and for causing the electronic multiplying device to operate upon the transfer of the multiplicand and multiplier entries thereto. The Product key 28 is provided for controlling the transfer of the product from the product storage means to the accounting machine.

Referring now to FIGS. 3A and 3B, there is shown in FIG. 3A, in particular, a greatly simplified cross-sectional view of the accounting machine which is essentially the same as that shown in detail in FIGS. 3A and 3B of said aforementioned Patent No. 2,626,749 and completely described therein. As a repetition of such detailed description and illustrations is not deemed essential for a full and complete understanding of the present invention, only a portion of its salient mechanical features is illustrated in FIGS. 3A and 3B of the instant application for the sake of simplicity. However, enough of the accounting machine's mechanical structure is illustrated herein and a brief description thereof is given in order that the various modifications of the machine made in accordance with the present invention may be fully understood.

Inasmuch as each denominational row of amount keys is identical with the others, a description of but a single denominational row (i.e., #9), as shown in FIG. 3A, is believed to suffice for the remaining ones.

As shown, each of the amount keys, numbered "1" through "9" of each denominational row, is slidably supported by a top plate 35 for vertical movement. Each key supports a square stud 36, disposed on the lower end of its downwardly projecting stem portion. Located near the center of each key stem is a stud 37, which cooperates with diagonally walled cam slots 38 formed in a control slide 39. The control slide 39 is supported for lateral movement by rollers 40 and is spring-urged to the right, as viewed, into engagement with the stud 37 by suitable spring means, not shown. When one of the amount keys is depressed, the slide 39 is forced to the left, by the stud 37, into engagement with a zero stop pawl 41. As a result of the engagement, the pawl 41 is rotated counter-clockwise about its pivot 42, thereby releasing a block 43, secured to a differential actuator or rack 44. With the block 43 released, the actuator 44 is freed to move to the right, toward the rear of the accounting machine, during the machine operation until the corresponding shoulder 45 formed thereon engages with the stud 37 of the depressed key to stop the rack during its travel at a position commensurate with the value of the depressed key. For example, when the #8 key is depressed, the square stud engages the lowermost shoulder of the rack 44 and stops the rack in its #8 position, the #7 key engages the next higher shoulder, and so on. The #9 key, however, does not function exactly as the remaining keys. When the #9 key is depressed, the slide 39 is forced to move to the left, the pawl 41 is rotated counter-clockwise, the block 43 is released, and the rack 44 is permitted to travel during the machine operation the entire distance to the right until stopped by a projecting bar 46. This extreme position of the rack corresponds to its #9 position. If none of the amount keys is depressed, the rack is not permitted to move and thus remains in its #10 position.

All of the racks are guided during their travel at their rear ends by means of a slotted bar, not shown, which bar is supported between the side frames of the accounting machine. Each of the racks associated with a particular amount row of the keyboard is connected by a link 49 to an auxiliary rack 50, which also is guided for sliding movement. It is thus evident that the exact linear translation movement of the rack 44 is immediately transmitted to the auxiliary rack 50. In the accounting machine described, no auxiliary rack is provided for the actuators associated with the date and symbol key banks, as these banks are for printing only and consequently do not have any corresponding totalizer wheels associated therewith.

Each rack has a slot 51 formed on its lower side, for receiving a stud 52 mounted on a reducer arm segment 53. The reducer arm segment 53 is rotatably mounted on a reducer arm shaft 54, which is journaled at either end in the side frames of the machine.

The rear edge of the reducer arm segment 53 is spring-urged into engagement with a leading frame bar 48, which is supported between a pair of identical leading frame arms 55 (only one of which is shown), which, in turn, are fixedly secured to either end of the reducer arm shaft 54 and are located just inside the side frames of the accounting machine. Each of the arms 55 is provided with a roller 56 on its lower end, which rollers are adapted to engage with bifurcations provided on a cam follower (not shown).

When the main cam shaft 14 of the accounting machine is rotated through one revolution by the motor 13, mounted on the lower side of the machine base 58, the cam follower arms are rocked first counter-clockwise (FIG. 3A) and then in the reverse direction, so as to effect movement of the leading frame arms 55 first toward the rear of the machine and then back to their original position.

Each of the reducer arm segments 53 is connected to the leading frame bar 48 by a spring 59 and, through the slot-and-stud connections 51 and 52, can move its related rack first to the right and then to the left. Hence, all the racks are simultaneously urged by the spring 59 toward the rear of the machine until each is stopped by its associated and depressed key during the first half of the machine cycle, and then all of the racks are positively restored to their home positions by means of the leading frame bar 48 coming into direct engagement with the reducer arm segments 53 during the second half of the machine cycle.

The resulting differential positioning of each rack reducer arm segment 53 is transmitted to its corresponding type sector 60 by means of a link 61, pivotally connected between the type sector 60 and the segment 53. The type sector 60 is pivotally connected to the upper end of a printer arm 62, rotatably mounted on a printer shaft 63. The printer arm 62 is normally locked in position by a printer release trigger 64, which, when rocked counter-clockwise, releases the printer arm and thereby permits it to be spring-urged clockwise by a spring 65 to drive the type sector 60 against the record material placed around a platen 66. After the type sector 60 has been positioned during the first half of the machine cycle and the leading frame bar 48 has completed it rearward movement, an aligner bar, not shown, is rocked into engagement with aligning notches formed on the lower end of the reducer arm segment 53, so as to align the segments and the printing sectors in their differential positions. After the printing operation is completed, the aligner bar is disengaged from the reducer arm aligning notches, thus permitting the racks and the type sectors to return to home position.

The forward portion of the carriage 11 of the accounting machine is supported on rolls 69, which are received within a groove formed in the I-bar 70. The rolls 69 are rotatably mounted on a vertical frame plate 71, which is secured to the vertical portion of an angle bar 72 by means of mounting posts and studs (not shown), said bar 72 being secured to the machine framework.

A series of carriage stops 73 are removably secured to an I-shaped stop bar 74, carried by the traveling carriage 11. The carriage stops 73 control the tabulating movement of the traveling carriage back and forth across the accounting machine, and also control various functions of the machine, including totalizer selection and operation.

The rear portion of the carriage 11 is supported for transverse sliding movement on the accounting machine frame by means of a tube 75, secured to the under side of a bar 76, which tube cooperates with a series of grooved rollers 77, which are rotatably secured to a rail 78, in turn secured to the machine framework.

Referring now to FIG. 3B, a factor-receiving and product storage and transfer device has been devised and attached to the rear of the accounting machine and operates to determine the respective longitudinal positions of the various amount racks whereby multiplicand and multiplier entries may be transferred to the multiplying unit and to a recorder. This device also operates to arrest movement of the racks, so as to position each in a predetermined one of its ten positions indicative of numerals "0" through "9," whereby the product of a multiplication is transferred to the accounting machine for printing or other utilization thereof.

With additional references of FIGS. 5–13, the factor-receiving and product storage and transfer device comprises a pair of outer side plates 90 and a pair of inner side plates 91. The outer side plates 90 are connected together by support bars 92 to 95 (FIG. 7), which bars are attached to the side plates 90 by means of screws 96. The side plates 90 and 91 are also connected together and held in place by a rod (not shown) extending across the lower rear portion of the device. The side plates 90 are attached to said last-named rod by means of screws 97. The side plates 90 and 91 are further connected together and held in place by transfer gear shaft 98, which is journaled into the side plates at both sides of the device. The inner side plates 91 are further connected together by a scan shaft 99.

A shaft 105 is attached to a support arm 106 which arm is secured to the outer side plate 90 on the right side of the device. The shaft 105 is adapted to be rotated in unison with the rotation of the main cam shaft 14 of the accounting machine by means of a belt 107. The support arm 106 is, in turn, attached to the outer side plate 90 by means of a screw 108.

The outer side plates 90 are attached at their top portions to plates 110 by screws 111, and the plates are attached to the top plate 112 of the accounting machine by means of a pair of screws 113. The outer side plates 90 are attached at their bottom portions to a plate 114 by screws 115, and the plates are attached to the base 58 of the accounting machine by means of screws 116.

The factor-receiving and product storage and transfer device further comprises seven solenoids and five sets of factor-receiving switches. The seven solenoids are the carriage position switch solenoid L102, the multiplicand solenoid L103, the multiplier solenoid L104, the check solenoid L105, the product solenoid L106, the scan solenoid L108, and the recorder solenoid L110.

The five sets of factor-receiving switches are the multiplicand switches 120, the multiplier switches 121, the check switches 122, the product switches 123, and the recorder switches 124.

The factor-receiving switches 120, 121, 122, and 124 read or take information out of the racks of the accounting machine, while the product switches 123 operate to put information in and control the positioning of the racks. The factor-receiving switches 120, 121, 122, and 124 are identical in construction except for the number of switches contained in each set. However, the linkages which connect these switches to their controlling solenoid vary with the position of the solenoid relative to the controlled set of switches.

Inasmuch as each of the switches 120, 121, 122, and 124 is identical with the other, a description of but a single set of rack-reading switches (i.e., multiplier switches 121), a portion of which is shown in FIGS. 8 and 9, is believed to suffice for the remaining ones. As shown, the multiplier switches 121 contain two separate parts. One part comprises a rectangular metal tray or basket 130, containing ten rows of switches, each row being composed of ten contacts. The metal tray 130 and its contacts form a memory unit which is adapted to be shifted upwardly or downwardly under control of the multiplicand solenoid L103. The other part of the multiplier switches 121 comprises ten rows of fixed complementary contacts mounted in a contact holder plate 131, of phenolic or other suitable insulating material, and this part is positioned directly opposite the contacts of the lower memory unit.

Each of the ten rows of contacts in the shiftable memory unit is arranged along the line of travel of a finger 132 (FIG. 6), projecting upwardly from an extension 125 of its corresponding rack. The extensions 125 of each of the racks of the accounting machine are supported for sliding movement on slotted bars 126, supported between the side plates of the factor-receiving and product storage and transfer device. When a rack assumes a position corresponding to a particular digit, the finger 132 assumes a position immediately under the contact in the row which is associated with the same digit.

The multiplier switches 121 are operated by the multiplier solenoid L104 through mechanical linkages. The multiplier solenoid L104 has a U-shaped armature 133, which is connected to a pitman 134. The multiplier solenoid L104, when energized, is adapted to pull the pitman 134 in a horizontal direction toward the rear of the device against the urging of a spring (not shown). The pitman 134 has therein a slotted portion 135, which is at an angle with the horizontal plane of the pitman. A knob 136, at the end of an arm 137, mounted on a shaft 138, rides in the slotted portion 135, and the knob 136 moves upwardly or downwardly as the pitman 134 moves horizontally. The resulting movement of the knob 136 causes the shaft 138 to turn counter-clockwise through a small arc.

The shaft 138 extends across the width of the device, and it has another arm 139 mounted thereon near its right end and an arm 140 mounted thereon near its left end. The ends of the arms 139 and 140 straddle studs 141 and 142, which extend from opposite ends of the shiftable memory unit of the multiplier switches 121.

When the multiplier solenoid L104 is energized, the shaft 138 is caused to be rotated counter-clockwise. As the shaft 138 turns through its arc, it causes the shiftable memory unit of the multiplier switches 121 to move downwardly toward the racks of the accounting machine. The finger, on a rack, associated with each row of contacts (finger 132, for example) pushes one of the switch keys 145 (FIG. 8), on which a selected one of the switch key contacts 146 is mounted, into an upwardly-extended position. The switch key and switch key contact to the right in FIG. 8 is shown in this extended position. As a switch key 145 moves upwardly, it moves its switch key retainer 147 out of the way. A switch key retainer 147 extends along all of the switch keys 145 in a row and operates to retain the switch keys in the extended position once a finger, on one of the racks, actuates them. As the actuated switch key actuates a switch key retainer 147 away from its normal position, any other of the switch keys 145 which happens to be in the upwardly-extending position is returned to its normal position by switch key springs 148, which exert their force on studs 149, which are attached to the switch keys 145. The springs 148 are stretched between or located by rods 150, which connect the side plates 151 and 152 of the tray 130 of the shiftable memory unit. Before the finger on the rack actuates a switch key and its associated contact to its extreme upward position, a shoulder 153 on the switch key passes beyond the switch key retainer 147. A switch key retainer spring 154 urges the retainer 147 underneath the shoulder 153, so that the retainer holds the switch key 145 and its associated contact 146 in the extended position.

For the multiplier switches 121, the contact holder plate 131 is provided with ten rows of equally-spaced, rectangularly-shaped slots 155. Each row consists of ten pairs of equally-spaced contacts 156, which are molded or "potted" in an electrically-non-conductive mounting block 157 and are fixedly secured therein. As shown in FIG. 8, each pair of contacts 156 are snapped in and held by one of the rectangular slots formed in the plate 131. Each of the ten pairs of contacts 156 of each row are positioned so as to be oriented perpendicularly to the direction of movement of its corresponding rack and spaced so that the position of each pair, with respect to another pair, corresponds to a different one of the ten digital positions of that particular amount rack.

The metal tray 130, which forms the memory unit of the multiplier switches 121, consists essentially of a substantially flat, rectangularly-shaped, horizontally disposed upper shelf plate 160 and a lower shelf plate 161. Each of these shelf plates has therein apertures through which the switch keys 145 pass in their upward and downward movements. The shelf plates are attached to the side plates 151 and 152 of the tray 130 to make up the memory unit. The upper shelf plate 160 has down-turned portions 162 at both ends thereof, and on said portions are mounted the studs 141 and 142. Just before each of the portions 162, the shelf plate 160 has therein an aperture 163, through which vertical guide shafts 164 project. The guide shafts 164 are attached to out-turned portions of the side plates 90 of the factor-receiving and product storage and transfer device. To the top surface of the shelf plate 160 at both ends thereof is attached an L-shaped member 165 by means of a pair of bolts 166. Each of the members 165 has an aperture 167 in its lower portion and another aperture 168 in its upper portion. The guide shafts 164 project through the apertures 167 and 168.

When the multiplier solenoid L104 deenergizes, a spring (not shown) will return the memory unit of the multiplier switches 121 to its normal, upward, position. As this occurs, an extended switch key contact 146 (the contact viewed to the right in FIG. 8 for example) will complete a circuit between the two sides of the associated switch contact 156. The unextended switch key contacts 146 will not mate with or touch their corresponding fixed contacts 156.

The tips of the switch contacts 156 (FIG. 8) are used as terminals. The terminals 170 on the right side of the block 157 in each row are associated with the digits of the multiplier, and each one of the terminals in a single row is associated with a different digit. These terminals 170 are connected to the digit lines forming an input cable 171 (FIG. 3B), which is connected to the multiplier ring in the multiplying device in a manner to be more fully described hereinafter. The digit line associated with a particular digit is connected to all the terminals in the multiplier switches 121 which are associated with the same digit. Thus, all the multiplier digit lines run parallel across the multiplier switches 121, and each digit line is connected to one terminal in every row of these switches. The terminals 172 on the left side of the block 157 in each row of switch contacts 156 are connected together to form the common side of the multiplier switches. These terminals are connected to the lines (one line 173 is shown in FIG. 3B) which are connected to the shift ring in the multiplying device in a manner to be more fully described hereinafter. When one of the switch key contacts 146 in the multiplier switches 121 is inserted into a row of fixed contacts 156, it connects the selected digit line to the common side of the switch in that row.

The multiplicand switches 120 comprise eight rows of switches, each row being composed of ten contacts. The recorder switches 124 comprise fourteen rows of switches, each row except row #14 being composed of ten contacts. Row #14 has thirteen contacts to register the months of the year. Each of the rows of the multiplicand switches 120 and recorder switches 124 is arranged along the line of travel of fingers 180 and 181, projecting upwardly from its corresponding rack, whereby the fingers respectively operate the switch key contacts of the shiftable memory units of these switches in a way similar to the manner in which the finger 132 operates the switch key 145 for the multiplier switches 121, as previously described.

The multiplicand switches 120 are operated by the multiplicand solenoid L103. The multiplicand solenoid L103 has a U-shaped armature 182, which is connected to a pitman 183. When energized, the multiplicand solenoid L103 is adapted to pull the pitman 183 in a horizontal direction toward the rear of the device against the urging of a spring (not shown). The pitman 183 has a slotted portion 184, in which a knob 185 rides. The knob 185 is attached to the end of an arm 186, which is mounted on a shaft 187. The knob 185 will move upwardly or downwardly as the pitman 183 moves horizontally. The resetting movement of the knob 185 causes the shaft 187 to turn counter-clockwise.

The shaft 187 has additional arms, 188 and 189, mounted thereon near each end thereof. The ends of these arms straddle studs 190 and 191, which extend from the memory unit of the multiplicand switches 120.

The recorder switches 124 are operated by the recorder solenoid L110, which also has a U-shaped armature 194, which is connected to a pitman 195. When energized, the recorder solenoid L110 is adapted to pull the pitman 195 in a horizontal direction against the urging of a spring (not shown), which spring is stretched between the pitman 195 and an arm 196, attached to the support bars 94 and 95. The pitman 195 has a slotted portion 197, in which a knob 198 rides. The knob 198 is attached to the end of an arm 199, which is mounted on a shaft 200. The knob 198 will move upwardly or downwardly as the pitman 195 moves horizontally. The resulting movement of the knob 198 causes the shaft 200 to turn counter-clockwise.

The shaft 200 has additional arms, 201 and 202, mounted thereon near each end thereof. The ends of these arms straddle the studs 203 and 204, which extend from the memory unit of the recorder switches.

The connections to the terminals of the multiplicand switch 120 and the recorder switch 124, respectively, are made in a way similar to the manner in which the connections were made to the terminal of the multiplier switches 121. Thus, the terminals on one side are connected to the digit lines forming input cables 205 and 206 for the multiplicand and recorder switches. The terminals on the other side form the common side of these switches. These terminals of the multiplicand switches 120 are connected to the lines (one digit line 207 is shown in FIG. 3B) which are connected to the Factor One Gates in the multiplying device in a manner to be more fully described hereinafter. These terminals of the recorder switches 124 are also connected to the lines (one line 208 is shown in FIG. 3B) which are connected to a suitable recorder when such a device is desired to be utilized with the multiplier apparatus.

From the foregoing description, it is clear that there are three groups of digit lines associated with the multiplier apparatus when a recorder is utilized in conjunction therewith.

The check switches 122 are not mounted as the multiplicand, multiplier, and recorder switches are—that is, on the top of the device—but are mounted on the under side of the device, directly underneath the multiplier switches 121, but on the opposite side of the racks. Mechanically, the check switches 122 operate in substantially the same manner as the other rack-reading switches. However, since the check switches are orientated differently with respect to the racks, the shiftable memory unit thereof rises to permit the switches to sense the positions of the racks and drops back to its normal position to enable the extended contacts to complete their connections.

The check switches 122 are operated by the check solenoid L105, which also has a U-shaped armature 212, which is connected to a pitman 213. When energized, the check solenoid L105 is adapted to pull the pitman 213 in a horizontal direction against the urging of a spring (not shown). The pitman 213 has a slotted portion 214, in which a knob 215 rides. The knob 215 is attached to the end of an arm (not shown) which is mounted on the shaft 216. The knob 215 will move upwardly or downwardly as the pitman 213 moves horizontally. The shaft 216 has an arm mounted thereon near each end thereof; for example, arm 217 in FIG. 6. The ends of the last-mentioned arms straddle studs which extend from the memory unit of the check switches 122; for example, stud 218 in FIG. 6.

The check switches 122 comprise ten rows of switches, each row being composed of ten contacts. Each of the rows is arranged along the line of travel of a finger 219 projecting downwardly from its corresponding rack. The finger 219 operates the switch key contacts of the shiftable memory unit of the check switches in a manner similar to the operation of the fingers 132, 180, and 181, for the other rack-reading switches previously described.

The connections to the terminals of the check switches 122 are not made as they were made to the terminals of the other rack-reading switches, since there are no digit lines associated with the check switches. The terminals on one side of a fixed contact row are individually connected to an associated accumulator bank by means of an input cable 221, while the terminals on the other side form the common side of these switches. These latter terminals are connected by means of an output cable 222 to the check amplifiers in the multiplying device for purposes which will be made clear when the checking feature of the present invention is explained hereinafter.

The check switches 122 operate simultaneously with the operation of the multiplier switches 121, and they store the same information as the multiplier switches.

The product storage means or product switches 123 position the racks in accordance with the product of a multiplication performed in the multiplying device. By means of the product switches, products are transferred from the accumulators of the multiplying device into the accounting machine.

There are ten product switches, one for each digit which may be transferred from the accumulators in the multiplying device to the accounting machine. There are thirteen accumulators, but three, which accumulate below the hundreds level, are used only to develop carry signals for the higher order accumulators.

Referring to FIGS. 10 to 13 in detail, each of the product switches 123 comprises a panel 225, on which a set of ten contacts, as 226, is imprinted, and a wiper 227. The panels 225 are fixedly positioned by being suspended from shafts 228 and 229, which shafts extend across the width of the product transfer device. The wiper 227 is rotatably secured to the scan shaft 99. The scan shaft 99 passes through an aperture centrally located in each of the panels.

On one side of each of the fixed panels 225, around the edge of the aperture therein, there is a continuous contact 230. Beyond the continuous contact and on the same side of each panel are the set of ten contacts, as 226, arranged in a circle. The eleven contacts have printed leads, as 231, extending to the bottom of the panel, where connections are then made through a suitable type of clip-on connector to the accumulators in the multiplying device by way of an input cable 232 (FIG. 6).

Each of the wipers 227 forms a double-ended spring contact (FIG. 13). An assembly comprising the wiper 227, a stop ratchet 233, a stop ratchet pinion 234, and a slip clutch 235 is associated with each one of the panels 225. The wiper 227 is insulated from other members of the assembly. The members of the assembly are joined together and mounted on the scan shaft 99 in such a manner that one end 236 of the wiper 227 engages the contact 230, and the other end 237 rides across the ten contacts, as 226, when the assembly rotates on the shaft 99.

The slip clutch 235 comprises two slip clutch arms 238 and 239, shaped to fit around opposite portions of the scan shaft 99. The arms 238 and 239 are held together rather loosely at one end by means of a screw 240, which also joins them to the rest of the members of the assembly. The slip clutch spring 241 is stretched between the other ends to pull the arms together, so that they clamp lightly around the scan shaft 99. The force exerted by the slip clutch 235 against the scan shaft 99 is just great enough to cause the assembly to rotate with the scan shaft without slipping when the assembly is not impeded.

The stop ratchet 233 is used to stop the assembly 227 from rotating with the scan shaft 99, when the rotating wiper 227 finds one of the fixed contacts, as 226, at the proper potential. When the foregoing occurs, a product magnet, as 242 (FIG. 6), which is associated with each of the assemblies, energizes a pawl 243 and causes the pawl 243 to be inserted between the teeth of the stop ratchet 233. The assembly will stop rotating at this point, and the slip clutch will slide on the surface of the still-rotating scan shaft 99.

As each one of the assemblies rotates, the rotating wiper 227 picks up the potentials appearing on the fixed contacts, as 226, and applies these potentials to the common continuous contact 230. When the wiper 227 picks up a potential of the proper magnitude, the associated product magnet, as 242, is energized, and the assembly will be stopped by the pawl 243 before the wiper 227 leaves the fixed contact which is at the proper potential.

For each of the ten rotatable assemblies of a product switch, a product magnet, 242, and a product transfer arm, as 244, are provided. The product magnets 242 are suitably attached to a support plate 245, which connects the side members 91 of the factor-entering and product transfer device together. The product magnets each have an armature 246, which operates to actuate the pawls 243, and also have a set of switches, 247. Each set 247 of switches comprises two switches, one switch, L111b, having contacts normally closed and the other switch, L111a, having contacts normally open. These latter switches are found in the control circuit of FIGS.

45 and 46, and their purpose and function will be made clear when the circuit of FIGS. 45 and 46 is described hereinafter.

Information passes from the rotating assembly of a product switch 123 to the racks in the accounting machine by means of a product transfer pinion 250 (FIG. 6). The pinion 250 is rotatably attached to the product transfer arm 244, which is, in turn, mounted on the transfer gear shaft 98 and a transfer arm shaft 251. The transfer arm shaft 251 extends between the inner side plates 91 of the factor-entering and product transfer device, and passes through spacers, as 252, which are press-fitted into the product transfer arms 244. The product transfer arm 244 pivots on the shaft 251. The transfer gear shaft 98 is straddled by the product transfer arm 244 and is mounted eccentrically, so that, as it turns, it causes the arm 244 to pivot on the shaft 98 through a small arc.

In one extreme position of the transfer arm 244, as shown in FIG. 6, the transfer pinion 250 is in mesh with the stop ratchet pinion 234. In the other position, the transfer pinion 250 is in mesh with one of the notches in the toothed portion, at 253, of each rack. When the product solenoid L106 is energized, it causes the transfer gear 254 on the transfer gear shaft 98 to turn. The eccentrically-mounted transfer gear shaft turns with the gear 254, causing all of the product transfer arms 244 to shift the product transfer pinions 234 into engagement with the racks. As the product transfer arms 244 shift, each one inserts fixed teeth 255 between the teeth of the stop ratchet pinions 234 to hold them in position until the product transfer pinions 250 are in engagement with them again.

The angular position of any of the wipers 227 at this point in the operation is determined by the governing digit in the last product computed by the multiplying device. The angular position of a stop ratchet pinion 234 depends upon the position of its associated wiper 227, since the two are joined together, and the angular position of a product transfer pinion 250 depends upon the position of the associated stop ratchet pinion 234, since these two gears are in engagement or mesh whenever the stop ratchet pinions rotate. Each of the stop ratchet pinions 234 is provided on its side with an extra tooth 256, which is fixed in relation to its other teeth but revolves alongside them. The angular position of this extra tooth 256 has, therefore, a definite relationship to the position of a rotating product switch wiper 227.

After the product transfer pinion 250 engages the toothed portion 253 of an associated rack, a spring (not shown) pulls the rack toward the rear of the device. As the rack moves rearwardly, the product transfer pinion 250 rotates until the extra tooth 256 on its side strikes a suitably-mounted rack stop 257, thereby limiting the travel of the rack. A rack stop 257 is provided for each of the racks. The rack is stopped in the position associated with the same digit as a product switch contact 226 on which the wiper 227 rests. For example, if the pinion 250 is in a position associated with the digit 5, the rack will travel to its digit 5 position before the tooth strikes its associated rack stop 257. Later in the operation, the rack is returned to the front of the device to its home position. As the racks return to their home positions, they return the product transfer pinions 250 to the positions in which they found them. Thus, when the product solenoid L106 is deenergized (at 300 degrees of the main cam line cycle), the product transfer pinions 250 drop out of mesh with the racks, and they reassume their original relationship with the stop ratchet pinions 234. The angular position of the tooth 256 on the side of the stop ratchet pinions 250 is in agreement with the angular position of the rotating product switch wiper 227.

When a product is in the racks, it may be transferred into the multiplicand switches 120 or the multiplier switches 121 in the manner described heretofore, but, if the product is transferred to the multiplicand switches 120, it is automatically divided by 100 in the process, because of the difference in the position of the decimal points for the product and the multiplicand. As the racks return to their home positions, a product therein may also be transferred to one of the accounting machine totals or may be printed.

The product solenoid L106 has an armature 260 (FIG. 3B), carrying a stud 261. The stud 261 is positioned in the slotted portion of an arm 262, which is rotatably mounted on a shaft 263. Attached to the arm 262 is a toothed crank arm 264, the teeth of which are in mesh with teeth on the transfer gear 254. Thus, energization of the product solenoid L106 will cause the transfer gear 254 to turn, causing the transfer of a product from the product switches 123 to the racks of the accounting machine.

Referring to FIGS. 3B and 4 in detail, the scan solenoid L108 (FIG. 3B) has an armature 267, which rides in a slotted portion 268 of a detent 269, which is pivotally supported on a shaft 270, attached to the side plate 91 on the right side of the factor-entering and product transfer device. A pawl 271 is also pivotally attached to the shaft 270.

There are provided on the shaft 99 a gear 272, a clutch plate 273, and a cam 274. The gear 272 and the clutch plate 273 are joined to each other, and the unit is free to rotate on the shaft 99. The cam 274 is fixedly secured to the shaft 99 and hence will rotate therewith. The cam 274 has a catch 275 pivotally connected thereto by a stud 276. A spring 277 is provided for urging a shoulder 278 on the lower part of the catch into engagement with shoulders 279 on the clutch plate 273. A spring 280 is provided for urging the detent 269 into engagement with the catch 275.

The pawl 271 has a roller 281 at one end thereof, which roller engages the edge surfaces of the cam 274. The lower end of the pawl 271 is adapted to operate the switch SC108.

A gear 282 is rotatably mounted on the shaft 105 and is rotated in synchronism with a gear 390 (FIG. 18) on the main cam shaft 14 by means of the belt 107. Another gear 283, rotatably mounted on the shaft 284, is provided to rotate the gear 272 and the clutch plate 273.

When the scan solenoid L108 is energized, the movement of its armature 267 causes the detent 269 to be withdrawn from engagement with the catch 275, thus allowing the spring 277 to pull in the catch 275, which engages the clutch plate 273. With the catch 275 and the clutch plate 273 engaged, the scan shaft 99 will rotate. When the scan solenoid L108 deenergizes, the detent 269 will be engaged with the catch 275, and the scan shaft will not be allowed to be rotated.

The switch SC108 is operated in one manner when the scan solenoid L108 is energized, as the roller 281, provided on the pawl 271, will be engaged with the high spot on the cam 274, while this switch is operated in another manner when the scan solenoid is deenergized. With the scan solenoid L108 deenergized, the roller 281 will be engaged with the low spot on the cam 274, as shown in FIGS. 3B and 4.

FIG. 14 is a side elevation of the left-hand bank of function control keys of the accounting machine, including the multiplicand key 26, the multiplier and multiply key 27, and the product key 28, which have been added thereto. These keys are supported for sliding movement in a vertical direction on a partition plate 286.

The partition plate 286 is attached to the framework of the accounting machine by means of a pair of long bolts, one shown at 287, which pass through suitable holes provided therefor in the partition plate and then screw into the left side frame of the machine. The partition plate 286 is attached by screws to a bracket 288, mounted on the machine base 58.

All the keys in the left-hand bank of function control keys are supported at their upper ends for sliding movement on the partition plate 286 by means of notches provided in a retaining strip 289, which is secured to the partition plate by means of screws 290. On the lower ends of the stems of the keys 26, 27, and 28, there are provided nylon insulators 291, which actuate the three switches SC101, SC102, and SC103 by cam action.

In the operation of transferring a product from the product switches 123 to the accounting machine, it is necessary to move the zero stop pawls 41 (FIG. 3A) so as to release the racks of the machine for rearward movement.

In adding or subtracting operations of the accounting machine, the zero stop pawls 41 are moved by depression of the amount keys.

Referring now to FIGS. 15 and 16, in total- and sub-total-taking operations, the key release slide 300 is moved toward the rear of the machine at the outset of the machine cycle, thereby causing a stud 301 on the slide to rock a shaft 302 clockwise, so as to cause a stud 303, mounted in each of the key release arms 304, to act against a cam face (not shown) provided in each of the control slides 39 (FIG. 3B), thereby moving the slides forwardly and releasing the zero stop pawls 41. At the same time, the studs 303 will cooperate with cam projections 305 on the latching slides 306 in the amount key banks, so as to release any amount keys which may have become accidentally depressed prior to the initiation of the total-taking cycle, and thereby prevent the square studs 36 (FIG. 3B) on the key stems from coacting with the shoulders 45 on the differential actuators 44 to stop the actuators in positions other than those dictated by the amounts standing on the totalizer wheels.

In total- and sub-total-taking operations, the key release slide 300 is operated by a key release latch 308. The latch 308 is pivotally mounted on a stud 309, mounted on the rear end of the slide 300. The rear end of the latch 308 is formed with a hook 310, which engages with a stud 311, mounted on a latch arm 312. Rotation of the main cam shaft 14 in the early part of the machine cycle will rock the latch arm 312 so as to move the stud 311 toward the rear of the machine and cause the key release slide 300 to be operated for the purpose mentioned above.

The key release latch 308 is normally disabled by movement of a selecting yoke 313, which is secured at either end thereof to a shaft 314. However, on a total-taking operation or on a sub-total-taking operation, the totalizer-selecting slides will be stopped with abutments thereof overlying the selecting yoke. The selecting yoke abutments prevent the yoke from raising to effect disablement of the key release latch 308.

A solenoid 315 is mounted on the left side of the machine by means of a bracket 316. The solenoid 315 has an armature 317, which, when the solenoid 315 is energized, prevents the selecting yoke 313 from rising to effect disablement of the key release latch 308. Hence, the differential actuators 44 will be released for rearward movement when a product is to be transferred from the product switches 123 to the accounting machine.

Referring now to FIG. 17, the accounting machine is provided with a "Main" motor bar 15, a "Skip" motor bar 16, and a "Vertical" motor bar 17, which motor bars are slidably mounted on studs 320 secured to the right side frame of the machine. In the case of the motor bars 16 and 17, an auxiliary slide 321 is slidably mounted on the studs 320 adjacent to the stems of the motor bars. Each slide is provided with a vertical slot 322, which cooperates with a stud secured in the stem of the associated motor bar 16 or 17. Each slide is normally maintained in its raised position, with this stud seated in the lower end of the slot 322, by means of a spring stretched between the slide 321 and a stud 324 secured to a latch 325 pivotally mounted on a stud 326 secured to the right side frame of the machine. In each instance, the latch 325 is adapted to cooperate with a notch 327, formed in the edges of the slides 321, to thereby retain the latter in their lower positions whenever their associated motor bars are manipulated. Hence, depression of either of the motor bars 16 or 17 will cause the slides associated therewith to be carried down and retained by the latches 325, while the motor bars themselves will be permitted to return to their raised, or normal, positions by means of restoring springs.

Each slide 321 is provided with a formed-over ear 328, which engages with a finished pad formed on the top edge of a substantially horizontal link 329. Similarly, the main motor bar 15 is provided with a formed-over ear 330, which engages with another finished pad provided on the upper edge of the link 329. The link 329 is carried by a pair of bell crank levers 331, which are pivotally mounted on studs secured to the side frame of the machine. The link 329 is pivotally connected at either end to one of the horizontally-extending arms of the bell crank levers, while the depending arms of these levers are connected together by a link (not shown), thereby causing parallel movement of the link 329.

Mounted on the link 329 is a stud 332, on which is pivotally mounted a pressure arm 333, which is provided with a finger, which is urged into engagement with a spring stud mounted on the link 329. The pressure arm 333 is provided with a bent-over ear 334, which lies above the left-hand end of a lever 335 pivotally mounted on a stud 336, secured to an auxiliary frame plate, said lever being urged clockwise about the stud 336 by means of a spring. The lever 335 carries a square stud 337, which cooperates with a notch 338, formed in the lower edge of a clutch control slide 339, supported for horizontal sliding movement on studs 340 and 341, mounted in the auxiliary frame plate. The slide 339 carries a stud 342, which is engaged within a bifurcation in the upper end of an arm 343, secured to a shaft 344. Hence, the slide 339 is constantly urged toward the front of the machine by means of a spring, but such movement is normally prevented by engagement of the square stud 337 with the rear end of the notch 338. Whenever any of the motor bars are depressed, however, the link 329 and the pressure arm 333 will be moved down, so as to cause the ear 334 to engage with the end of the lever 335 and move the square stud 337 out of engagement with the notch 338 on the slide 339, thereby permitting the latter member to be moved toward the front of the machine, under the influence of the spring. At the same time, a tripping arm 345 will be disengaged from an extension 346 of a clutch control arm 347, thereby causing the clutch to be engaged and the machine to be given a cycle of operation by the operating motor 13.

A hook 348 is pivotally connected at its lower end to the rear end of the lever 335. The hook is part of the mechanism for causing cycling of the main operating mechanism of the accounting machine in preselected columnar positions of the traveling paper carriage. Elevation of the hook 348 will cause the lever 335 to be rocked counter-clockwise, thereby releasing the clutch control slide 339 and permitting the main clutch to be engaged.

A notched wheel 349 may be engaged with the main cam shaft 14, so as to cause the shaft 14 to be given cycles of operation. The means for engaging the wheel 349 with the shaft 14 comprises a disc 350, having a stepped hub 351, which is pinned to the shaft 14. Loosely mounted on the step of the hub 351 is the clutch control arm 347, which is urged clockwise on the hub 351 by means of a spring 353, connected between the arm 347 and the disc 350. The arm 347 is normally prevented from clockwise rotation under the influence of the spring 353 by means of the tripping arm 345, the end of which cooperates with the extension 346 of the arm 347. The tripping arm 345 is secured to the left-hand end of a short shaft 355, which is rotatably mounted in the frame of the machine and may be caused to rotate clockwise, so as to release the arm 347 to the influence of the spring 353, under the control of the several motor bars of the machine and the automatic cycling operation control mechanisms.

The upper portion of the arm 347 is provided with gear teeth 356, which mesh with corresponding gear teeth formed on a headed portion 357 of a clutch dog 358, journaled in the disc 350 near its periphery. The clutch dog 358 passes through the disc 350 and projects into the path of a series of notches 359, provided around the periphery of the wheel 349. The under side of the clutch dog 358 is flattened, so that it will clear the wheel 349 and the notches 359 when the dog is in the position shown in FIG. 17. However, when the tripping arm 345 is moved away from the extension 346, the arm 347 will be rotated clockwise under the influence of the spring 353, and the clutch dog 358 will be rotated counter-clockwise, so as to cause the left-hand edge of a stud to engage with one of the notches 359 of the constantly-rotating wheel 349, thereby causing the disc 350 and the main cam shaft 14 to be rotated clockwise, as viewed in FIG. 17. The clutch control arm 347 is limited in its movement on the hub 351 by means of shoulders 360 on the arm 347, which shoulders cooperate with the sides of the headed portion 357 formed on the clutch dog 358.

Secured to the shaft 355 is a two-armed lever 361, the forwardly-extending arm of which is bifurcated and engages with a stud 362, located in the lower end of a lever 363. The lever 363 is secured to the right-hand end of the shaft 344. The lever 363 and the shaft 344 are urged counter-clockwise by means of a spring (not shown). This spring constantly tends to move the tripping arm 345 clockwise out of engagement with the extension 346, so as to engage the clutch and cause the main cam shaft 14 to be rotated clockwise, as viewed from the right-hand side of the machine.

Secured to the right-hand end of the shaft 355 is an arm 365, which is caused to rotate clockwise in unison with the rotation of the tripping arm 345. The arm 365 carries an insulated member 366, which bears against an insulated stud 367, carried by the upper leaf 368 of a trip switch SC105. The lower leaf 370 of the trip switch SC105 carries an insulated stud 371 at its end.

The trip switch SC105 is supported in the machine on one side of a support plate 372. The other side of the support plate 372 carries a trip solenoid L101. The trip solenoid L101 has an armature 374, the end of which is secured to an operating lever 375. The lever 375 is pivotally attached to the support plate 372 by means of a stud 376 and is caused to rotate counter-clockwise when the trip solenoid L101 is energized. Also secured to the support plate 372 by means of a stud 377 is an interfering lever 378, which engages a stud 379 in the operating lever 375. The interfering lever 378 is urged clockwise by the stud 379 when the operating lever 375 is rotated upon energization of the trip solenoid L101. In FIG. 17, the trip solenoid L101 is not energized, and so the interfering lever 378 is in a blocking position, preventing substantial clockwise movement of the arm 365, thus preventing disengagement of the tripping arm 345 from the extension 346 of the clutch control arm 347 and engagement of the clutch. The operating lever 375 is urged clockwise by a spring 380, stretched between a stud on the armature 374 and a stud 381 on the support plate 372. The interfering lever 378 is urged counter-clockwise by a spring 382, stretched between a stud 383 on the lever 378 and the stud 381.

When the motor bars 15, 16, or 17 are depressed, or when the machine is automatically cycled, the arm 365 will move slightly clockwise until blocked by the interfering lever 378. This movement will cause the contacts of the trip switch SC105 to close. Upon energization of the trip solenoid L101, the interfering lever 378 will be rotated from its blocking position relative to the arm 365. With the interfering lever 378 thus rotated, the arm 365 and the tripping arm 345 will be free to rotate to allow the clutch to be engaged. When the main cam shaft 14 is rotated through the 35-degree point in its cycle of operation, a cam 384, mounted on the cam shaft 14, will engage the stud 371 on the lower leaf of the trip switch SC105 and cause the contacts of the trip switch to open. Opening of the trip switch SC105 will cause the trip solenoid L101 to be de-energized. The spring 382 will return the interfering lever 378 into engagement with the lower end of the arm 365, but the interfering lever 378 will not re-assume its blocking position until the clutch is restored to its disengaged condition, wherein the tripping arm 345 is engaged with the extension 346 of the arm 347.

Referring now to FIGS. 18 and 19, the main cam shaft 14 has the gear 390 rotatably mounted thereon, and is supported at the left under side of the accounting machine by a bracket 391, attached to the base 58 by a pair of screws 392. In front of the cam shaft 14, there is provided a gear 393, supported on a short shaft 394 by means of a bracket 395. In front of the gear 393, there is provided another gear 396, supported on another shaft 397.

The shaft 397 is provided with five cams 398 to 402, fixedly secured thereto by means of a pair of screws 403. The cams 398 to 402 are suitably separated from each other by spacers 404. The shaft 397 is supported adjacent to the base 58 by means of the bracket 395.

The bracket 395 also supports two groups of switches, 405 and 406. The first group, 405, comprises the multiplicand cam switch SC107a, the multiplier cam switch SC110a, the check cam switch SC111a, the recorder cam switch SC112a, the start cam switch SC114a, and the carriage position switch cam switch SC116a. The second group, 406, comprises the product cam switch SC113a and the multiply cam switch SC117a. The function of the above switches will be clearly explained when the control circuits of the multiplier apparatus are described hereinafter.

The switches SC107a, SC110a, SC111a, and SC112a are associated with a roller 407, which roller cooperates with the cam 398 to effect operation of these switches. The switch SC114a is associated with a roller (not shown) which cooperates with the cam 400, and the switch SC116a is associated with a roller (not shown) which cooperates with the cam 399.

The switch SC113a is associated with a roller (not shown), and the switch SC117a is associated with a roller 408. These rollers cooperate with the cams 401 and 402, respectively, to effect operation of these switches.

As explained at the beginning of this specification, operation of the multiplier device is controlled by the traveling carriage in preselected columnar positions thereof, so as to permit the arranging of various programs adaptable to different business systems. A carriage position switch mechanism is arranged at the back of the traveling carriage, and said switch mechanism is operated or controlled by adjustable stops located on the rear form bar or stop bar at the rear of the carriage to be effective in preselected columnar positions of the traveling carriage, for completing circuits to operate the multiplying device. The manner is which these switches exert their control will be explained fully when the control circuit of FIGS. 45 and 46 is explained hereinafter.

The carriage position switch mechanism is similar in many respects to the mechanism fully disclosed in co-pending United States patent application Serial No. 567,411, of Edgar H. Sonnanstine, Jr., filed on February 23, 1956, now United States Patent No. 2,905,244, issued on September 22, 1959. Hence, only so much of the carriage position switch mechanism as is needed for a complete understanding of the present invention will be described herein.

Directing attention to FIGS. 20 and 21, a rear form or stop bar 410 is removably mounted on brackets (not shown) secured to the framework of the traveling carriage at the rear thereof, in a manner similar to that in which the form or stop bar 74 is attached to the front of the traveling carriage. The bar 410 extends substantially the full width of the traveling carriage and has in its rear face slots arranged to receive screws 411, which serve to adjustably mount a series of switch-operating stops or plates 412 (FIG. 21) along said bar in predetermined columnar positions, to agree with the business system to which the machine is being applied.

The stops or plates 412 are divided into upper and lower sections, each having ten holes arranged to accommodate a switch-operating stud 413, said stud arranged to cooperate with corresponding switch plungers 414. The stops 412 have, on their upper edges, a rearwardly-extending ear 415, which serves to indicate that an electrical operation (multiplication recording, etc.) is to occur at the columnar position where a stop is located. The stops 412 also have, on their lower edges, a rearwardly-extending ear 416, which serves to cause the multiplier apparatus to transfer a product from the product switches 123 to the accounting machine. An operating stud 413 positioned in hole #13 in a stop 412 will initiate the record operation when a recorder is to be operated in conjunction with the multiplier apparatus; a stud in hole #18 will initiate the multiply operation; a stud in hole #14 will cause the multiplier to be entered into the multiplier switches 121; and a stud in hole #15 will cause the multiplicand to be entered into the multiplicand switches 120. The remaining holes in a stop are provided in the event that other functions may be desired.

The plungers 414 are slidably mounted in a shiftable framework. Each of the plungers has an enlarged rearward end with parallel surfaces which fit snugly between rods 417, while the forward ends of said plungers are slotted to snugly embrace a rod 418, said rods 417 and 418 extending between an upper switch frame plate (not shown) and a lower switch frame plate 419 to form a shiftable framework for supporting the plungers 414. The enlarged rear ends of the plungers 414 fit snugly in corresponding annular grooves in the rods 417, and the slotted forward ends of the plungers fit snugly in corresponding annular grooves in the rod 418 to properly side-space the plungers. The switch plunger supporting framework is shiftably mounted, by means of the left-hand edges of the upper and lower switch frame plates, in cooperation with corresponding annular grooves in a guide plate 420, and by means of slots 421 in the right-hand forward edges of the switch frame plates, in cooperation with corresponding annular grooves in a stud 422 and a guide plate 423. The guide plates 420 and 423 and the stud 422 are secured in a switch assembly support plate 424, the forward edge of which is secured to a plate 425 and rearward extensions of which are secured to a support plate 426, positioned across the width of the accounting machine.

Each of the plungers 414 is urged inwardly by a spring (not shown) to normally maintain the bottom of the slot in its inner end in yielding engagement with the rod 418. The plungers 414 are retained in displaced position by two retaining pawls 427, mounted opposite each other on studs 428, extending between the upper and lower switch frame plates. The pawls are urged inwardly by corresponding torsion springs (not shown) to normally maintain their teeth in yielding engagement with two similar retaining projections 441, formed opposite each other on each of the plungers 414. Each of the plungers 414 has a block 429, of suitable insulating material, integral with its outer and rearward ends, for engaging the corresponding contact blades 430 and 431 of the carriage position switch SC140, and moving said contact blades thereof into engagement with companion blades 432 and 433 to complete circuits for controlling the operation of the multiplying device and the recorder in accordance with the studs 413 positioned in the stops 412. The contact blades 430 to 433 inclusive are mounted in an upwardly-extending portion of a bracket 434, secured to the upper surface of the plate 424.

The carriage position switch SC140 comprises twenty sets of normally-open contact blades. The contact blades select electrical functions which vary with the position of the carriage 11. The contact blades are controlled indirectly by the studs 413 in the stop plate 412. The stops 412 are positioned along the rear form bar 410 so that one stop is opposite the carriage position switch SC140 at each position of the carriage where an electrical operation is to occur.

The plate 419 carries a stud 436, freely engaged by a hole in the inner end of an arm 437, secured on a vertical shaft 438, rotatably supported in a bushing secured in the plate 424. Also secured on the shaft 438 is a crank 439, connected by a link 440 to an arm 435 (FIGS. 5 and 7), attached to the armature 442 of the carriage position switch solenoid L102. The solenoid L102 serves to impart inward and outward shifting movement to the shiftable framework comprising the plungers 414.

An upper stop switch assembly SC141, comprising two switches, SC141a and SC141c, is mounted in a bracket 447 attached to the switch assembly support plate 424 by means of screws 448. The switch assembly SC141 is arranged to be actuated by a lever 449, pivotally mounted on the support plate 424 by means of a stud 450. To the rear end of the lever 449 is attached an arm 451, of suitable insulating material, for actuating the switch assembly SC141. The lever 449 is normally urged clockwise by a spring 452, stretched from said lever to the guide plate 423. The forward end of the lever 449 has a slotted portion, which snugly embraces the rod 418 and has an annular ring 453, of suitable plastic material, adapted to engage with the upper ear 415 on a stop 412.

Whenever the accounting machine carriage 11 assumes a position at which an electrical operation (multiplication or recording, or both, for example) is to occur, the ring 453 will sense the presence of the upper ear 415 on the stop 412. The rear end of the lever 449 will be rotated counter-clockwise, and the arm 451, attached thereto, will actuate the switches SC141a and SC141c of the switch assembly SC141, which will partially complete the energizing path to the carriage position switch solenoid L102.

At eighty degrees of the cycle of the main cam shaft 14, the carriage position cam switch SC116a will close, and the solenoid L102 will be energized. The solenoid L102 will operate to move the shiftable framework against the stop 412, so that studs 413 therein actuate or displace corresponding plungers 414. At 115 degrees of the cycle of the main cam shaft 14, the cam switch SC116a will open, causing the solenoid L102 to be deenergized. When the solenoid L102 is deenergized, a spring (not shown) will return the shiftable framework to a position next to the bank of normally-open contact blades which make up the carriage position switch assembly SC140. The plungers 414 which the studs 413 actuated will now extend into the bank of contact blades of the carriage position switch assembly SC140, so that their insulated ends close the corresponding contact blades. Accordingly, the positions of the studs 413 in a stop plate 412 determine which sets of contact blades are to be closed at a particular position of the carriage 11, and the studs 413 in a subsequent stop plate 412 may be set up to close different sets of contact blades of the carriage position switch assembly SC140.

A lower stop switch assembly SC106, comprising two switches, SC106a and SC106b, is mounted on a bracket 457, attached to the switch assembly support plate 424 by means of screws 458. The switch assembly is arranged to be actuated by a lever 459, pivotally mounted on the support plate 424 by means of a stud 460. To the rear end of the lever 459 is attached a block of suitable insulating material 461 for actuating the switch assembly SC106. The lever 459 is normally urged counter-clockwise by a spring 462, stretched from said lever to the guide plate 420. The forward end of the lever 459 is similar in form to the forward end of the lever 449 and has a slotted portion, which snugly embraces the rod 418. The forward end of the lever 459 has an annular ring, of suitable elastic material, adapted to engage with the lower ear 416 on a stop 412.

Whenever the accounting machine carriage 11 assumes a position at which a product is to be transferred from the product switches 123 to the accounting machine, the annular ring on the lever 459 will sense the presence of the lower ear 416 on the stop 412. The rear end of the lever 459 will be rotated clockwise, and the block 461, attached thereto, will actuate the switch SC106a of the switch assembly SC106, which will partially complete the energizing path to the product solenoid L106. A subsequent energization of the product solenoid L106, upon closing of the product cam switch SC113a, will effect the transfer of the product to the accounting machine in a manner which will be explained in detail when the control circuits of FIGS. 45 and 46 are described and explained. Also, the contacts of switch assembly SC140 which are selectively closed by the shiftable framework of the carriage position switch mechanism are shown in FIGS. 45 and 46. The manner in which they exert control will be explained in detail when these control circuits are described.

A pawl-disengaging plate 463 and a plate control pawl 464 are provided in the shiftable framework to assist in the disengagement of the retaining pawls 427 in the manner set forth in detail in the co-pending application Serial No. 567,411, now Patent No. 2,905,244, previously referred to.

*General Description of Multiplying Device (FIGS. 21, 22, and 23)*

The multiplying device or product-computing portion of the multiplier apparatus commences a multiplying operation when it receives a multiplication-initiating signal from the accounting machine portion of the multiplier apparatus. The factors of a multiplication problem are transmitted from the multiplicand and multiplier switches 120 and 121 to the multiplying device. The multiplying device then performs, in sequence, a multiplication operation, which comprises computation of the product of the factors, and a checking operation, which comprises checking of the computed product. After the multiplication operation, the product is transferred to the product switches, and, after the checking operation has been completed successfully, the accounting machine is released for further operation.

If the multiplying device cannot perform the multiplication and checking operations successfully within a predetermined time, it will perform these operations over again continuously until they are completed successfully or until an operator releases the accounting machine.

In the embodiment of the invention shown and described, the accounting machine portion of the multiplier apparatus has a single keyboard. The multiplicand has a maximum of three digits to the left of the decimal point and a maximum of five digits to the right. The multiplier has a maximum of eight digits to the left of the decimal point and a maximum of two digits to the right. The product has a maximum of eight digits to the left of the decimal point and a maximum of five digits to the right. The three digits of the extreme right positions of the product are not printed, nor do they transfer. The digits found in these extreme right positions are accumulated for the purpose of developing carry signals.

In the embodiment of the invention shown and described, the multiplying device will operate with a multiplier with a maximum of ten digits and a multiplicand with a maximum of eight digits. However, the multiplier and the multiplicand together must not have a total of more than eight digits to the left of their decimal points in any given problem.

Since the multiplicand may have as many as five places to the right of the decimal point and the multiplier may have as many as two places, the correct product could have as many as seven digits to the right of the decimal point. The multiplying device has only five product accumulator stages, which form the digits to the right of the decimal point. Because the multiplying device does not form digits or develop carry signals in the sixth and seventh decimal positions of the product, there is a possibility of error. This error, however, has a maximum value of 0.0001701, and, in many products, its value is equal to zero. The product is normally read out of the accumulator only to the second decimal place and is rounded off to the nearest half-cent; therefore even the maximum error is negligible and will not affect the operation of the novel checking means disclosed herein. Therefore, the checking operation may be accomplished successfully regardless of the above possible error.

The multiplying device, in solving a multiplication problem, enters the multiplicand in a group of columns as many times as indicated by the last digit of the multiplier. It then shifts one column to the left and enters the multiplicand as many times as indicated by the second-to-last digit of the multiplier. The multiplying device repeats the process for each digit in the multiplier, shifting one column to the left each time it starts on another digit. It is believed that the operation of the multiplying device in solving a multiplication problem will be clear from the following problem, arranged in the familiar arithmetical pattern:

```
    21.32  Multiplicand
      302  Multiplier
    ─────
     2132
     2132
     0000
     2132
     2132
     2132
    ─────
  6438.64  Product
```

However, since the multiplying device is an electronic device, it does not actually work with printed digits arranged in columns. Instead, the multiplying device translates each digit of the multiplicand into a corresponding number of pulses directed down a separate electrical path. A pulse group representing the multiplicand, in the example above, would consist of two pulses directed down one path, one pulse directed down the next path, three pulses directed down the next path, and two pulses down the following path. As the electronic counterpart of the columns in the above example, the multiplying device uses a plurality of accumulator stages which keep continual count of the pulses which they receive.

When the multiplying device is performing a multiplication, it transmits a series of pulse groups representing the multiplicand down the pulse paths. The pulse paths are each terminated by a separate accumulator stage. Meanwhile, the counting device or shift ring into which the multiplier is set counts the pulse groups. When a number of pulse groups equal to the last digit of the multiplier has been transmitted down the paths, the shift ring reacts by shifting the connections between the paths in the accumulator stages, so that each path is now terminated by a different accumulator stage, the accumulator stage corresponding to the "column to the left."

The above multiplying step is then repeated until the shift ring counts a number of pulse groups equal to the second-to-last digit of the multiplier. Then the shift ring shifts the connections again, so that, in effect, the multiplicand is now being entered two columns to the left of the first entry.

The multiplying step is repeated for each digit in the multiplier, and then no more pulses are fed to the accumulator stages. The total in the accumulator at this point is the product of the multiplicand and the multiplier.

The operation of the multiplying device can now be explained in terms of the functions of its various circuits. FIGS. 22 to 24 together form a block diagram which shows the relationship of the circuits of the multiplying device to each other. The blocks of FIGS. 22 to 24 make reference to additional figures of the drawings which will be described hereinafter.

Referring now to FIGS. 22 to 24 inclusive, the master pulse generator 500 develops 0° pulses occurring at a frequency of 10,000 pulses per second when operating potential is applied to it from the control circuit 501. The generator 500 also develops 180° pulses in association with the 180° pulse amplifier 502. The 180° pulses also occur at a frequency of 10,000 pulses per second. These pulses are so designated to indicate that they occur between consecutive 0° pulses.

The 0° pulses are the primary signals used in the multiplying device. The 180° pulses are used only when it is desired to feed a pulse from a second source to an accumulator stage. If two 0° pulses were fed simultaneously from two different sources to a single accumulator stage, this accumulator stage would count only one. However, if the second source applies only 180° pulses, then pulses from the two sources will not coincide.

The multiplicand or factor I ring 503 is part of the circuit which translates each digit of the multiplicand into a number of pulses equal to the value of the digit. However, except for the tally pulse, the output of the multiplicand ring 503 does not consist in pulses, but rather consists in nine positive voltages which are sustained for different lengths of time and are applied to the nine digit output lines of the multiplicand ring.

The longest time voltage is nine time units long and is applied to a digit line corresponding to the digit 9. The next longest is eight time units long and is applied to the digit line corresponding to the digit 8. The other voltages generated are seven, six, five, four, three, two, and one units long and are applied to the corresponding digit lines. The multiplicand ring 503 generates these voltages in sequence, so that all nine voltages end simultaneously. In other words, the voltage which is nine time units long is developed first. One time unit later, the voltage which is eight time units long is developed. The remaining voltages are developed one at a time, one time unit apart. One time unit after the last voltage is developed, they are all terminated simultaneously, and a tally pulse is applied to a tenth digit output lead.

The multiplicand ring 503 comprises eleven two-grid thyratrons. Both of the grids of each thyratron must be positive simultaneously to permit current flow to start. These tubes are connected in a series, so that one grid of each tube but the first is positive only when the preceding tube is conducting. When this grid turns positive, the tube is designated as being primed. The positive 0° pulses are applied to the second grid in all eleven tubes of the multiplicand ring.

When the multiplying device begins operation, the first 0° pulse is applied through contacts of a relay in the control circuit 504 to the second control grid of the constantly-primed first tube in the multiplicand ring 503. This first 0° pulse causes the first tube of the multiplicand ring 503 to conduct. The first 0° pulse is also applied to the second control grid of the remaining tubes in the multiplicand ring 503, but it does not cause them to conduct, since they are not primed at this time.

At the cathode of the first tube of the multiplicand ring 503, there is developed a positive voltage as that tube conducts. This voltage is applied as a priming voltage to the first control grid of the second tube in the multiplicand ring 503. As a result, when the next 0° pulse is applied to the second control grids of all the tubes in the multiplicand ring 503, only the second tube will conduct in response thereto. None of the other tubes of the multiplicand ring 503 will be caused to become conductive in response to this next 0° pulse, because the first tube has already been made to conduct, and the rest of the tubes are not primed.

As the second tube of the multiplicand ring 503 conducts in response to the 0° pulse, a positive voltage is developed at its cathode and is applied as a priming voltage to the first control grid of the third tube in the ring. This voltage is also applied to the output digit line of the multiplicand ring 503 which is associated with the digit 9.

Each of the cathodes of the next eight tubes of the multiplicand ring 503 is connected so as to prime the succeeding tube and also apply a positive voltage to one of the output digit lines of the ring. The output digit lines are connected to the cathodes of the tubes of the multiplicand ring 503 in descending order; that is, the digit 9 line is connected to the cathode of the second tube, the digit 8 line is connected to the cathode of the third tube, and so on.

As each tube of the multiplicand ring 503 is made to conduct, a positive voltage appears on the output digit lines of the ring. After a tube is made to conduct, it will continue to conduct while the succeeding tubes are being made to conduct, so that the positive voltage will remain on the corresponding output digit line during this time. After the second-to-last tube of the multiplicand ring 503 is made to conduct, the next 0° pulse will cause the tally tube to conduct. The tally tube will apply a pulse to the blowout circuit 505 through the blowout input mixers 506. The blowout circuit 505 functions to remove the positive voltage from the plates of all the tubes in the multiplicand ring 503, thereby cutting off the tubes of the ring. With the tubes of the multiplicand ring 503 rendered non-conductive, the positive voltage is removed from all of the output digit lines of the ring.

It may be seen from the above description that the basic time unit in the multiplicand circuit is the interval between the start of one 0° pulse and the start of the succeeding 0° pulse. Since the second tube of the multiplicand ring 503 continues to conduct while the other tubes are being fired in sequence, this tube holds the output digit 9 line positive for a period nine time units long. The other digit lines are held positive for a number of time units equal to the magnitude of the represented digit.

Once the sequence described above begins, it is repeated continuously, and timed signals are applied to the digit lines one after another until the multiplication operation is completed.

The eight multiplicand switches 120 are mounted at the rear of the accounting machine, as described previously. These eight switches correspond to the eight places in the largest number acceptacle as the multiplicand. Three of these places occur to the left of the decimal point, and five to the right.

Each of the multiplicand switches 120 incorporates ten pairs of normally open contacts, with one contact of each pair connected to a common line. The ten opposing contacts are each associated with a different digit, and each is connected to a different digit line. The digit is entered into a multiplicand switch 120 by closing the contact pair connecting the corresponding digit line and the common line.

Normally, the multiplicand is entered into the multiplicand switches 120 through the accounting machine keyboard. The multiplicand may also be obtained from one of the totals in the accounting machine, or it may be taken out of the product switches 123; but, whatever may be the source for the multiplicand, it is entered into the multiplicand switches 120 through the rack extensions 125 of the accounting machine. As each rack of the accounting machine assumes a position corresponding to a particular digit, a finger 180 (FIG. 6) assumes a position under a row of contacts of the multiplicand switches 120. As the accounting machine proceeds through its cycle of operation, the contacts of the multiplicand switches 120 are lowered, and the fingers 180 push one of the switch keys 145 (FIG. 8) in each row of multiplicand switches into an extended position, releasing any other extended switch keys in the process. In each row, the extended switch key 145 is associated with the digit which determines the position of the corresponding rack extension 125. Later on in the accounting machine cycle of operation, the switch keys 145 are raised away from the rack extensions 125. As the switch keys 145 are raised, the extended ones complete connections between selected digit lines and the common sides of the multiplicand switches 120.

When the multiplying device is performing a multiplication, the timed signals developed in the multiplicand ring 503 are applied to the digit lines. The multiplicand switches 120 select the timed signal whose length corresponds to the settings of this switch. For example, if a multiplicand switch is set in the digit 4 position, the positive voltage applied through the switch to the common line is four time units long. The common line applies the selected signal to one of the multiplicand or factor I gates 507.

The multiplicand gates 507 comprise eight identical circuits, each designed around half a double triode tube. Each circuit corresponds to a different one of the eight places in which digits may occur in the multiplicand. The multiplicand switches 120 are also associated with the eight places of the multiplicand, so each multiplicand gate is associated with a particular one of the multiplicand switches. The common line of a multiplicand switch 120 and the control grid of an associated triode of the multiplicand gates 507 are connected together, so that the timed signal selected by a multiplicand switch is applied to the control grid of the triode.

The triode tubes of the multiplicand gates 507 are biased by a constant negative voltage applied to their control grids. The signals applied to the control grids of the triodes are superimposed on this bias voltage.

The bias voltage applied to the control grids of the triodes of the multiplicand gates 507 is well below the cut-off point. As a result, neither the timed signals nor the 0° pulses, when applied separately, are sufficiently positive to cause the triode tubes to conduct. However, when a timed signal and a pulse are applied to the grid of a biased triode simultaneously, the two positive voltages add together and override the negative bias. As a result, a current pulse passes through the tube. As pointed out heretofore, the timed signal lasts for a number of time units equal to the magnitude of the represented digit. Since the time units are measured from the beginning of one zero degree pulse to the beginning of the next, the signal lasts long enough to allow a number of pulses equal to the number of time units to pass into the output of the multiplicand gates 507.

In the example used heretofore, the multiplicand is the number 21.32. If this number is set in the multiplicand switches 120 and the multiplying device then begins to perform a multiplication, timed signals with lengths corresponding to the four digits are applied to the control grids of four of the triodes of the gates 507. Each time the multiplicand ring 503 goes through one complete cycle, the hundredths triode passes two pulses, the tenths triode passes three pulses, the units triode passes one pulse, and the tens triode passes two pulses. These pulses constitute one pulse group.

The pulse outputs of the different triodes of the multiplicand gates 507 are transmitted down different paths through the shift matrix 508 to the accumulators 509. The shift matrix 508 directs the multiplicand gate pulses to the accumulator 509 under the control of the multiplier circuits in the multiplying device.

Accordingly, the function of the multiplicand circuits is to produce a series of pulse groups with the pulses of each group distributed among a number of paths, so as to represent the digits of the multiplicand. The function of the multiplier circuits is to direct the pulses of these groups to the proper stages of the accumulator 509 through the shift matrix 508.

The multiplier circuits count the number of pulse groups fed through the shift matrix 508 to the accumulator 509, and, when that number is equal to the magnitude of the last digit of the multiplier, the multiplier circuits trigger a shifting operation. This procedure is repeated for each digit of the multiplier in sequence from the last to the first.

The multiplier circuits are composed of the multiplier ring 510, the multiplier switches 121, and the shift ring 511. The multiplier ring 510 counts the multiplicand pulse groups. The multiplier switches 121 register the digits of the multiplier. The digits of the multiplier are imposed one after another from the last to the first as limits on the counting of the multiplier ring 510. Whenever the multiplier ring 510 counts up to the value of the digit set into the governing multiplier switch, that switch applies a signal voltage to the shift ring 511. The shift ring 511 causes the shift matrix 508 to feed the multiplicand pulses applied to each particular input lead to the next higher accumulator stage every time the multiplier ring 510 counts up to the limit imposed by the digit in the governing multiplier switch. The shift ring 511 also resets the multiplier ring 510, so that it starts to count up to the value of the digit in the next governing switch of the multiplier switches 121.

The multiplier ring 510, like the multiplicand ring 503, comprises a number of thyratron tubes connected to fire in sequence. Each tube in the series has two control grids, and both must be positive at the same time to permit the tube to fire. In all the tubes but the first in the first in the series, one control grid is made positive as the preceding tube fires. When this control grid is positive, the tube is considered to be primed. The first tube of the multiplier ring 510 is constantly primed.

The tally pulses from the multiplicand ring 503 are applied to the other control grids of all the tubes of the multiplier ring 510. The first tally pulse in a series fires the first tube, and the firing of this tube primes the second tube. The second tally pulse fires the second tube, and this firing primes the third. Once a tube is fired, its control grids lose control over current flow. The tubes continue to conduct as the firing process goes on, until the blowout circuit 512 removes the voltage from the tube plates and cuts off current flow through all the tubes in the multiplier ring 510.

Therefore, the function of the multiplier ring 510 is to count the number of times the pulse group representing the multiplicand is transmitted through the shift matrix 508 to the accumulator 509. Each tally pulse indicates that one such group has been transmitted into the shift matrix. Since each tally pulse fires one tube of the multiplier ring 510, the number of tubes fired corresponds to the number of pulse groups in a series. When the number of tubes fired reaches the limit imposed by the digits set in the governing one of the multiplier switches 121, all the tubes in the ring are extinguished, and it starts counting up to the next digit.

The multiplier switches 121 are mounted in the rear of the accounting machine, as described heretofore. Physically, they are identical to the multiplicand switches 120, and they are operated in the same manner by the accounting machine rack extensions 125.

The multiplier switches 121 comprise ten switches which are connected between the multiplier ring 510 and the shift ring 511.

Using the number 302 as used heretofore as an example for the multiplier, the number two contacts of the units switch associated with the fifth tube of the shift ring 511 would be closed along with the zero contacts of the tens switch associated with the sixth tube, and the number three contacts of the hundreds switch associated with the seventh tube.

Now assume that the tubes of the shift ring 511 corresponding to the decimal places of the multiplier have all fired in sequence and the fifth tube of the shift ring has been primed by the application of a positive signal to it. With the fifth tube primed, the generation of the multiplicand pulse group is delayed for a brief interval. During this interval, the output of the ×0 (times zero) amplifier 513, a positive voltage, is applied to the digit zero contacts of each of the multiplier switches. Since the digit zero contacts in the tens switch would be closed, the voltage is applied to the sixth tube of the shift ring 511. However, the sixth tube will not be primed, so it will not conduct.

As the first multiplicand pulse group is generated, a tally pulse from the multiplicand ring 503 is applied to the multiplier ring 510, causing the positive voltage to appear on the output line of the multiplier ring associated with the digit 1. This positive voltage is applied to the contact in each of the multiplier switches 121 which is associated with the digit 1. All of these digit 1 contacts will be open, so the positive voltage will not be applied to any of the tubes of the shift ring 511.

As the next multiplicand pulse group is generated, a tally pulse from the multiplicand ring 503 is applied to the multiplier ring 510, causing a positive voltage to appear on the output line of the multiplier ring associated with the digit 2. This positive voltage is applied to the contact in each of the multiplier switches 121 which is associated with the digit 2. Since the digit 2 contacts of the units multiplier switch will be closed, the positive voltage is applied through the closed contacts to the fifth tube of the shift ring 511. The fifth tube, being primed, will conduct in response to this positive voltage.

As the units fifth tube of the shift ring 511 is made conductive, it causes the extinguishment of the fourth tube and the priming of the sixth tube of the shift ring. At the same time, the fifth tube operates to develop a shift pulse which delays the operation of the multiplicand ring 503 for a two-pulse count and causes the blowout circuit 512 to effect the blowing out of the multiplier ring 510.

Before the multiplicand ring 503 commences another cycle, the ×0 amplifier 513 will develop a positive voltage in its output. This positive voltage is applied to the sixth tube of the shift ring 511 through the closed contacts of the tens multiplier switch. At this time, the sixth tube is primed, so that the positive voltage from the ×0 amplifier 513 will cause it to conduct.

As the sixth tube is made conductive, it causes the initiation of the same operations as those which were initiated by the fifth tube. The output of the sixth tube causes the extinguishment of the fifth tube and the priming of the seventh tube. At the same time, the output of the sixth tube causes the operation of the multiplicand ring 503 to be delayed for another two-pulse count. The multiplier ring 510 will remain blown out.

Before the delay period of the multiplicand ring 503 ends, the ×0 amplifier 513 will develop a positive voltage in its output. Since only the seventh tube is primed, and the path to it for this positive voltage is through the digit 0 contacts of the hundreds multiplier switch, which is open, the seventh tube will not be rendered conductive.

As the first tally pulse is applied by the multiplicand ring 503 to the multiplier ring 510, the tube of the multiplier ring 510 associated with the digit 1 will develop a positive voltage in its output. This positive voltage is applied to the corresponding digit line to one side of the digit 1 contact pair in each of the multiplier switches 121. Since only the seventh tube of the shift ring 511 is primed, and the digit 1 contacts of the hundreds switch of the multiplier switches 121 are open the shift ring 511 is not affected by this positive voltage.

As the second tally pulse is applied to the multiplier ring 510, the tube of the multiplier ring 510 associated with the digit 2 will develop a positive voltage in its output. Again, the digit 2 contacts of the multiplier switches 121 which might connect this positive voltage to the primed shift ring tube (the seventh tube) are open. Consequently, the shift ring 511 is not affected by this positive voltage.

As the third tally pulse is applied to the multiplier ring 510, the tube of the multiplier ring 510 associated with the digit 3 will develop a positive voltage in its output. This time, the digit 3 contacts of the multiplier switches 121 which connect this positive voltage to the seventh tube of the shift ring are closed. Since this seventh tube is primed, the positive voltage causes the tube to conduct. As the seventh tube is rendered conductive, it initiates the same functions thet other tubes of the shift ring 511 did when they were rendered conductive. The output of the seventh tube causes the sixth tube to be extinguished and causes the priming of the eighth tube of the shift ring 511. At the same time, the output of the seventh tube causes the multiplier ring 510 to be blown out and causes a two-pulse count delay in the operation of the multiplicand ring 503.

The next five higher order rows of switches of the multiplier switches 121 would be set at zero, so the associated tubes of the shift ring 511 would be rendered conductive in sequence, and the multiplication operation would be completed without permitting another group to be transmitted to the accumulator 509.

The first two lower order rows of switches of the multiplier switches 121 would have operated in the same manner as the five higher order rows of switches. Since the multiplier, in the example used, is a three-digit number, with the lowest digit occurring in the units place or column, the two lower order rows of switches would have caused the associated tubes of the shift ring 511 to be rendered conductive in sequence without permitting the multiplicand circuits to develop a pulse group.

From the above description, it is clear that, with the number 302 entered into the multiplier switches 121, pulse groups would be transmitted through the shift matrix 508 to the accumulator 509 only while the multiplier ring 510 is counting up to the closed contacts of the multiplier switches 121. Two pulse groups would be transmitted through the shift matrix 508 while the multiplier ring 510 is counting up to the digit 2, which is entered in the digit 2 contacts of the units row of multiplier switches 121, and three pulse groups would be transmitted through the shift matrix 508 while the multiplier ring 510 is counting up to the digit 3, which is entered in the digit 3 contacts of the hundreds row of multiplier switches 121.

The shift ring 511 is a circuit composed of gas tubes having two control grids, and the tubes thereof are interconnected to fire in sequence. The first tube is primed by a starting pulse from the control circuit 514 at the beginning of a multiplication operation. The second tube is primed by the first tube and rendered conductive upon completion of a trial operation. Each of the other nine tubes is primed as the tube preceding it is rendered conductive. The shift ring 511 differs from the multiplicand and multiplier rings in that each tube, as it is rendered conductive, causes the preceding tube to be rendered nonconductive.

As the second tube of the shift ring 511 is rendered conductive, a positive voltage is developed in its output. This positive voltage is applied to a group of tubes in the shift matrix 508 and is sustained long enough to allow a certain number of pulse groups to be transmitted through the shift matrix to the accumulator 509. The number of pulse groups which are transmitted to the accumulator 509 is determined by the digit entered into the governing contacts of the multiplier switches 121.

As the second tube of the shift ring 511 is rendered conductive, the multiplier ring 510 begins the counting of the tally pulses from the multiplicand ring 503. When the multiplier ring 510 counts a number of tally pulses equal to the digit entered into the governing contacts of the multiplier switches 121, the third tube of the shift ring 511 is rendered conductive. As the third tube is rendered conductive, a positive voltage is developed in its output. This positive voltage is applied to another group of tubes in the shift matrix 508. If there is a digit other than zero in the associated row of contacts of the multiplier switches 121, the multiplier ring 510 will commence to count again. This procedure is repeated for every tube in the shift ring 511 up to the last tube thereof. Thus, positive voltages representing each digit of the multiplier are applied to the shift matrix 508 in sequence.

Each time a tube of the shift ring 511 is rendered conductive, the ring develops a shift pulse. This shift pulse is applied to the shift pulse shaper 515. The output of the shift pulse shaper 515 is used to trigger the blowout circuit 512. The blowout circuit 512 removes the voltage from the plates of the tubes in the multiplier ring 510, so that, when the multiplier ring 510 starts to count again, it will start at the beginning of a count.

The output of the shift pulse shaper 515 is also applied to the delayed shift pulse generator 516. The output of the delayed shift pulse generator 516 is applied to the blowout input mixers 506 and to the ×0 amplifier 513.

The output of the blowout input mixers 506 is used to trigger the blowout circuit 505, which causes the operation of the multiplicand ring 503 to be delayed for a two-pulse count.

The output of the ×0 amplifier 513 is applied to the output digit line from the multiplier ring 510, which is associated with the digit 0. Thus, when a tube of the shift ring 511 is rendered conductive, it causes the next tube of the shift ring to become conductive before any pulse groups are transmitted through the shift matrix 508 if the next digit of the multiplier is zero. The output of the ×0 amplifier 513 causes the primed tube of the shift ring 511 to become conductive during the delay period before a pulse group can be developed.

The shift matrix 508 comprises seventy-seven diode circuits. It is represented by a grid system in which the diode circuits are indicated by the circled intersections thereof. In each of the diode circuits, the magnitudes of the applied voltages are such that neither a pulse nor a priming voltage is sufficient in itself to cause the diode to conduct. However, when both are applied simultaneously, the diode conducts for the duration of the pulse. While the diode conducts, its cathode goes positive for the duration of the pulse, thus transmitting a pulse through one of the input amplifiers 517 to the proper stage of the accumulator 509.

The priming voltages are the positive voltages developed in the output circuits of the second through the tenth tubes of the shift ring 511. These voltages are proportional in length to the digits of the multiplier and are applied to the shift matrix 508 by separate leads. They are applied in a sequence opposite to that in which the corresponding digits occur in the multiplier.

The pulses are brief bursts of positive voltage applied to different leads by the multiplicand gates 507 to represent the digits of the multiplicand.

Each of the pulse group leads from the multiplicand gates 507 applies its pulses to a number of diodes in the shift matrix 508. The diodes that are primed by the voltages developed in the output circuits of the tubes of the shift ring 511 allow the pulses of the appropriate number of pulse groups to pass to the proper stages of the accumulator 509 through the input amplifiers 517.

The primary function of the accumulator input amplifiers 517 is to reverse the polarity of the pulses from the shift matrix 508 from positive to negative. This is done because the accumulator 509 responds only to negative pulses.

Thirteen accumulator stages are utilized in the multiplying device. Ten of them (Bank I to Bank 10) are for registering the ten digits which may occur in the product. The remaining three accumulators (Banks 000, 00, and 0) operate at levels below the others. The digits which these last three accumulator stages register are not read out, but the carry pulses which they produce will effect the product.

Each stage of the accumulator 509 comprises four two-condition circuits. These circuits as a group can assume sixteen unique and identifiable combinations of conditions. Ten of these combinations are each associated with a different one of the ten digits.

The two-condition circuits or flip-flops comprise two triodes so interconnected that only one may conduct at one time. When a negative pulse from the shift matrix 508 is applied to the grid of a conducting triode, it is cut off. As this triode ceases to conduct, it causes the other triode to start conducting. When one of the two triodes is conducting, the flip-flop is defined to be "on," and when the other triode is conducting, the flip-flop is defined to be "off."

Each of the flip-flops is considered to have a particular value when it is in the "on" condition and a zero value when it is in the "off" condition. These particular values are 1, 2, 4, and 8. At any instant, the represented digit is the sum of the values of the flip-flops minus two.

The following table shows the ten different sets of conditions which the flip-flops assume to represent the different digits as they count the applied pulses from the shift matrix 508. The "on" condition of a flip-flop is represented by an "X," while the "off" condition is represented by an "O."

| Digits | Value | | | |
|---|---|---|---|---|
| | 1 | 2 | 4 | 8 |
| 0 | O | X | O | O |
| 1 | X | X | O | O |
| 2 | O | O | X | O |
| 3 | X | O | X | O |
| 4 | O | X | X | O |
| 5 | X | X | X | O |
| 6 | O | O | O | X |
| 7 | X | O | O | X |
| 8 | O | X | O | X |
| 9 | X | O | X | X |

The first flip-flop changes its state with every pulse. Each of the other flip-flops changes its state when the preceding flip-flop changes its state from "on" to "off." If a pulse is applied after an accumulator stage has reached a count of nine, that accumulator stage recycles, setting up the zero condition and delivering a carry pulse to the next higher accumulator stage in the process.

After the accumulator 509 has counted all the pulses, the multiplying device translates the resulting product from a combination of electronic conditions into a combination of mechanical conditions, so that the product can be transferred to the accounting machine. The product switches 123 in the accounting machine perform this function.

As previously described, in connection with FIGS. 10 to 13, the product switches 123 comprise eleven fixed contacts printed on an insulating board. The common contact 230 is circular. The other ten contacts 226 form a segmented circle concentric with the common contact 230. The two-armed wiper 227 is mounted on the shaft 99, so that, as the shaft rotates, one arm 236 rides on the common contact 230 and the other arm 237 scans the other ten contacts 226.

Each of the product switches 123 is associated with a different one of the accumulator stages. Each of the fixed contacts in the outer circle within each product switch is associated with a different digit.

Each of the fixed contacts 226 within a product switch 123 is connected to three of the eight output circuits in the associated accumulator stage. Some of the fixed contacts have one or two of these connections in common, but no two contacts have the same combination of three connections.

When an accumulator stage assumes the condition associated with the digit 1, none of the output circuits connected to the product switch contact associated with the digit 1 is conducting. When this condition occurs, all three output circuits of an accumulator stage which is connected to the fixed contact of a product switch are at the same maximum potential, and there is no current flow between them. Without current flow, there is no potential drop, so the same predetermined voltage (approximately +165 volts D.C.) is applied to the fixed switch contact.

The condition described in the preceding paragraph applies only to the one contact. In every other group of three output circuits of an accumulator stage which is connected to a fixed contact of a product switch, at least one and perhaps more output circuits are conducting. This unbalance causes a current flow between the output circuits, causing a voltage drop across resistances in these output circuits. The voltage applied will be lower than the predetermined voltage. It is possible that all three output circuits might be conducting, in which case balance would again be achieved, but at a much lower voltage level than the predetermined voltage.

These same conditions apply, no matter what condition an accumulator stage assumes. The connections between the output circuits and the contacts of the product switch are made so that the predetermined voltage is applied to only one contact, the contact associated with the digit identified with the accumulator stage condition. All the other contacts of a product switch are at some lower potential.

At the end of a multiplication problem, the wiper 227 (FIGS. 10 to 13) of each product switch 123 sweeps across the fixed contacts 226, seeking the one contact upon which the predetermined voltage has been impressed. It moves past the contacts of a product switch which are at a lower potential, but, when it senses the predetermined voltage, it stops on that product switch contact. Through this process, the stop ratchet pinion 234 on the scan shaft 99 assumes a position corresponding to the digit indicated by the condition of the accumulator stage. All of the stop ratchet pinions 234 associated with the product switches operate to transfer the digits of the product into the mechanical portion of the accounting machine.

As the wipers 227 of the product switches 123 sweep across the fixed contacts 226, the voltages picked up by each wiper 227 are applied successively to an associated one of the product amplifiers 518. When a product amplifier is in its standby condition, none of the voltages which are normally applied to it through the contacts of a product switch 123 is sufficient to cause the product amplifier to conduct. When the first multiplication operation is completed, the product amplifier is so conditioned that the predetermined voltage picked up by the one contact associated with the product digit, as determined by an accumulator stage, is sufficient to cause the product amplifier to conduct. However, the product amplifier will not conduct when any voltage smaller than the predetermined voltage is applied to it.

A product magnet 242 is connected in the output circuit of each of the product amplifiers 518. When the wiper 227 of an associated product switch 123 finds the fixed contact 226 having the predetermined voltage, that product amplifier conducts, causing energization of the product magnet 242 in its output circuit. The product magnet 242 actuates the pawl 243, so that the product switch remains positioned at the proper fixed contact 226. Each of the product magnets 242 has a set of normally open contacts 519. All of the magnet-controlled contacts 519 are connected in series. When all the product magnets 242 are energized, the contacts 519 will be closed. The function of the contacts 519 will be explained hereinafter, when the multiplying device control circuits are described.

The multiplying device checks every solution of a multiplication problem that it is called upon to make. At the time a multiplication operation is initiated, the multiplying device functions to prevent the accounting machine from performing certain operations heretofore set forth. When the solution of the multiplication problem has been checked or verified, the multiplying device then functions to allow the accounting machine to be released, so that it may perform these operations, such as the transmission of the computed product to the accounting machine.

The multiplying device solves the multiplication problem by computing the product of a multiplicand and a multiplier by means of a first multiplication. Then the multiplying devices computes the product of the ten's complement of one of these factors and the other factor by means of a second multiplication. The products of the first and second multiplications are totaled or added in the accumulator. The significant digits of this total are compared with the digits of the other factor in order, so that the product resulting from the first multiplication is verified.

In the illustrative embodiment of the invention, the multiplying device computes the product of the ten's complement of the multiplicand and the multiplier as the result of the second multiplication, and the significant digits of the total in the accumulator 509 are compared with the digits of the multiplier in order, but it is to be pointed out that the second multiplication may involve the computation of the product of the ten's complement of the multiplier and the multiplicand, and the comparison may be made between the significant digits of the total in the accumulator 509 and the digits of the multiplicand in order, without departing from the spirit and teachings of the invention.

The novel checking arrangement disclosed and claimed herein is based upon the algebraic relationships expressed in the following equations. In these equations, the letter B represents the multiplier, and the letters AB represent the product.

(1) $\quad (10^3-A)B = 10^3B - AB$ (2) $\quad 10^3 - AB + AB = 10^3B$

The Equation 1 expresses the operation performed by the multiplying device during the checking multiplication. Before this checking multiplication is performed, the multiplicand involved in the original or first multiplication is replaced by the ten's complement. The embodiment of the multiplier apparatus shown and described herein is capable of working with a multiplicand which has a maximum of three digits to the left of the decimal point and five to the right. Therefore, the ten's complement of the multiplicand is equal to the complement of the multiplicand with respect to $10^3$, or 1000. This complement is expressed in the Equation 1 above as $(10^3-A)$. The multiplier remains the same for both the first and second multiplications performed by the multiplying device.

After the first multiplication has been completed, its product, AB, will remain in the accumulator 509. During the second, or checking, multiplication, the product $10^3B-AB$ is added to AB. The total or sum of the products of the first and second multiplications is shown by Equation 2 to be equal to $10^3B$. The digits of this total, $10^3B$, are then compared with the digits of the multiplicand in order, thus verifying the product of the first multiplication.

The above checking procedure is valid because an error occurring in the product of the first multiplication would be reflected in at least one significant digit of the total, $10^3B$, since the product of the first multiplication, AB, is one of the two amounts which together form the total, $10^3B$.

Prior to performing the computation indicated in the expression on the left side of Equation 1, however, the multiplying device must develop a new factor or multiplicand, which is used in the second multiplication. This new factor is the ten's complement of the multiplicand which was used in the first multiplication. The original multiplicand, A, is changed to $10^3-A$. This change is based upon the algebraic equation which follows:

(3) $\quad 999.99999-A+0.00001=10^3-A$

The largest number that the particular multiplier apparatus shown and described herein can handle successfully as a multiplicand would have three digits to the left of the decimal point and five digits to the right. The maximum value which such a number can assume is equal to 999.99999. If any number having no more than three digits to the left of the decimal point and no more than five digits to the right is subtracted from 999.99999, the subtraction occurring in any one column is independent of the subtraction occurring in the other columns. In other words, since 9 is the digit of the highest value in any one column, no digit can exceed it, so there will never be any occasion to borrow from the preceding column. Consequently, the result in any column is always equal to the complement of the subtracted digit with respect to the digit 9.

The operation indicated by the expression on the left side of Equation 3 is the subtraction of the original multiplicand A from the number 999.99999. As pointed out in the preceding paragraph, this operation may be accomplished by replacing each digit of A with its nine's complement. This is accomplished by the transposing or switching network 520 (FIG. 23), which operates to connect the digit 9 output line from the multiplicand ring 502 to the digit 0 input line to the multiplicand switches 120, the digit 8 output line from the multiplicand ring 503 to the digit 1 input line to the multiplicand switches 120, and so on. Such a transposition operation gives an electrical representation of the complement of the original multiplicand A with respect to the number 999.99999, or the nine's complement of the original multiplicand A.

The nine's complement of the original multiplicand A is changed to the normal ten's complement by the addition of a "fugitive one" to it. Thus, to obtain the complement of the original multiplicand A with respect to $10^3$, the number 0.00001 is added to the nine's complement of the original multiplicand A. With the addition of the "fugitive one" (0.00001) to the nine's complement of the original multiplicand A, the multiplicand provided for the second multiplication assumes the value $10^3-A$. This is the value represented by the pulse groups transmitted to the shift matrix 508 during the second, or checking, multiplication.

The "fugitive one" is a pulse added to every pulse group developed by the multiplicand gates 507. The number of "fugitive one" pulses utilized in the second, or checking, multiplication is determined by the digits of the multiplier. These "fugitive one" pulses are transmitted through the shift matrix 508 to particular accumulator stages in the same manner as the other multiplicand pulses of 0.00001 value under control of the digits of the multiplier.

As previously shown, the maximum error which might occur in the computation of the product of the multiplicand and the multiplier (AB) is equal to 0.0001701. This error, or a smaller error, might occur because the multiplying device embodiment shown and described herein does not provide accumulator stages to compute the sixth and seventh place decimal digits. In the original, or first, multiplication, this error is insignificant. Its only effect is to delay the half-cent round-off until the true value of the product below the hundredths level reaches some magnitude between 0.005 and 0.0051701, depending upon the magnitude of the error. Actually, round-off should occur exactly at 0.005, but the difference is negligible so far as the multiplication problem is concerned.

In the checking multiplication, an error occurs because accumulator stages are not provided at the sixth and seventh decimal levels. Again, the maximum magnitude of the error is small with respect to the significant figures of the result of the checking multiplication. However, because of the nature of the checking procedure, the error which occurred during the first multiplication and the error which occurred during the checking multiplication are cumulative. It will now be explained why this error will not affect the total in the accumulator 509 at the end of the second multiplication.

The checking procedure is designed to pick up any error due to faulty operation of the multiplying device; however, since the drop-off error is negligible, it is desirable that this error should never be detected in the course of this operation. A round-off circuit is provided to prevent such an occurrence.

Prior to a multiplication, the thousandths accumulator stage (Bank 0 of FIG. 24) is in the condition associated with the digit 5, while the remaining accumulator stages are in the condition associated with the digit 0. Since the thousandths accumulator stage starts to count at 5, it emits a carry pulse when it receives a fifth pulse, a fifteenth pulse, a twenty-fifth pulse, and so on. The remaining accumulator stages emit a carry pulse when they receive a tenth pulse, a twentieth pulse, a thirtieth pulse, and so on. The thousandths accumulator stage, by emitting carry pulses five counts ahead of the schedule of the other accumulator stages, causes the multiplying device to round off the product to the nearest cent. Since the accumulator 509 is not read out below the cent level—that is, the Bank 000, Bank 00, and Bank 0 accumulator stages are not read out—the five extra counts do not show in the amount read out of the accumulator 509 aside from round-off.

To show how the round-off circuit absorbed the drop-off error, assume that the multiplier B is:

ABCDEFGHIJ a ten-digit number with the digits represented by the letters. At the end of the second, or checking, multiplication, the total neglecting error should be:

ABCDEFGHIJ0.00500

It will be explained hereinafter that the maximum error which may be accumulated at the end of the checking multiplication is equal to 0.00018. Since this maximum error is attributed to lost pulses, it is a negative error. Thus, with maximum error, the total at the end of the checking multiplication would be:

ABCDEFGHIJ0.00482

Upon comparing the two totals, it is evident that the error varies over too small a range with respect to the round-off 5 to affect the significant digits of the total.

To prove that the maximum error which may be accumulated at the end of the checking multiplication is equal to 0.00018, the pulses which are unaccounted for because accumulator stages are not provided for at the sixth and seventh decimal place levels are counted.

Disregarding the digits which cannot affect the sixth and seventh decimal places in the total, the first and second multiplication performed before a product is transferred to the accounting machine may be shown as follows:

First Multiplication $\qquad$ Second Multiplication
$\quad$ 0.000JK $\qquad\qquad\qquad$ 0.000PQ
$\quad$ 0.MN $\qquad\qquad\qquad\quad$ 0.MN During the two multiplications, the total number of pulses which would be applied to the seventh decimal place accumulator stage equals:

$$(K \times N)+(Q \times N)+N$$

where the last N represents the lost "fugitive one" pulses.

Since K and Q are complementary with respect to the digit 9, $K$ plus $Q$ equals 9. Thus:

$$(K \times N) + (Q \times N) + N = N(K+Q+1) = 10N$$

This result indicates that the seventh decimal place accumulator stage would register the digit 0 at the end of the first and second multiplication, and it would have applied N carry pulses to the sixth decimal place accumulator stage.

During the first and second multiplications, the total number of pulses applied to the sixth decimal place accumulator stage equals:

$$(N \times J) + (M \times K) + (N \times P) + (M \times Q) + N + M$$

where the last $N+M$ represents lost "fugitive one" pulses. P and J, as well as K and Q, are complementary with respect to the digit 9. Thus:

$$(N \times J) + (M \times K) + (N \times P) + (M \times Q) + N + M = \\ M(K+Q+L) + N(J+P+1) = 10M + 10N$$

This result indicates that the sixth decimal place accumulator stage would register the digit 0 at the end of the first and second multiplications, and it would have applied $N+M$ carry pulses to the fifth decimal place accumulator stage. These lost carry pulses represent the error introduced as the result of the first and second multiplications by the elimination of the sixth and seventh decimal place accumulator stages. Since the maximum value that both N and M may assume is 9, the maximum number of lost carry pulses is 18. Each of these pulses has a value of 0.00001, so that the maximum error is 0.00018.

In verifying the product resulting from the first multiplication, the multiplicand ring 503 during the second multiplication develops nine positive voltage signals varying from one to nine units in length. During the second multiplication, however, the contacts of the transposing network 520 (FIG. 23) are transferred. These contacts apply the nine-unit signal from the multiplicand ring to the digit 0 input line of the multiplicand switches 120, the eight-unit signal to the digit 1 input line, and so on. Since the multiplicand switches 120 remain at their setting for the multiplicand involved in the first multiplication, each multiplicand switch will now pass a timed signal proportional in length to the nine's complement of its digit setting, rather than a signal proportional to the digit setting itself. For example, a multiplicand switch with the digit 6 setting will pass a signal three time units long. These complementary signals are applied as priming voltages to the multiplicand gates 507. The timed signals then represent the nine's complement of the multiplicand used in the first multiplication, or, in terms of the actual multiplier apparatus embodiment, the timed signals represent the number 999.99999-A. In the example used heretofore, the complement of the number 21.32, which was designated the multiplicand used in the first multiplication, would be 978.67999.

The "fugitive one" is a pulse transmitted to the output of the multiplicand gates 507 at the 0.00001 level. This pulse occurs once in every pulse group developed during the second multiplication, but it does not occur in the pulse groups developed during the first multiplication. The "fugitive one" pulse occurs at a time when it does not coincide with another pulse, so that it is not lost. The impulse for developing the "fugitive one" pulse is obtained from the digit zero input line to the multiplicand switches 120. This digit zero input line remains at ground potential during the first multiplication, so a "fugitive one" pulse does not occur then. However, during the second multiplication, a positive signal nine time units long is applied to the digit zero line each time a pulse group is developed. This positive signal begins before any other signals are developed by the multiplicand ring, so that initial change in voltage occurs before any of the pulses in the pulse group.

The above change in potential is applied through a differentiating ciruit in the input circuit of the first "fugitive one" amplifier 521, and the pulse formed is applied thereto. The pulse output of the "fugitive one" amplifier 521 is applied through the second "fugitive one" amplifier and mixer 522 to the output circuit of the proper one of the multiplicand gates 507. From the proper multiplicand gate, the "fugitive one" travels through the shift matrix 508 to the accumulator 509 under control of the shift ring 511.

During the first multiplication, all the tubes of the shift ring 511 fire once. When the last tube of the shift ring fires, the positive voltage developed in its output circuit is applied to the control circuit 523 to indicate the end of the first multiplication. The control circuit 523 then operates to set up the second, or checking, multiplication.

The end-around amplifiers 524 and 525 amplify the end-around pulses and apply them to the proper accumulator stages during the second multiplication. The amplifiers 524 and 525 are prevented from operating during the first multiplication by the control circuit 526.

The carry storage circuit 527 is provided so that two carry pulses will not be transmitted simultaneously to the Bank I accumulator stage during the second multiplication. If this should occur, the Bank I accumulator stage would count the two pulses as one, and the total in the accumulator 509 would not agree with the digits of the original multiplier.

The shift ring 511 and the accumulator 509 each operate in the same manner as they do during the first multiplication. However, Equation 3 above indicates that the number in the accumulator 509 after all the pulses generated during the checking multiplication is equal to $10^3 B$. Since B, or the multiplier, can have as many as eight digits to the left of the decimal point, this number can have as many as eleven digits to the left of the decimal point. On the other hand, the actual product of the original multiplicand and the multiplier never has more than eight digits to the left of the decimal point. In order to avoid adding three more accumulator stages merely to handle the total in the accumulator 509 after the checking multiplication, the three overflow digits are put into what are normally the hundredths, tenths, and units accumulator stages. These accumulator stages would otherwise be at zero at the end of the checking multiplication. For example, if the multiplier were equal to 67,890,123.45, the total, $10^3 B$, in the accumulator 509 at the end of the checking multiplication would be equal to 67,890,123,450.00. However, this total would actually appear in the accumulator 509 as 90,123,456.78.

As was previously described, each of the accumulator stages has ten output leads, each corresponding to a different digit. When an accumulator stage output circuit assumes the conditions associated with a particular digit, it applies a predetermined voltage (approximately +165 volts D.C.) to the corresponding output lead. Other voltages may appear on the other leads, but only the lead associated with the designated digit has a potential in the neighborhood of the predetermined voltage.

As was previously described, the output leads of an accumulator stage extend to an associated product switch 123. During the second multiplication, the newly-developed potentials have no effect upon the product switches 123. However, the same output leads of an accumulator stage also extend to an associated one of the check switches 122. The check switches 122 and the multiplier switches 121 operate simultaneously and register the same number.

If the multiplying device has performed the first and second multiplications correctly, the same digits should be in both the check switches 122 and the accumulator 509 after all the pulses developed during the second multiplication are transmitted to the accumulator. However, the digits in the accumulator 509 are displaced three decimal places to the left of the same digits in the check switches 122.

Each of the check switches 122, like the multiplier switches 121, has ten pairs of normally-open contacts, and each pair of contacts is associated with a different digit. These contacts open and close with the associated contacts of the multiplier switch associated with the same digit. The output leads of the accumulator 509 are also associated with a particular digit and are connected to the contact pairs of the check switches 122 accordingly.

The opposing contacts of all ten contact pairs in a check switch 122 are connected through a common line to the input of one of the check amplifiers 528. Each of the check amplifiers 528 controls a product magnet 242.

If an accumulator stage and an associated check switch 122 register the same digit, the predetermined voltage is applied through the closed contacts of the check switch to the check amplifier associated with that check switch. If there is a discrepancy between the two, the predetermined voltage is applied to an open contact, and some lesser voltages are applied through the closed contacts to the check amplifier. Only the predetermined voltage is sufficient to cause the check amplifier to operate its product magnet 242.

Each of the check switches 122 controls a product magnet 242. Each of the product magnets 242, in turn, controls the set of normally-open contacts 519. All these magnet-controlled contacts 519 are connected in series. If all the magnets 242 operate, all the contacts 519 are closed, and an energizing potential is applied to the release relay K108 (FIG. 43) to restore the multiplying device to its initial operating condition. In its initial operating condition, the product of the last multiplication may then be transferred from the product switches 123 to the accounting machine in a succeeding accounting machine cycle. If one or more of the product magnet contacts 519 remain open, the release relay K108 will not be energized, and the multiplying device will not be restored to its initial operating condition. Consequently, the accounting machine will be prevented from performing certain operations heretofore described, such as the transfer of a product from the product switches 123 to the accounting machine, and so forth.

*Master Pulse Generator (FIG. 25)*

The circuits of the master pulse generator 500 are shown in FIG. 25. Its function is to develop the basic pulses required for the operation of the various circuits of the multiplying device.

The first circuit of the master pulse generator 500 is a free-running multivibrator, indicated generally at 540. The output signal of the multivibrator is square-shaped. The multivibrator comprises two triode amplifiers 541 and 542 having a single envelope 543. The amplifiers 541 and 542 are coupled together, so that variations in potential at the plate of each amplifier are applied to a coupling capacitor, which is connected to the grid of the other amplifier. The coupling capacitors are the capacitors 544 and 545. Operating potential for the plates of the amplifiers 541 and 542 is supplied through resistors 546 and 547 from a terminal 548, which is connected by a circuit path which is shown in FIG. 44 and which includes the lead 549, the contacts K109bc1, and the terminal 550. The terminal 550 is connected to the terminal 551 (FIG. 42) in the power supply. When the operating potential is applied to the amplifiers 541 and 542, the voltage appearing at the control grid of one of the amplifiers is immediately amplified and applied to the control grid of the other amplifier, amplified again, and applied to the control grid of the amplifier at which it first appeared. If the original voltage is positive and appears at the control grid of the amplifier 541, the voltage applied to the control grid of the amplifier 542 is negative, since the direction of the voltage waveform is reversed as it passes through the amplifier 541. The voltage is reversed again as it passes through the amplifier 542, so that it reappears at the control grid of the amplifier 541 as a greatly intensified voltage, having the same positive direction as the original voltage. Because the voltage reinforces itself in this manner, the amplifier 541 is driven almost instantaneously to its saturation point. In the process, the negative voltage applied to the control grid of the amplifier 542 increases in the same manner, so that the amplifier is driven below cut-off.

With the amplifier 541 operating at its saturation point, the conditions are relatively stable thereat. The conditions at the amplifier 542, however, are not quite so stable. The charge on the capacitor 545 is applied to the control grid of the amplifier 542 to hold it cut off. This charge is caused by the drop in voltage at the plate of the amplifier 541. The capacitor 545 will discharge at a rate determined by the discharge path including the resistors 552 and 553.

When the capacitor 545 no longer has sufficient charge to hold the amplifier 542 cut off, current will flow through the amplifier, dropping the voltage present on its plate. The voltage then appearing on the plate of the amplifier 542 is applied through the capacitor 544 to the control grid of the amplifier 541, causing the current flow through this amplifier to decrease. The resulting increase in voltage at the plate of the amplifier 541 is applied to the control grid of the amplifier 542, causing even more current to flow through this amplifier. The voltage change appearing at each control grid is greatly reinforced by the amplified voltage. The conditions at the control grids of the amplifiers 541 and 542 reverse almost instantaneously.

The charge on the capacitor 544 will hold the amplifier 541 cut off. The capacitor 544 will discharge through the discharge path including the resistors 554 and 555. The multivibrator will continue to cycle in the above manner as long as the operating voltages are applied to it.

The values of the capacitors 544 and 445 and the resistors 552 to 555 determine the frequency of the square wave output signal of the multivibrator. The resistors 553 and 555 are variable resistors to permit adjustment of the output signal should it become unsymmetrical.

The multivibrator is designed to cycle at approximately 10,000 cycles per second.

The square wave output signal at the plate of the amplifier 541 is applied as an input signal to the differentiating circuit comprising the capacitor 557 and the resistor 558, while the square wave output signal at the plate of the amplifier 542 is applied as an input signal to the differentiating circuit comprising the capacitor 559 and the resistor 560.

The output of each of the differentiating circuits comprises a series of positive and negative pulses. As the input voltage to the differentiating circuits goes negative, the capacitor 557 or 559 accepts a corresponding charge. As soon as the input signal of a differentiating circuit drops to its minimum value and assumes a comparatively steady state, the capacitor 557 or 559 begins to discharge. The capacitors 557 and 559 are chosen to have small capacity, so that a small current through the discharge path comprising the small-valued resistors 558 or 560 will dissipate the charge very quickly. As a result, the output signal of the differentiator circuits quickly returns to its normal value.

When the input voltage to the differentiating circuits goes positive, a positive pulse is developed in the output thereof in a similar manner.

The two square wave signals appearing at the plates of the multivibrator circuits are 180 degrees out of phase. Consequently, the negative pulses appearing at the output of one of the differentiator circuits occur half-way between the negative pulses appearing at the output of the other differentiating circuit.

The negative pulses in the output of the differentiator circuit comprising the capacitor 557 and the resistor 558 are the 0° pulses, the primary pulses utilized in the multiplying device. These negative pulses, along with the intervening positive pulses, are applied to the control grid of the zero-degree pulse amplifier 561. The amplifier 561 and the 180-degree pulse amplifier 562 are triode amplifiers, having a single envelope 563.

The zero-degree amplifier 561 is a conventional amplifier biased above its saturation point. Because the amplifier 561 is biased in this manner, the positive pulses applied to its control grid do not appear in the amplifier output. The negative input pulses, on the other hand, momentarily drive the amplifier 561 to its cut-off point. These negative input pulses appear at the plate of the amplifier 561 as sharpened positive pulses.

The positive pulses at the plate of the amplifier 561 are applied through a capacitor 564 to the control grid of the zero-degree pulse output amplifier 565, and through a capacitor 566 to the control grid of the zero-degree pulse output amplifier 567. The two amplifiers 565 and 567 are triode amplifiers and have a single envelope 568. The amplifier 565 develops the positive zero-degree pulses, while the amplifier 567 develops the negative zero-degree pulses.

The amplifier 565 is connected as a cathode follower, and so positive zero-degree pulses are present at its cathode. These positive zero-degree pulses are made available to the terminals 569 to 572.

The amplifier 567 is a conventional type of amplifier, and negative zero-degree pulses appear at its plate. These negative zero-degree pulses are made available to the terminal 575. The control grid of the amplifier 567 is connected to the terminal 576, which in turn is connected to the terminal 577 (FIGS. 41 and 42) of the power supply.

The differentiating circuit comprising the capacitor 559 and the resistor 560 has the square wave signal appearing at the plate of the amplifier 542 applied thereto. This differentiating circuit transforms the square wave signal into a series of positive and negative pulses, and applies these pulses to the grid of the 180-degree pulse amplifier 562. Since the square wave signal appearing at the plate of the amplifier 542 is 180 degrees out of phase with the square wave signal appearing at the plate of the amplifier 541, the pulse outputs of the differentiating circuits are also 180 degrees out of phase. Consequently, the negative 180-degree pulses cannot coincide with the zero-degree pulses.

The 180-degree pulses are used as a second signal whenever pulses from two sources are applied to the same input. The second source cannot apply zero-degree pulses also, because, if the two sources apply pulses simultaneously, one series of pulses would be lost.

The 180-degree pulse amplifier 562 is a conventional amplifier biased above its saturation point. The negative input pulses to this amplifier are made to appear at its plate as positive pulses, which are made available to the terminal 578. The positive input pulses to the amplifier 562 do not appear at the terminal 578, since the amplifier is biased above its saturation point.

*180-Degree Pulse Output Amplifier*

The terminal 578 (FIG. 26) of the 180-degree pulse amplifier 562 is connected by suitable means to the terminal 579 of the 180-degree pulse output amplifier 580. The amplifier 580 is a conventional amplifier biased near cut-off. The positive pulses at the terminal 579 are applied to the control grid of the pentode 581. The terminals 582 and 583 are connected, respectively, to the lead 549 (FIG. 44) and to the terminal 577 (FIG. 42) in the power supply to supply operating potentials of +200 volts and −25 volts, respectively, to the amplifier. The output of the amplifier 580 is taken from its plate circuit and is composed of negative pulses occurring at a frequency of 10,000 cycles per second. This output appears on the terminals 584 to 586.

*Multiplicand Ring (FIGS. 27 and 28)*

The multiplicand ring 503 comprises eleven gas tubes 590 to 600. The tubes 590 to 594 are mounted on one multiplicand ring chassis, and the tubes 595 to 599 are mounted on another multiplicand ring chassis. FIG. 27 is a composite schematic diagram showing the circuits of the two multiplicand ring chassis. The tally tube 600 is mounted on one of two multiplier ring chassis and is shown in FIG. 29, which is a composite schematic diagram of the circuits of the two multiple-ring chassis. The tubes 590 to 600 are two-grid thyratrons; that is, tubes which will not fire or start to conduct current until the plate and both control grids thereof are simultaneously positive with respect to their cathode. Once fired, however, these tubes will continue to conduct as long as their plate remains positive with respect to their cathode, and their control grids will not cut off or diminish tube current by swinging negative.

The eleven tubes 590 to 600 are connected together in a series, with the cathode of each tube being coupled to the lower control grid of the next tube. The positive zero-degree pulses which are developed in the pulse generator and made available at the terminal 569 (FIG. 25) are applied by way of a lead 601 (FIG. 44) to a terminal 602, which is coupled to the upper control grid of the tube 590. The positive zero-degree pulses available at the terminal 570 (FIG. 25) of the pulse generator 500 are applied to a terminal 603, which is coupled to the upper control grids of the tubes 591 to 594 and 596 to 599. The positive zero-degree pulses available at the terminal 570 (FIG. 25) of the pulse generator 500 are also applied to the terminal 604 (FIG. 29), which is coupled to the upper control grid of the tally tube 600.

The lower control grid of the tube 590 in the multiplicand ring 503 is coupled to the terminal 605, which is connected to a terminal 612. The positive potential appearing at the terminal 605 is the priming potential which sets up the tube 590 for operation at the time that its upper control grid goes positive by the application of positive zero-degree pulses thereto.

The lower control grids of the tubes 591 to 600 are coupled to a terminal 606, which is connected to a terminal 607 (FIG. 42) of the power supply at which a negative potential of 105 volts appears. Operating potential for the plates of the tubes 590 to 599 is supplied from a terminal 608, which is connected to a terminal 609 in the blowout circuit of FIG. 33. Operating potential for the plate of the tally tube 600 (FIG. 29) is supplied from a terminal 610, which is also connected to the terminal 609. The cathode of the tube 594 is coupled to a terminal 611, which is connected to the terminal 612. The terminal 612 is coupled to the lower control grid of the tube 595. Thus, the output of the tube 594 will prime the tube 595.

The upper control grids of the tubes 590 to 599 are also coupled to a terminal 613, which is connected to the terminal 614 (FIG. 42) of the power supply, at which a negative potential of −35 volts appears.

When the multiplying device starts the first multiplication, contacts K102a2 (FIG. 44) close to apply the zero-degree pulses from the pulse generator 500 by way of the lead 601 and the terminal 602 to the upper control grid of the tube 590 in the multiplicand ring 503. Since the lower control grid of the tube 590 is positive, this tube will fire. With regard to the other tubes of the multiplicand ring 503, the positive zero-degree pulses are applied directly to the upper control grid and are not routed through the control circuit of FIG. 44. However, since the lower control grids in the other tubes are negative with respect to their cathode, none of these tubes will fire before or with the first tube 590.

As the first tube 590 fires, current begins to flow through its cathode resistor 615, causing its cathode to go positive. Almost immediately, the capacitor 616 in the other branch of its cathode circuit is charged to the potential on the cathode of the tube 590. This charge is applied to the lower control grid of the next tube 591 in the series. When the foregoing occurs, the tube 591 is primed.

When the next positive zero-degree pulse is applied to the upper control grid of the tube 591, this tube fires. As it fires, the tube 591 charges the capacitor 617 in its cathode circuit, and the charge on this capacitor is used to prime the third tube 592. The next zero-degree pulse will fire the tube 592, and the fourth tube 594 will be primed. This procedure will continue until finally the last tube, the tally tube 600, is fired.

As the tubes 590 to 600 of the multiplicand ring fire in sequence, the ring develops eleven outputs. These outputs are positive potentials taken from the cathodes of the eleven tubes in the ring. The potential increase at the cathode of the first tube 590 appears at the terminal 618. The terminal 618 is connected to a terminal 633 (FIG. 40). The potential increase appearing at the terminal 633 is transformed into a pulse which triggers the carry storage circuit of FIG. 40.

The potential increase at the cathode of the tally tube 600 (FIG. 29) is the tally pulse which appears at the terminals 619 and 620. The terminal 619 is connected to the terminal 621 of the multiplier ring 510 (FIG. 29), and the terminal 620 is connected to the terminal 622 of the blowout input mixers (FIG. 32). Thus, the tally pulse triggers both the multiplicand ring blowout system and the multiplier ring. The remaining nine outputs of the tubes 591 to 599 are positive potentials which appear at the terminals 623 to 631, respectively. These potentials are developed at different times but are terminated simultaneously.

The cathode of the tally tube 600 is also connected by way of the terminal 638 to the terminal 639.

The nine potentials of various lengths appearing at the terminals 623 to 631, respectively, are applied to the digit lines shown in FIGS. 22 and 23, which lines interconnect the multiplicand ring 503 and the multiplicand gates 507. These nine potentials are proportional in length to the digits which they represent. The basic time unit is the integral between successive zero-degree pulses, and each of the potentials is sustained for a period which is a multiple of this time unit. For example, the tube 591 of the multiplicand ring develops a potential appearing at the terminal 628 which represents the digit 9. Once the tube 591 is fired, it continues to conduct while the remaining tubes of the ring are fired in sequence. Since the tubes of the ring are fired in sequence and there are nine tubes 592 to 600 remaining to be fired, the tube 591 will conduct for a period of nine time units. Since the tube 592 will fire one time unit after tube 591, its cathode will remain positive for a period eight time units in length. Each of the remaining tubes will conduct for one time unit less than its predecessor.

The positive potentials developed at the cathodes of the tubes 590 to 600 of the multiplicand ring do not achieve maximum value at the instant they fire. Because the capacitor, such as the capacitor 616 in the cathode circuit of the tube 590, is charged through a resistor, such as the resistor 632, the potential built up is delayed slightly. The importance of this delay is discussed hereinafter when the circuit of the multiplicand gates 507 (FIG. 28) is described. The cathode capacitors, such as the capacitor 616, also have an additional function. Thus, when the tally tube 600 fires, the positive potential appearing at the terminal 622 (FIG. 32) is utilized to trigger the multiplicand blowout system, which includes the blowout input mixers 506 and the blowout circuit 505. The multiplicand ring blowout system removes the positive operating potential from the plates of the tubes of the multiplicand ring. The capacitors, such as the capacitor 616, in the cathode circuits of the tubes of the multiplicand ring hold their cathodes positive as the positive potential is removed from their plates by the operation of the blowout circuit 505. This reversal of polarity on the tube elements causes current flow through the tubes to break off sharply.

*Multiplicand switches (FIGS. 7 and 23)*

As previously described, the multiplicand switches 120 are mounted on the factor-entering and product transfer device at the rear of the accounting machine, and are set through the racks of the accounting machine. The racks, in turn, assume positions under control of the keyboard of the accounting machine, or under control of one of the totals of the accounting machine. There are eight multiplicand switches, six of these corresponding to the positions in the number to the left of the decimal point, and the remaining two switches corresponding to the positions to the right of the decimal point. In every multiplication problem, one of the factors must be set in the multiplicand switches 120.

Each of the multiplicand switches 120 (FIG. 7) has ten sets of contacts, each set corresponding to a different digit. The switches 120 are so constructed mechanically that only one set of contacts of each switch can be closed at one time. As shown in FIG. 23, one side of each set of contacts is connected to the corresponding digit line, so that, each time the multiplicand ring 503 cycles, a positive potential of the appropriate duration is applied to the set of contacts. The other sides of all the sets of contacts of a switch are connected to one of the tubes of the multiplicand gates 507.

When a multiplication problem is to be solved by the multiplier apparatus, the multiplicand switches 120 assume positions according to the digits of the multiplicand. During a subsequent operation of the multiplier apparatus, each of the multiplicand switches 120 selects a positive potential signal from the multiplicand ring 503, which is proportional in duration to the digit associated with the switch position every time the multiplicand ring cycles. This signal is applied to the control grid of one of the tubes in the multiplicand gates 507, where it acts as a priming potential.

The positive potential appearing in the cathode circuit of the tube 599 (FIG. 27) of the multiplicand ring is also present on the terminal 635. The terminal 635 is connected to the terminal 636 of the multiplier ring 510 (FIG. 29). From the terminal 636, this positive potential is applied to the lower control grid of the tube 600 to prime it, so that the next zero-degree pulse appearing at the terminal 604 will fire the tube 600.

*Multiplicand Gates (FIG. 28)*

The multiplicand gates 507 comprise eight gating circuits, including four duo-triode tubes 640 to 643 inclusive. Each gating circuit is associated with a different one of the eight multiplicand switches 120.

The function of a multiplicand gate circuit is to pass a number of pulses equal to the value of the digit registered in the associated one of the multiplicand switches 120. The gating circuit passes this number of pulses every time the multiplicand ring 503 goes through a complete cycle. All the multiplicand gating circuits operate at the same time, so that all the digits of the multiplicand are represented at separate output terminals 645 to 652, each time the multiplicand ring 503 cycles. The positive pulses appearing at the terminals 645 to 652 during one multiplicand ring cycle constitute a pulse group.

There are two input signals to the control grid of each of the eight gating circuits. One of these signals comprises the positive zero-degree pulses present at the terminal 571 (FIG. 25) of the pulse generator 500. The terminal 571 is connected to the terminal 653, which is coupled to the control grid of each of the eight gating circuits. The other input signal is the timed positive potential selected from the digit lines by the multiplicand switches 120. The terminals 655 to 662 are connected to one side of each of the ten contacts of a multiplicand switch as shown in FIG. 23. In addition, a positive potential of 75 volts is applied to the cathodes of the gating circuits from the terminal 663, which is connected to the terminal 664 (FIG. 42) in the power supply. Each of the triode portions of the eight gating circuits is biased below cut-off, so that neither input signal, when applied alone, is sufficient to cause the triode to conduct. Thus, the timed potential selected by the multiplicand switches 120 opens and closes a gating circuit for the zero-degree pulses developed in the pulse generator 500.

The length of a timed potential signal selected by the multiplicand switches 120 is measured in time units. A time unit is the integral between the end of one zero-degree pulse and the end of the succeeding zero-degree pulse.

When a tube, such as the tube 591, of the multiplicand ring 503 is fired, the output potential appearing in its cathode circuit does not rise to its maximum value instantaneously. This potential rise is delayed briefly until the cathode capacitor, such as the capacitor 617, is charged through the resistor connected in series with it. This delay is provided because the same zero-degree pulse which fires the tubes of the multiplicand ring 503 is also applied to the tubes of the multiplicand gates 507. If the potential rise were instantaneous, part of the zero-degree pulse might pass through the multiplicand gates 507 and introduce an error into the product of a multiplication. With the zero-degree pulse prevented from passing through the multiplicand gates 507, the timed potential signal allows the multiplicand gates to pass only one pulse per time unit.

The output terminals 645 to 652 of the multiplicand gates 507 are connected to the shift matrix 508 (FIG. 23). The positive pulses appearing at these terminals in pulse groups are applied to the shift matrix 508, which passes the pulses to different accumulator stages under control of the digits of the multiplier.

The terminal 667 is connected to the terminal 1022 (FIG. 42) of the power supply to supply operating potential to the plates of the tubes 640 to 643, and to the plate of the second "fugitive one" amplifier 668 in the duo-triode tube 669. The terminal 670 is connected to the lead 549 (FIG. 44) to supply operating potential through the resistor 671 to the plate of the mixer 672, included in the tube 669. The terminal 673 is connected to the terminal 674 (FIG. 40). The amplifier 668 and the mixer 672 are a part of the "fugitive one" circuit, which functions only during a checking multiplication. The operation of this circuit will be explained hereinafter when the remaining part of the "fugitive one" circuit is described.

*Multiplier Ring (FIG. 29)*

The multiplier ring 510 comprises nine gas tubes 680 to 688 inclusive. The tubes 680 to 684 inclusive are mounted on one multiplier ring chassis, and the tubes 685 to 688 inclusive are mounted on another multiplier ring chassis. FIG. 29 is a composite schematic diagram showing the circuits of the two multiplier ring chassis. The multiplier ring tubes are fired in sequence, just as the tubes of the multiplicand ring 503 are. However, not all the tubes 680 to 688 are fired in every sequence. The multiplier ring 510 counts up to the value of the digits of the multiplier, one after another. All of the tubes of the multiplier ring are fired when the multiplier ring is counting up to the digit 9.

The tubes 680 to 688 are fired by tally pulses developed by the tally tube 600. These tally pulses appear at the output terminal 619 of the tube 600 and are applied by way of the input terminal 621 to the upper control grid of the tubes 680 to 688. The tally tube 600 is physically located on one of the chassis of the multiplier ring 510, but electrically it is the last tube in the multiplicand ring 503. When the tally tube 600 is fired by a zero-degree pulse at the end of a multiplicand ring cycle, its cathode goes positive. This positive potential triggers the operation of the multiplicand ring blowout system (FIG. 33), which operates to remove the operating potential from the plates of the multiplicand ring 503. This positive potential appears at the terminal 620, which is connected to the terminal 622 (FIG. 32). The voltage appearing at the terminal 779 (FIG. 32) then appears on the terminal 780 (FIG. 33).

The upper control grids of the tubes 680 to 688 are connected to a terminal 689, which has −35 volts applied thereto by way of the terminal 614 (FIG. 42) in the power supply. The lower control grids of the tubes 680 to 688 are connected to a terminal 690, which has −105 volts applied thereto by way of the terminal 607 in the power supply.

The lower control grid of the tube 680 in the multiplier ring 510 is coupled by way of a terminal 694 to a terminal 691. The positive potential appearing at the terminal 691 is the priming potential for this tube. The cathode of the tube 684 is connected to a terminal 693, which in turn is connected to a terminal 692. The terminal 692 is coupled to the lower control grid of the tube 685. Thus, the output of the fifth tube 684 will prime the sixth tube 685. The cathode of the tube 683 is connected to a terminal 698, which in turn is connected to a terminal 695. The terminal 695 is coupled to the lower control grid of the tube 684. Thus, the output of the fourth tube 683 will prime the fifth tube 684.

Operating potential for the plates of the tubes 680 to 683 and 685 to 688 is supplied from a terminal 696, which is connected to a terminal 697 in the blowout circuit of FIG. 33. Operating potential for the plate of the tube 684 is supplied from the terminal 610, which also is connected to the terminal 697.

During a multiplication, the multiplicand ring 503 develops a tally pulse every time it completes a cycle. This tally pulse signifies that one pulse group, representing all the digits of the multiplicand, has been entered into the shift matrix 508. Thus, in counting tally pulses, the multiplier ring 510 actually counts pulse groups. The first tube 680 in the multiplier ring 510 is constantly primed, so that the first tally pulse applied from the terminal 621 to its upper control grid causes it to fire. As the tube 680 fires, its cathode goes positive. As in the multiplicand ring 503, the positive potential developed at the cathodes of the tubes of the multiplier ring has two functions. This potential primes the next tube in the multiplier ring, and it also is supplied to the output terminals 700 to 708.

The next tally pulse fires the second tube 681, and, in the process, the third tube 682 is primed. This procedure will continue until the multiplier ring 510 counts up to the value of the last digit of the multiplier. As the multiplier ring 510 reaches the value of the last digit of the multiplier, it is blown out by the blowout circuit (FIG. 33). After a brief delay, operation is resumed, and the multiplier ring counts up to the second-to-last digit of the multiplier. The multiplier ring counts up to the value of all of the digits of the multiplier, one after another, from the first to the last, in the course of a multiplication.

*Multiplier Switches (FIGS. 7 and 23)*

The digits of the multiplier are set into the multiplier switches 121 and the check switches 122 by the racks of the accounting machine. The multiplier may be either set into the multiplier switches through the keyboard or taken out of one of the totals provided in the accounting machine.

There are ten multiplier switches 121, and the multiplier may have as many as five places on either side of the decimal point.

Each of the multiplier switches 121 has ten sets of contacts, with each set corresponding to a different digit. One side of each of nine sets of the contacts is connected to a different one of the output terminals 700 to 708 (FIG. 29) of the multiplier ring 510. One side of the tenth set of contacts, as shown in FIG. 23, is connected to the output of the ×0 amplifier 513. The opposing sides of all ten sets of contacts of each multiplier switch 121 are tied together and connected in common to a control grid of an associated tube in the shift ring 511.

The function of a multiplier switch 121 is to apply a positive potential to the control grid of an associated shift ring tube when the multiplier ring 510 counts up to the value of the digit set in the switch. For example, if a multiplier switch 121 is set in the digit 5 position, the multiplier switch presents an open circuit to the signal from the first four tubes, 680 to 683, of the multiplier ring 510. When the fourth tube 683 is fired, the potential appearing on its cathode is applied to the lower control grid of the fifth tube 684 to prime this latter tube. Then, the fifth tally pulse will fire the fifth tube 684. When the cathode of the fifth tube 684 goes positive, the voltage appearing at the terminal 704 at this time is applied through the closed multiplier switch contacts to the control grid of the associated tube in the shift ring 511.

*Shift Ring (FIGS. 30 and 31)*

The shift ring 511 comprises twelve gas tubes 710 to 721. The tubes 710 and 711 are shown in FIG. 30. The tubes 712 to 716 inclusive are mounted on one shift ring chassis, and the tubes 717 to 721 inclusive are mounted on another shift ring chassis. FIG. 31 is a composite schematic diagram showing the circuits of the two multiplier ring chassis. The tubes of the shift ring 511 are fired in sequence, like the tubes of the multiplicand and multiplier rings, 503 and 510, respectively. The shift ring 511 differs from the multiplicand and multiplier rings in that each tube thereof, as it fires, extinguishes the preceding tube. As a result, only one tube is fired and the preceding tube is extinguished at any one time.

Operating potential for the plates of the tubes 710 and 711 is supplied from a terminal 722, which is connected to the lead 549 (FIG. 44) in the control circuit. A terminal 723 is connected to a terminal 724 (FIG. 31) to furnish operating potential for the plates of the tubes 712 to 721.

The upper control grids of the tubes 710 and 711 are connected to a terminal 725, which is in turn connected to the terminal 614 (FIG. 42) in the power supply. The upper control grid of the tube 710 is also connected to a terminal 726, which is in turn connected to the terminal 572 (FIG. 25) of the pulse generator 500. Thus, positive zero-degree pulses are made available to the upper control grids of these tubes. The lower control grid of the tube 710 is connected through a capacitor 727 to a terminal 728, which is in turn connected to the lead 709 (FIG. 44) of the control circuit. The lower control grids of the tubes 710 and 711 are connected to a terminal 729, which is in turn connected to the terminal 607 (FIG. 42) in the power supply. The plates of all the tubes of the shift ring 511 are connected to a terminal 731, at which shift pulses appear. The terminal 731 is connected to a terminal 732 (FIG. 32) of the shift pulse shaper 515.

The cathode of the tube 711 is connected to a terminal 733. The terminal 733 is connected to a terminal 734 (FIG. 31), which is in turn connected to the lower control grid of the tube 712. The cathode of the tube 711 is also connected to a terminal 737, which is in turn connected to the shift matrix 508. The upper control grid of the tube 711 is connected to a terminal 735, which is in turn connected to the terminal 736 (FIG. 29) of the multiplier ring 510.

In FIG. 31, the terminals 738 and 739 are connected to the terminals 607 and 614 (FIG. 42) of the power supply. Each of the terminals 740 to 749 is connected to a different one of the ten multiplier switches 121 and to the side of a multiplier switch which has its ten sets of contacts connected together. The cathode of the tube 721 is connected to a terminal 750, which is connected to a lead 751 (FIG. 44) in the control circuit. The cathode of each of the tubes 712 to 720 is connected to the terminals 753 to 761, respectively, which are in turn connected to the shift matrix 508 (FIG. 23).

At the beginning of a multiplication operation, the start relay K102 (FIG. 43) causes the multiplicand ring 503 to start by connecting the zero-degree pulse output of the pulse generator 500 to the upper control grid of the tube 590 of the multiplicand ring 503. At the same time, the relay K102 causes the shift ring 511 to start by allowing the capacitor 727 to discharge through the lower control grid circuit of the tube 710. The time constant of this control grid circuit is such that the control grid will remain positive for a time sufficient for the zero-degree pulse to drive the upper control grid positive and fire the tube 710.

With the multiplicand and multiplier rings 503 and 510 operating, the multiplier apparatus automatically goes through a trial operation to insure that all of the tubes of the multiplicand and multiplier rings function properly before the multiplier apparatus begins solving the actual multiplication problem. Each time the multiplicand ring 503 cycles, it transmits a tally pulse to the multiplier ring 510. The tally pulses fire the tubes of the multiplier ring 510 in sequence. Meanwhile, the positive voltage developed at the cathode of the tube 710 of the shift ring 511 is applied to the lower control grid of the tube 711 to hold it primed. Since the upper control grid of the tube 711 is connected by way of terminals 735 and X to the cathode of the last tube 688 of the multiplier ring 510, every tube in the multiplicand ring 503 and the multiplier ring 510 will fire before the tube 711 fires and the actual multiplication operation starts.

As the tube 711 fires, it causes the tube 710 to be extinguished. For a brief moment after the tube 711 fires, both the tubes 710 and 711 will conduct simultaneously. Since all the tubes in the shift ring 511 draw plate current, when operating, through the same plate resistor 762 (FIG. 30), this double load drops the potential applied to the plates of these tubes. Since the tube 710 will have been operating for a relatively long interval, the capacitor 763 in its cathode circuit will be fully charged. As the plate potential decreases, the capacitor 763 will hold the cathode of the tube 710 positive, so that its plate actually will go negative with respect thereto. As a result, the tube 710 will cease to conduct. Since the tube 711 will have just started to conduct, the capacitor 764 in its cathode circuit will not be charged. With little or no charge on the capacitor 764 to fix the cathode potential of the tube 711 with respect to ground, this cathode potential will decrease with the plate potential, so that the potential across the tube 711 will be sufficient to maintain current flow. Consequently, the tube 711 will continue to conduct, and the tube 710 will cease to conduct. As each successive tube in the shift ring 511 fires, it will extinguish the preceding tube in the same manner.

While the tube 711 is conducting, the positive potential developed in its cathode circuit is applied by way of the terminals 733 and 734 to the lower control grid of the tube 712 (FIG. 31).

The plate potential, which decreases when the tube 711 or one of the succeeding tubes of the shift ring 511 fires, quickly returns to its original value when the preceding tube is extinguished. The negative-going pulse formed in this manner is called the shift pulse. The shift pulses are appled by way of the terminals 731 and 732 (FIG. 32) to the control grid of the first tube of the shift pulse shaper 515 (FIG. 32). The shift pulse shaper 515 is included in the blowout system. The blowout system reacts to the shift pulses to cause the blowing out of the multiplicand ring 503 and the multiplier ring 510, to cause suspension of the operation of the multiplicand ring 503 for two zero-degree pulse counts, and to cause an ×0 signal to be applied to the multiplier switches 121. The manner in which the blowout system operates is described in detail hereinafter.

The multiplication operation actually begins with the firing of the tube 711 and the subsequent operation of the blowout system. The tube 711 holds the tube 712 primed to sense a firing signal applied through closed contacts in one of the multiplier switches 121 in which the lowest (hundredths) digit is set. The ×0 signal from the ×0 amplifier 513 is applied to the digit zero contacts in all the multiplier switches 121. If the digit zero contacts in any one of the multiplier switches other than the hundredths switch is closed, the ×0 signal has no effect on the shift ring 511, because the associated shift ring tube 712 is not primed. If the digit zero contacts in the hundredths switch are closed, the ×0 signal is applied by way of the terminal 740 to the upper control grid of the tube 712 to cause that tube to be fired. The firing of the tube 712 will cause the tube 711 to be extinguished and will cause the tube 713 to be primed. This procedure will then start over again, with the tube 713 primed to sense a firing signal applied to it by way of the terminal 741 through contacts of the multiplier switches 121 at the tenths level. If the hundredths multiplier switch is set at some digit other than zero, the ×0 signal has no effect, and the multiplicand ring 503 will begin to operate.

Each time the multiplicand ring 503 cycles, the multiplicand gates 507 transmit a pulse group to the shift matrix 508, and the multiplicand ring 503 transmits a tally pulse to the multiplier ring 510. Each tally pulse fires an additional tube in the multiplier ring 510. When the multiplier ring 510 counts up to the value of the digit set in one of the multiplier switches 121, which switch is coupled to the primed shift ring tube, a positive potential is applied through the switch contacts of the multiplier switch which are closed to the upper control grid of the associated shift ring tube. The tube in question will fire, effecting the priming of the next tube in the shift ring 511, the extinguishing of the preceding tube, and the triggering of the blowout system for the multiplicand and multiplier rings 503 and 510, respectively. After a two-pulse-count delay, the procedure will be repeated for the next higher digit of the multiplier.

The potential developed in the multiplier ring 510 which is used to fire the tubes of the shift ring 511 is sustained until the multiplier ring is blown out. During this brief interval, it may be possible that the tube following the tube fired could become primed. If the same digit were set in the two multiplier switches associated with the two primed shift ring tubes, the second of the two primed tubes could fire almost simultaneously with the first. The shift ring would, in effect, skip a digit of the multiplier. To prevent such an error from being introduced in the multiplication operation, the firing signals from the multiplier switches 121 are applied through a capacitor, such as the capacitor 765 in the upper control grid circuit of the tube 712, so that the firing signal appears at the upper control grid of a shift ring tube as a sharp rise and fall rather than as a sustained potential.

During a multiplication operation, all the tubes of the shift ring 511 fire once. When the last tube 721 fires, the positive potential developed in its cathode circuit is applied to the lead 751 of the control circuit of FIG. 44 by way of the terminal 750. This positive potential signal indicates the end of the multiplication operation. The control circuit then sets up the checking operation in a manner to be explained hereinafter when the control circuit is described.

Blowout Control Unit (FIG. 32)

The blowout control unit comprises the shift pulse shaper 515 and the blowout input mixers 521. The blowout control unit has several functions. It develops pulses for conditioning the blowout circuits 505 and 512 for operation; it delays operation of the multiplicand ring 503 for two zero-degree pulse counts; and it develops the ×0 signal. To perform these functions, the blowout control unit is provided with three inputs; that is, the shift pulses, the tally pulses, and the negative zero-degree pulses.

The blowout control unit operates in the following general manner: Every time it receives a tally pulse from the multiplicand ring 503, it conditions the multiplicand ring blowout circuit 505 for operation. Every time it receives a shift pulse from the shift ring 511, it conditions the multiplier ring blowout circuit 512 for operation, and each of the shift pulses also sets up the blowout control unit so that the next two negative zero-degree pulses from the pulse generator 500 cause it to condition the multiplicand ring blowout circuit 505 for operation and to develop a ×0 signal.

The blowout input mixers 506 comprise the right-hand section 770 of duo-triode tube 771, and sections 772 and 773 of duo-triode tube 774. The cathodes of the tube sections 770, 772, and 773 are connected to ground. The plates of these tube sections are connected through a common plate resistor 776 to the terminal 777, which in turn is connected to the lead 549 (FIG. 44) in the control circuit. The control grids of these tube sections are connected to the terminal 778, which in turn is connected to the terminal 577 of the power supply. These tube sections are thus biased below cut-off. When a positive pulse is applied to the control grid of any of these tube sections, current will flow through the tubes and the plate load resistor 776. The potential at the plate of these tubes will decrease almost to ground potential. This decrease in potential will appear at the terminal 779 and is applied to the terminal 780 (FIG. 33) to condition the multiplicand ring blowout circuit for operation.

All the tally pulses developed by the multiplicand ring 503 are applied by way of terminal 622 to the control grid of the tube section 772. The other two tube sections 770 and 773 are triggered by the output of the delayed shift pulse generator 516 under the conditions described hereinafter. When any one of the three tube sections 770, 772, or 773 conducts, the multiplicand ring blowout circuit 505 is conditioned so that the next minus 180-degree pulse will trigger it into operation.

The shift pulse shaper 515 comprises two triode amplifiers 784 and 785 in a single envelope 786. The negative-going shift pulses developed in the output of the shift ring 511 appear at the terminal 732 and are applied to the control grid of the amplifier 784. The output of the amplifier 784 comprises positive-going pulses which are sharper than the shift pulses applied to the input of the amplifier. The output of the amplifier 785 comprises negative-going pulses which are still sharper than the pulse output of the amplifier 784. The output of the amplifier 785 appears at the terminal 787 and is applied to the terminal 788 (FIG. 33) to condition the multiplier ring blowout circuit 512 for operation and also to set up the delayed shift pulse generator 516 for operation.

The control grid of the amplifier 784 is connected to the terminal 775, which is in turn connected to the terminal 664 (FIG. 42) of the power supply.

The delayed shift pulse generator 516 comprises two shift pulse delay flip-flop circuits 790 and 791. One circuit comprises sections 792 and 793 of the duo-triode tube 794, and the other circuit comprises sections 795 and 796 of the duo-triode tube 797.

The primary function of the delay flip-flop circuits 790 and 791 is to delay the operation of the multiplicand ring 503 for a two-pulse count every time the shift ring 511 is caused to shift in its operation. Its secondary function is to cause the ×0 amplifier 513 to operate during the delay period.

Between the shifting operations of the shift ring 511, the flip-flop circuits 790 and 791 are sensitive only to shift pulses. At the time that the shift ring 511 is caused to shift in its operation, the tally pulse which initiated the shifting operation also causes the multiplicand ring blowout circuit 512 to be conditioned for operation, and causes the shift ring 511 to develop a shift pulse. The shift pulse appearing at the terminal 732, after passing through the shift pulse shaper amplifiers 784 and 785, is applied to the control grid of the section 792 of the tube 794, so that the section 792 is cut off (normally conducting) and the section 793 is caused to conduct (normally cut off).

When the next zero-degree pulse is developed in the pulse generator 500, it is applied to the multiplicand ring 503, and a negative zero-degree pulse is applied to the control grid of the section 793 of the tube 794 from the terminal 798. The terminal 798 is connected to the terminal 575 (FIG. 25) of the pulse generator 500. The positive zero-degree pulse will fire the first tube 590 in the multiplicand ring 503. At the same time, the negative zero-degree pulse will cause the section 793 to be cut off and the section 792 to be conducting. In returning to its original state, the flip-flop circuit 790 sets up the multiplicand ring blowout circuit 512 so that the tube of the multiplicand ring 503 which was fired by the positive zero-degree pulse from the pulse generator 500 is blown out by the first subsequent 180-degree pulse from the pulse amplifier 502.

The flip-flop circuit 790, in returning to its original state, also sets up the flip-flop circuit 791 so that the section 795 is cut off and the section 796 is caused to conduct.

When the next positive zero-degree pulse is developed in the pulse generator 500, it is applied to the multiplicand ring 503, and a negative zero-degree pulse is applied to the flip-flop circuits 790 and 791. The positive zero-degree pulse fires the first tube in the multiplicand ring 503. The negative zero-degree pulse has no effect on the flip-flop circuit 790, but it does return the flip-flop circuit 791 to its original state. In returning to its original state, the flip-flop circuit 791 causes the plate potential to be removed from the tubes of the multiplicand ring, thus blowing out the first tube thereof again. At the same time, the flip-flop circuit 791 causes the section 804 of the ×0 amplifier to conduct.

When both of the flip-flop circuits 790 and 791 have returned to their original states, the multiplicand ring 503 resumes its operation in response to the next positive zero-degree pulse. The flip-flop circuits will remain inoperative until they again have a shift pulse applied to them.

Normally, the sections 792 and 795 of the tubes 794 and 797, respectively, are conducting. Under this condition, the delayed shift pulse generator 516 is sensitive only to the negative shift pulses. Whenever the shift ring 511 develops a shift pulse, it is applied through the shift pulse shaper 515 to the control grid of the conducting section 792 of the tube 794.

The above shift pulse causes the flip-flop circuit 790 to change its state, whereby the section 793 of the tube 794 is caused to conduct, and the section 792 is cut off. As the flip-flop circuit 790 changes its state, the potential on the plate of the section 792 will rise, and the potential on the plate of the section 793 will decrease. The positive pulse developed by this potential rise on the plate of the section 792 is applied through the capacitor 798a to the control grid of section 795 of the flip-flop circuit 791. Since this pulse is positive and the tube section 795 is conducting at this time, the flip-flop circuit 791 does not change its state. The negative pulse developed by the decrease in the potential on the plate of the section 793 is applied to the control grid of the section 770 of the duo-triode tube 771. The section 793 is biased below cut-off at this time, and so it is not affected by the negative pulse, the change in state of the flip-flop circuit 790 has no immediate effect on the other circuits in the blowout control unit, but in changing its state it has become sensitive to negative zero-degree pulses.

While the shift pulse is setting up the flip-flop circuit 790 in the manner described just heretofore, the multiplicand ring 503 is being blown out, since every shift pulse is initiated by a tally pulse and every tally pulse causes the multiplicand ring to be blown out. Once the tubes of the multiplicand ring 503 are blown out, it is the function of the flip-flop circuits 790 and 791 to suspend its operation for two pulse counts.

The next negative zero-degree pulse is applied to the control grids of the sections 793 and 796 of the flip-flop circuits 790 and 791, respectively. Since the flip-flop circuit 791 is still in its normal state at this time, the section 796 is not conducting the negative zero-degree pulse does not affect it. However, the state of the flip-flop circuit 790 has been changed by the shift pulse, so that the section 793 is conducting. The negative zero-degree pulse will cause the section 793 to be cut off, which will cause the section 792 to conduct. As the flip-flop circuit 790 returns to its normal state, the potential on the plate of section 792 decreases and the potential on the plate of the section 793 increases. The potential decrease on the plate of the section 792 is transformed into a negative pulse in passing through the capacitor 798a and is supplied to the control grid of the conducting section 795 of the flip-flop circuit 791, causing that flip-flop circuit to transfer. With the flip-flop circuit 791 transferred, it is sensitive to the next negative zero-degree pulse. The potential increase on the plate of the section 793 is transformed into a positive pulse in passing through the capacitor 800 and is applied to the control grid of the section 770 of the duo-triode tube 771, causing that section to condition the multiplicand ring blowout circuit 505 for operation.

The next negative zero-degree pulse is also applied to the sections 793 and 796 of the flip-flop circuits 790 and 791. The flip-flop circuit 790 having been returned to its normal state, its section 793 is no longer sensitive to negative zero-degree pulses. On the other hand, the flip-flop circuit 790, upon returning to its normal state, has caused the flip-flop circuit 791 to become sensitive to negative zero-degree pulses. This next negative zero-degree pulse causes the section 796 of the flip-flop circuit 791 to stop conducting, and causes the section 795 to start conducting. As the section 796 stops conducting, the potential on its plate rises. This potential rise is converted to a sharp positive pulse by the capacitor 801 and is applied to the control grid of the section 773 of the duo-triode tube 774. The output of the section 773 causes the multiplicand ring blowout circuit 505 to function.

As the flip-flop circuit 791 returns to its normal state, the potential rise on the plate of the section 796 is applied by way of a capacitor 803 to the control grid of the ×0 amplifier 513, section 804 of the tube 771. The resultant surge of current through the cathode resistor 802 causes a positive pulse to be developed at the cathode of the section 804. This positive pulse is applied by way of the terminal 805 to the digit 0 contacts of each of the ten sets of multiplier switches 121 (FIG. 23).

The function of the ×0 amplifier 513, section 804, of the tube 771, is to develop a positive pulse to fire the primed tube of the shift ring 511 if the multiplier switch associated therewith has its digit 0 contacts closed. This positive pulse fires the primed tube during the delay period before the multiplying device can develop a pulse group. This operation corresponds to multiplication by zero.

*Blowout Circuit (FIG. 33)*

FIG. 33 is a composite schematic diagram showing the blowout circuit which is used for the multiplicand ring blowout circuit 505 and the multiplier ring blowout circuit 512 of FIG. 22. Each of the blowout circuits 505 and 512 operates in the same manner. During normal operation, the blowout circuits regulate the potentials applied to the plates of the multiplicand and the multiplier rings 503 and 510. When the blowout circuits receive a conditioning pulse from the blowout control unit (FIG. 32), the operating potential from the plates of the multiplicand and multiplier rings is removed upon the subsequent occurrence of a 180-degree pulse.

The blowout circuit comprises a flip-flop circuit 810, including sections 811 and 812 of a duo-triode tube 813; a blowout amplifier 814, including a section 815 of a duo-triode tube 816; a pair of blowout pentodes 817 and 818; and a regulating amplifier 819, including a section 820 of the tube 816. The operating potential for the plates of the tubes of the blowout circuits is supplied from the terminal 821, which is connected to the lead 549 (FIG. 44).

The input signal for the flip-flop circuit 810 is a negative pulse which is applied to the control grid of the section 812 either from the terminal 789 to trigger the multiplicand ring blowout circuit or from the terminal 788 to trigger the multiplier ring blowout circuit. The section 812 is normally conducting and is cut off by the negative pulse, causing the section 811 to conduct. As the flip-flop circuit 810 changes its state, the potential decrease which occurs at the plate of the section 811 is transformed into a negative pulse and applied to the control grid of the section 815 of the tube 816. Since the section 815 is biased below cut-off, the negative pulse has no effect.

The negative 180-degree pulses appearing at the terminals 584 and 585 (FIG. 26) of the pulse amplifier 502 are applied to the central grid of the section 811 of the tube 813 by way of terminals 822 and 823, respectively. These negative pulses ordinarily have no effect on the section 811, since this section of the tube 813 is not normally conducting. However, after the flip-flop circuit 810 has changed its state, the first 180-degree pulse will cut off the section 811, causing the flip-flop circuit 810 to change back to its normal state. As the flip-flop circuit 810 changes back to its normal state, a potential rise occurs at the plate of the section 811. This potential rise is transformed into a positive pulse, which is applied to the control grid of the section 815 of the tube 816, causing this section to conduct.

As the section 815 of the tube 816 conducts, the potential on its plate decreases. This negative potential is applied to the control grids of the blowout pentodes 817 and 818.

The blowout pentodes 817 and 818 are connected in parallel with each other and in series with the tubes of the associated multiplicand ring 503, by way of the terminals 609, 608, and 610, or in series with the tubes of the associated multiplier ring 510 by way of the terminals 697, 696, and 610. Since the pentodes 817 and 818 are actually in the plate circuits of the tubes in the multiplicand or multiplier rings, their cathodes are maintained at a relatively high potential. For this reason, the control and screen grids of the pentodes 817 and 818 and the plate of the blowout amplifier 814 are connected together without use of a capacitor for direct current isolation purposes.

When the section 815 of the blowout amplifier 814 begins to conduct and its plate potential decreases, the potentials on the control and screen grids of the pentodes 817 and 818 also decrease, and the pentodes are cut off. As current ceases to flow through the pentodes, the plates of the tubes in the multiplicand or multiplier rings go negative with respect to the cathodes of these tubes, because of the charged capacitors in the cathode circuits. As a result, all of the tubes in the multiplicand or multiplier rings which were conducting are extinguished.

The multiplicand and multiplier rings 503 and 510 present widely varying loads to the blowout tubes 817 and 818 in their associated blowout circuit. In both the multiplicand and multiplier rings, none of their tubes are conducting at the beginning of an operating cycle. The multiplicand ring tubes 590 to 600 operate one at a time until all eleven tubes are conducting. The multiplier ring tubes 680 to 688 operate one at a time, but the number of tubes fired in a given sequence varies between one and nine. The regulating amplifier 819 operates on the blowout tubes 817 and 818 to hold the potential applied to the plates of the tubes of the multiplicand and multiplier rings 503 and 510 approximately constant throughout a full sequence of their operation.

The potential applied to the control grid of the regulating amplifier 819 is taken from a voltage divider network extending between the cathodes of the blowout tubes 817 and 818 and a terminal 825, at which a −105-volt D.C. potential appears. The terminal 825 is connected to the terminal 607 (FIG. 42) in the power supply. Thus, the potential applied to the control grid of the regulating amplifier 819 is proportioned to the potential at the cathodes of the tubes 817 and 818, and this potential is the potential which is applied to the plates of the tubes of the multiplicand and multiplier rings.

If the potential at the cathodes of the tubes 817 and 818 should decrease, which is a condition normally occurring whenever a tube of the multiplicand or multiplier ring is fired, the potential at the control grid of the regulating amplifier 819 will decrease proportionately. This reduction in control grid potential will cause the current through the regulating amplifier to decrease and will cause its plate potential to rise. The plate of the regulating amplifier 819 is connected with the plate of the blowout amplifier 814 to the control grids of the blowout tubes 817 and 818. The potential rise at these control grids will increase current flow through the blowout tubes, thus lowering their effective plate resistance and increasing the potential applied to the plates of the tubes in the multiplicand and multiplier rings. In this way, the regulating amplifier circuit compensates for an increase in loading on the blowout tubes 817 and 818.

If the potentials at the cathodes of the tubes 817 and 818 increase for some reason, the regulating amplifier circuit will operate in the opposite manner to return the potential to the proper value.

Shift Matrix (FIGS. 23, 24, 35, and 36)

The actual multiplication is performed in the multiplying means or shift matrix 508. Two sets of input signals are applied to the shift matrix. One set consists of a series of pulse groups representing the multiplicand, and the other set consists of a series of positive potential signals of various lengths, which represent the multiplier. The output of the shift matrix 508 consists of pulses which are transmitted by different circuit paths to the various stages of the accumulator 509.

The pulses representing the multiplicand are the output signals appearing at the terminals 645 to 652 (FIG. 28) of the multiplicand gates 507. Each digit of the multiplicand is represented by a corresponding number of pulses applied to a particular one of these terminals. Each pulse is considered to have a unit value, such as 0.01, 0.1, 1, 10, 100, etc., depending upon the position of the represented digit with reference to the decimal point. All the pulses applied to a particular one of the terminals 645 to 652 have the same value. One set of pulses applied to the various terminals and representing all the digits of a multiplicand constitute a pulse group. The number of pulse groups transmitted to the shift matrix 508 from the terminals 645 to 652 in the process of solving a multiplication problem is determined by the digits of the multiplier.

The positive potential signals, representing the digits of the multiplier, are the output signals appearing at the terminals 753 to 761 (FIG. 31) of the shift ring 511. These signals are applied by way of separate leads to the shift matrix 508. These signals are applied to the leads in sequence. The sequence is such that the signal representing the last digit in the multiplier is applied first. The length of time for which a signal is applied to a lead is proportional to the represented digit. Thus, these signals have a unit value, such as 0.1, 1, 10, etc., depending upon the position of the represented digit with reference to the decimal point. All of the pulses applied to the same lead have the same value. The basic time unit is the length of time required to generate a full pulse group.

The shift matrix 508 is represented in the simplified schematic diagram of FIGS. 23 and 25. The shift matrix comprises seventy-seven diode circuits, which are represented by the circles in FIG. 23. The diode circuit is shown in FIG. 36.

Referring to FIG. 36 first, a potential of +75 volts D.C. is applied from the terminal 664 (FIG. 42) in the power supply to the cathode circuit of the diode tube 830. This potential prevents the tube 830 from conducting when either the pulse input signals from the multiplicand gates 507 or the priming input signals from the shift ring 511 are applied alone to the plate thereof. However, when both input signals are applied to the plate of the tube 830 simultaneously, it is driven positive with respect to the cathode, causing the tube to conduct. As the tube 830 conducts, a positive output pulse appears on the cathode thereof and is transmitted to one of the accumulator stages. Every output pulse of the tube 830 has a value equal to the product of the unit value of the input signals applied to its plate.

Referring again to FIGS. 23 and 24, the leads indicated generally at 831 represent leads to which the input pulses from the multiplicand gates 507 are applied, while the leads indicated generally at 832 represent leads to which the positive potential signals from the shift ring 511 are applied. The horizontal leads indicated generally at 833 represent output leads to the input amplifiers 517.

Referring now to FIG. 35, this figure shows a portion of the shift matrix 508 involved in the following illustrative multiplication problem. If the multiplicand were equal to the number 21.32, it would be represented by a pulse group composed of two pulses applied to the diagonal $10^3$ lead, one pulse applied to the diagonal $10^2$ lead, three pulses applied to the diagonal $10^1$ lead, and two pulses applied to the diagonal $10^0$ lead. Similarly, if the multiplier were equal to the number 302, a positive potential signal two time units long would be applied to the vertical $10^0$ lead, and a positive potential signal three time units long would be applied to the vertical $10^2$ lead. The pulses of a single pulse group are applied to the diagonal leads 831 concurrently. The positive potential signals are applied to the vertical leads 832 in sequence.

As the multiplication process begins, the positive potential signal which is two time units long is applied to the vertical $10^0$ lead to all the diodes on that lead. While this signal is applied, two pulse groups are applied from the multiplicand gates 507 to the $10^0$, $10^1$, $10^2$, and $10^3$ diagonal leads 831. The only diodes that conduct, however, are those diodes at the intersection of two signal-bearing leads. One conducting diode is at the intersection of the vertical $10^0$ lead and the diagonal $10^0$ lead. Since two of the pulses in each of the two pulse groups are applied to the diagonal $10^0$ lead, this diode passes four pulses to the horizontal $10^0$ lead. The operation of this diode corresponds to the multiplication of two times two, the digits at the units level in the multiplicand and the multiplier. The arithmetical parallel is shown in the last column of the example worked out on the right of FIG. 35.

A second conducting diode is at the intersection of the vertical $10^0$ and the diagonal $10^1$ leads. As three of the pulses in each pulse group are applied to the diagonal $10^1$ lead, six pulses in all pass through this diode to the horizontal $10^1$ lead. In this instance, the input pulses have a value of $10^1$ and the time units have a value of $10^0$, so the pulses on the horizontal $10^1$ lead also have a value of $10^1$. Since no more pulses are applied to the horizontal $10^1$ lead, the total in the accumulator 509 coupled to this lead at the end of the operation is equal to 60. The arithmetical parallel is shown in the second-to-last column of the example shown.

The third and fourth conducting diodes occur at the intersections of the diagonal $10^2$ and $10^3$ leads with the vertical $10^0$ lead. Their output pulses are applied to the horizontal $10^2$ and $10^3$ leads, respectively. Additional output pulses are applied to the horizontal $10^2$ and $10^3$ leads later in the multiplication process.

After the second pulse group passes through the shift matrix 508, the shift ring 511 removes the positive potential signal from the vertical $10^0$ lead and applies a similar signal to the vertical $10^1$ lead. However, since the multiplier digit in the tens position is zero, the shift ring 511 shifts again before the multiplicand ring 503 generates any pulses. In shifting, the shift ring 511 applies a positive potential signal to the vertical $10^2$ lead. This signal is three time units long and represents the digit 3 in the multiplier 302.

While the signal which is three time units long is applied to the vertical $10^2$ lead, three pulse groups are applied to the shift matrix 508. The pulses travel two more rows to the right to find the diodes which will pass them to the horizontal output leads 833. The pulses on the diagonal $10^0$ lead pass to the horizontal $10^2$ lead, the pulses on the diagonal $10^1$ lead pass to the horizontal $10^3$ lead, etc. In effect, the value of the pulses is multiplied by one hundred, the value of the positive potential signal applied to the vertical $10^2$ lead, and the digits represented by the pulses are "entered" two columns to the right of the preceding entry.

Thus, the method used by the shift matrix 508 to solve a multiplication problem parallels the arithmetical method. The horizontal output leads 833 correspond to the columns, and the pulse groups applied to the diagonal leads 831 correspond to the multiplicand. The number of times the multiplicand is entered in a particular group of "columns" and the shifting of the "entries" is dependent upon the values of the digits of the multiplier.

In the third column from the left in the example, the total is graded in ten. Whenever this condition arises in the solution of a multiplication problem, the accumulator stage totaling the pulses on that particular horizontal output lead generates a carry pulse, which is transmitted to the next higher accumulator stage. This carry operation is described in detail hereinafter when the operation of the accumulator 509 is explained.

*Accumulator Input Amplifiers (FIG. 37)*

There is an accumulator input amplifier 517 associated with each of the thirteen accumulator stages of the accumulator 509 in the multiplying device. The accumulator input amplifier 517 is a two-stage amplifier and comprises sections 835 and 836 of a duo-triode tube 837. The two stages of the amplifier are connected in series.

Two different types of signals may be applied to an input amplifier, the positive pulses applied from the shift matrix 508 by way of the leads 833, and the negative carry pulses generated in and applied by the next lower one of the accumulator stages. The accumulator stages are responsive only to negative pulses, so the output appearing at the terminal 838 is negative. Consequently, the positive input pulse appearing on one of the output leads 833 of the shift matrix 508 is applied to the control grid of the section 836 by way of the terminal 839. After amplification, this pulse appears as a negative pulse on the output terminal 838. The negative input pulse (the carry pulse from the next lower one of the accumulator stages) is applied by way of the terminal 840 to the control grid of the section 835 and, after amplification in the two serially-connected amplifier stages, appears as a negative pulse on the terminal 838.

The control grid of the section 836 of the tube 837 is connected through a resistor 841 to a terminal 842, which in turn is connected to the terminal 577 (FIG. 42) in the power supply. The control grid of the section 836 is also connected through a capacitor 843 and a resistor 844 to a terminal 845, which in turn is connected to the terminal 664 (FIG. 42) in the power supply. Operating potential for the plates of the tube 837 is supplied from a terminal 846, which in turn is connected to the lead 549 (FIG. 44) in the control circuit.

The amplifier section 835 is biased at ground potential, so that a fairly heavy current flows through this section in the absence of a carry pulse applied to its control grid. The negative carry pulses will drive the section 835 to its cut-off point. The amplifier section 836 is so biased that it is cut off in the absence of a pulse being applied to its control grid from the shaft matrix 508. The positive pulses from the shift matrix 508 will drive the section 836 from cut-off to saturation, to develop pulses of maximum amplitude in its output circuit.

*Product and Check Amplifiers (FIG. 38)*

A product amplifier 518 and a check amplifier 528 are associated with each of the Banks 1 to 10 of the accumulator 509. The product amplifier 518 and the check amplifier 528 form the amplifier sections 850 and 851, respectively, of a duo-triode tube 852. These amplifier sections are not connected in series but, instead, are both connected so as to control one of the product magnets 242 under different conditions.

The product amplifier 518 energizes its associated product magnet 242 at the end of a multiplication operation. The energization of a product magnet 242 by its product amplifier is a part of the process of transferring the final digit from one of the accumulator stages to its associated product switch 123. The check amplifier 528 energizes its associated product magnet at the end of a checking operation. The energization of a product magnet 242 by its check amplifier indicates that the final digit from one of the accumulator stages has been checked and found to be correct. If all the digits of a product are found to be correct, the product magnets 242 then free the multiplying device for further operation.

Each of the sections 850 and 851 is included in an amplifier circuit having a capacitor connected between its plate and its cathode to prevent oscillation. The plates of the sections 850 and 851 are connected together through a resistor 853, through the coil of an associated product magnet 242, and through the closed contacts K113bc2 to a terminal 854. The terminal 854 is connected to a +300-volt D.C. supply terminal 1044 (FIG. 42) in the power supply. A lead 855, which includes the contacts K113a1, interconnects the junction point between the resistor 853 and the coil of the associated product magnet 242, and the negative output side of the bridge rectifier CR101 (FIG. 43). Another lead 856, which includes the contacts K113ac2, interconnects the junction point between the coil of the associated product magnet 242 and the contacts K113bc2, and the lead 1069 (FIG. 43), which is adapted to carry a potential of approximately +90 volts D.C. The contacts K113a1, K113ac2, and K113bc2 are operated by the product magnet pull-in relay K113 (FIG. 46). The product magnet pull-in relay K113 also operates the contacts K113ac1 and K113bc1 (FIG. 45) and the contacts K113a1 to K113a5 (FIG. 47). The other product magnet pull-in relay K114 (FIG. 46) operates the contacts K114a1 to K114a5 (FIG. 47). The magnet pull-in relays K113 and K114 are included in the control circuit of FIGS. 45 and 46 to insure that after a scanning operation the pawls 243 (FIG. 6) of the product magnets 242 are correctly inserted between the teeth of the stop ratchets 233. If such was not the case, then the product transfer pinions 250 could not mate properly with the rack extensions 125 when the product is attempted to be transferred from the product switches 123 to the accounting machine, and damage to the machine might result. This is a condition which might occur if power were lost during the scanning operation. The function of the magnet pull-in relays K113 and K114 will be explained in more detail hereinafter when the operations of the control circuits of FIGS. 45, 46, and 47 are described.

The cathode of the product amplifier section 850 is connected to a terminal 857, which in turn is connected to a lead 1081 (FIG. 44), while the cathode of the check amplifier section 851 is connected to a terminal 858, which in turn is connected to a lead 1088 (FIG. 44).

The control grid of the product amplifier section 850 is connected to a terminal 859, which in turn is connected to its associated product switch 123, while the control grid of the check amplifier section 851 is connected to a terminal 860, which in turn is connected to its associated check switch 122.

The product amplifier section 850 will be caused to conduct after a multiplication operation is completed in the multiplying device. As the movable contact of the associated product switch 123 contacts the fixed contact carrying the +165 volts D.C. potential associated with the product digit, this potential is applied by way of the terminal 859 to the control grid of the section 850. This potential is sufficient to cause the tube section 850 to conduct. Similarly, the check amplifier section 851 will be caused to conduct during a checking operation. If an accumulator stage and the associated check switch 122 register the same digit, the +165 volts D.C. potential is applied through the check switch to the control grid of the section 851 by way of the terminal 860. This potential from the check switch 122 is sufficient to cause the section 851 to conduct.

Certain portions of the power supply (FIGS. 41 and 42) and the control circuit (FIGS. 43 and 44) of the multiplying device interact to control the operation of the product and check amplifiers.

As shown in FIGS. 41 and 42, at the terminal 551 there occurs the +200 volts D.C. potential which is applied to the terminal 550 (FIG. 44). This potential is then applied by way of the lead 1081 or 1088 to the cathode of the product amplifier section 850 or the check amplifier section 851. At the terminal 1044 of the power supply, there occurs the +300 volts D.C. potential which is applied to the terminal 854 (FIG. 38). This latter supply potential is isolated from ground except through the cathode circuits of the product and check amplifiers 518 and 528, respectively. The +300 volts D.C. potential establishes the plate-to-cathode potential for all of the product and check amplifiers.

The signals applied to the control grids of the product and check amplifiers 518 and 528, respectively, are positive voltages which may assume any one of four magnitudes relative to ground potential; that is, +165 volts D.C., +125 volts D.C., +85 volts D.C., or +35 volts D.C. The circuits of the product and check amplifiers are so designed that under certain conditions only a voltage of +165 volts D.C. applied to either of the control grids of the tube 852 will cause this tube to conduct enough current to energize the product magnet 242 in its plate circuit. Under other conditions, none of the voltages normally applied to the control grids of the tube 852 are sufficient to cause the tube to energize its associated product magnet 242.

With the contacts K103a1 and K107a2 open, as shown in FIG. 44, the +200 volts D.C. potential appearing at the terminal 551 (FIG. 42) is applied to the terminal 550, whence it is applied through resistors 861 and 862 to the cathodes of the product amplifiers and check amplifiers 518 and 528, respectively. The +200 volts potential is not dropped by the resistors 861 and 862 because current is not flowing through these circuits. There is no current flow because the maximum voltage which may appear on a control grid of a product or check amplifier is limited to +165 volts D.C., and so these amplifiers are cut off.

When the contacts K103a1 close, however, the resistor 861 is placed in parallel with a resistor 1039 (FIG. 42) in a voltage divider 1038, which develops a nominal voltage of +125 volts D.C. As a result, the distribution of voltage across the voltage divider 1038 changes, and the voltage at the junction point of the resistors 1039 and 1040 will fall to approximately +169 volts D.C. This latter voltage is applied by way of the lead 1081 to the cathodes of the product amplifiers 528 (section 850 of tube 852, for example).

When the contacts K107ac2 are closed and the contacts K105b1 are opened, the voltage at the junction point of the resistors 1039 and 1040 will drop to approximately +169 volts D.C. in the same manner, but in this case it is applied by way of the lead 1088 to the cathodes of the check amplifiers 518 (section 851 of tube 852, for example). Since the product amplifiers 518 and the check amplifiers 528 operate at different times, the circuit paths from the terminal 1024 to the lead 1081 or the lead 1088 are never closed simultaneously.

It will be readily apparent, when the control circuits of FIGS. 43 and 44 are described and explained in detail hereinafter, that the contacts K107ac2 are closed when the circuit path from the terminal 1024 to the lead 1081 is closed, and that the contacts K107bc2 are closed when the circuit path from the terminal 1024 to the lead 1088 is closed. Thus, the contacts K107ac2 and K107bc2 complete the plate supply circuit for the same product and check amplifier tube (tube 852, for example) that has the potential of +165 volts D.C. applied to its cathodes. This combination of conditions permits the product and check amplifier tubes to conduct if their control grids are at approximately +165 volts D.C. However, if the control grid of a tube is at one of the three lower potentials which it may assume, the control grid is more than 35 volts negative with respect to the cathode, so that the tube is in its cut-off state.

The terminal 1087 (FIG. 44) is connected through the contacts K107ac2 to the lead 1088 or through the contacts K107bc2 to the lead 1081. Thus, plate current for a product and check amplifier tube will not flow through the resistors 861 or 862, and the potential on the cathodes of the tube does not rise as the tube starts to conduct. The product and check amplifier circuit thus is insured of its ability to distinguish between the two highest potentials applied to a control grid of its associated tube.

The +300 volts D.C. power supply for the product amplifiers 518 and the check amplifiers 528 is isolated from ground, except through the cathode circuits of these amplifiers, because a second path would tend to stabilize the voltage applied to the cathodes of these amplifiers. Without the above circuit arrangement, the cathode potential of a product or check amplifier could not be changed so readily from +200 volts D.C. to +169 volts D.C., and the circuit would not be sensitive to the proper control grid voltage.

As pointed out heretofore, the positive side of the +300 volts D.C. power supply is connected to one side of all of the product magnets 242. The other side of each product magnet is connected through a current-limiting resistor 853 to the plates of the associated tube section 850 or 851. When either tube section 850 or 851 conducts sufficiently, the product magnet 242 is energized.

*Accumulator (FIG. 39)*

Each accumulator stage of the accumulator 509 comprises a ten-condition circuit which counts input pulses. On every tenth input pulse, the accumulator stage will emit a carry pulse and start the counting operation over again. At the end of a multiplication operation, the accumulator stage will register the last digit of the total number of input pulses which it receives. The preceding digits will be represented by the number of carry pulses developed and transmitted to the next higher accumulator stage.

As shown in FIG. 24, thirteen accumulator stages are used in the multiplying device. Ten of them, the Bank 1 to 10 accumulator stages, register the ten digits which can occur in a product. The remaining three accumulator stages function at the 0.001, 0.0001, and 0.00001 levels. The digits which these last three accumulator stages register are never read out, but the carry pulses which they produce may affect the product.

Twelve of the thirteen accumulator stages have identical circuits. The accumulator stage which functions at the 0.001 level is arranged in a manner shown by the dashed leads 900 in FIG. 39, so that it begins counting at "five" rather than at "zero." This accumulator is made to function this way so that the product is rounded off at the half-cent points.

In FIG. 39 is shown the circuit of one of the accumulator stages; that is, the Bank 10 accumulator stage. The accumulator stage comprises five tubes, 901 to 905. The tubes 901 to 905 are duo-triode tubes and are connected in flip-flop circuits 906 to 909, while the tube 905 comprises three diodes therein and is connected in a restorer circuit 910. The flip-flop circuits 906 to 909 count pulses transmitted thereto from the input amplifiers 517, while the restorer circuit 910 returns the flip-flop circuits to their zero state. Each of the flip-flop circuits 906 to 909 has two stable states. In one state, one triode section conducts, and the other triode section does not. In the other state, the triode sections reverse their functions. Once a flip-flop circuit assumes one of its states, it remains in that state until a negative pulse is applied to the control grids of its tube by way of the terminal 911. The terminal 911 is connected to an associated input amplifier 517.

The flip-flop circuits 906 to 909 are assigned separate values of 1, 2, 4, and 8, respectively. The value registered by an accumulator stage at any particular moment is equal to the total of the values of the flip-flop circuits which are in their "on" state. A flip-flop circuit is designated as being in its "on" state when its right-hand triode section is conducting.

The flip-flop circuits 906 to 909 are coupled together in such a manner that they transfer from one state to the other whenever the preceding flip-flop circuit goes from its "on" state to its "off" state. The first flip-flop circuit 906 transfers whenever a negative pulse from one of the input amplifiers 517 is applied thereto. This negative pulse is applied to both of the control grids of the tube 901 of the first flip-flop circuit 906. The negative pulse has no direct effect on the right-hand non-conducting section of the tube 901, but it cuts off the left-hand, conducting, section of this tube. The sudden rise in potential at the plate of the left-hand section of the tube 901 is applied to the control grid of the right-hand section, causing that tube section to conduct. As the right-hand section of the tube 901 is conducting, the potential on its plate decreases. This decreased potential is applied to the control grid of the left-hand section, thus preventing that tube section from conducting again. This condition is maintained until the next negative pulse from the associated input amplifier 517 causes the flip-flop circuit 906 to return to its original state.

The control grids of the second flip-flop circuit 907 are connected through a capacitor and a resistor to the plate of the left-hand tube section of the first flip-flop circuit 906. As the flip-flop circuit 906 goes from its "on" state to its "off" state, the potential decrease at its plate is transformed into a negative pulse and applied to the control grids of the flip-flop circuit 907. This negative pulse causes the triode sections of the tube 902 to reverse functions, just as the negative input pulse to the triode sections of the tube 901 caused these sections to reverse functions.

The third flip-flop circuit 908 is connected to the second flip-flop circuit 907, and the fourth flip-flop circuit 909 is connected to the third flip-flop circuit 908, in the same manner as the second flip-flop circuit 907 is connected to the first flip-flop circuit 906. Thus, the second, third, and fourth flip-flop circuits 907 to 909 will transfer as the preceding flip-flop circuit goes from its "on" state to its "off" state, but these flip-flop circuits will not transfer as the preceding flip-flop circuit goes from its "off"

state to its "on" state, because, when this occurs, a positive rather than a negative pulse is applied to their control grids.

The accumulator stages actually count from two to twelve rather than from zero to ten. Under this system, two corresponds to zero, three corresponds to one, etc. This counting method is employed to facilitate the transfer of the digit finally registered by an accumulator stage to an associated product switch 123, without the necessity of using an additional tube in the accumulator.

The flip-flop circuits 906 to 909 are assigned values of 1, 2, 4, and 8, respectively. If the first flip-flop circuit 906 is in its "off" state, the next negative pulse from an associated input amplifier 517 causes it to go to its "on" state, adding one to the total in the accumulator stage. The other flip-flop cicuits are not affected by this negative pulse. If the first flip-flop circuit 906 is in its "on" state and the second flip-flop circuit 907 is in its "off" state, the next negative pulse causes the first to go to its "off" state, which, in turn, causes the second to go to its "on" state. The other flip-flop circuits 908 and 909 are not affected. The effect of the second negative pulse is that the accumulator stage drops one and adds two, for a net increase of one. If both the first and the second flip-flop circuits 906 and 907 are in their "on" state, and the third flip-flop circuit 908 is in its "off" state, the next negative pulse causes the first flip-flop circuit to go to its "off" state. In transferring, the first flip-flop circuit causes the second flip-flop circuit to go to its "off" state, which, in turn, causes the third flip-flop circuit to go to its "on" state. The effect of the third negative pulse is that the accumulator stage drops three and adds four, for a net increase of one. If the first three flip-flop circuits 906 to 908 are in their "on" state, the next negative pulse causes the first three flip-flop circuits to go to their "off" state and the fourth flip-flop circuit 909 to go to its "on" state. The effect of the fourth negative pulse is that the accumulator stage drops seven and adds eight, for a net increase of one again. Every negative pulse applied to the control grids of the tube 901 of the flip-flop circuit 906 initiates one of the above four operations.

Operating potential for the plates of the tubes 901 to 905 is supplied from a terminal 912, which in turn is connected to the lead 549 (FIG. 44) of the control circuit. The control grids of the left-hand section of the tube 901, the right-hand section of the tube 902, the left-hand section of the tube 903, and the left-hand section of the tube 904 are connected to a terminal 913, which in turn is connected to a lead 1016 (FIG. 44) in the control circuit. The control grids of the right-hand section of the tube 901, the left-hand section of the tube 902, the right-hand section of the tube 903, and the right-hand section of the tube 904 are connected to a terminal 915, which in turn is connected to the terminal 607 (FIG. 42) in the power supply.

The negative carry pulses developed in an accumulator stage appear on the terminal 916, from which terminal they are applied to the next higher accumulator stage. In the case of the Bank 10 accumulator stage, the carry pulses appearing on the terminal 916 are applied to the end-around amplifier 524.

Each of the accumulator stages has ten output terminals 917 to 926 inclusive, which are associated with the digits 0 to 10 which may be registered by an accumulator stage. When an accumulator stage is in the state associated with a particular digit, a potential of +165 volts D.C. appears at the terminal associated with the same digit. At the terminals associated with the other digits, there will appear lesser potentials of +135 volts, +85 volts, or +35 volts D.C. The reading out of an accumulator stage is accomplished by identifying the output terminal having the highest potential.

The terminals 917 to 926 inclusive are connected to the fixed contacts 226 (FIGS. 10 and 11) of a product switch 123. The scanning contact or wiper 227 is connected to the control grid of the section 850 (FIG. 38) of a product amplier by way of the terminal 859. At the end of a multiplication operation, the scanning contact 227 scans the fixed contacts 226, applying various potentials to the control grid of the product amplifier.

The potentials applied to the cathode and plate of the product amplifier 518 are such that only the highest of the four potentials which might be applied to the control grid thereof is sufficient to cause the product amplifier to conduct. When the scanning contact 227 of a product switch 123 contacts the fixed contact 226 which is at +165 volts D.C., the product amplifier will conduct and cause the product magnet 242 which is in its plate circuit to be energized. The product magnet 242 then holds the scanning contact 227 in position. The position of a product switch may then be determined mechanically through the racks of the accounting machine, as previously described.

Each of the accumulator stage output terminals 917 to 926 associated with the different digits is connected through resistors to a unique combination of three of the plate circuits of the flip-flop circuits 906 to 909. In every case, the three plate circuits connected to a particular one of the terminals 917 to 926 do not draw current when the accumulator stage is in the state associated with the same digit as the terminal; and, when the accumulator stage is in any other operation state, at least one of the three plate circuits draws current.

When none of the three plate circuits of an accumulator stage is drawing current, all three are at their maximum potential. Since the maximum potential for all three plate circuits is the same—that is, +165 volts D.C.—there is no current flow between them and the common potentials applied to that output terminal. If a tube section associated with one of the plate circuits is conducting, the potential on the plate of that tube section will decrease to +35 volts D.C. Since the potentials applied to the particular output terminal are no longer balanced, current will not flow between the three plate circuits, and the resistors in these plate circuits will act as voltage dividers. The potential applied to the output terminal will decrease to +135 volts D.C. If current flows in two of the three plate circuits, the same condition exists as above, except that the potential appearing on the output terminal will be +85 volts D.C. When current flows in all three of the plate circuits, the system will again be in balance, but the potential appearing at the output terminal in this case will be equal to +35 volts D.C.

The restorer circuit 910 includes the tube 905, which comprises three diodes. This restorer circuit operates to restore the flip-flop circuits 906 to 909 to their zero state every time that these circuits count up to ten.

On every tenth input pulse to an accumulator stage, the accumulator stage momentarily assumes a condition in which the flip-flop circuits 908 and 909 are in their "on" state and the flip-flop circuits 906 and 907 are in their "off" state. This is the only time in the counting sequence when the flip-flop circuits 908 and 909 are in their "off" states simultaneously. These flip-flop circuits together set up the restorer circuit 910 so that the next −180-degree pulse from the pulse amplifier 502 will cause the flip-flop circuits 906 to 909 to be restored to their zero states.

The plates of the diodes of the tube 905 are connected together through a resistor to the +200-volt terminal 912. These plates are also connected to the control grid of the right-hand section of the tube 903 by way of a resistor 928 and a capacitor 929.

One cathode of the tube 905 is connected to the plate of the left-hand section of the tube 904. Another cathode is connected to the plate of the left-hand section of the tube 903. The third cathode is connected through a resistor 930 to the +200-volt terminal 912, and through a capacitor 931 to a terminal 932. The terminal 932 is connected to the terminal 586 (FIG. 26) of the —180-degree pulse amplifier 502.

When the accumulator stage counts to ten, the flip-flop circuits 908 and 909 go to their "on" state. When this occurs, the left-hand sections of the tubes 903 and 904 are cut off, and the maximum positive potential appears on their plates. This positive potential is applied directly to the cathodes of the first two diodes of the tube 905 and prevents these diodes from conducting. As the cathode of the third diode of the tube 905 is at +200 volts D.C. potential, then between the time of occurrence of the —180-degree pulses applied thereto, it will not conduct either. Consequently, the plates of the diodes of the tube 905 will be at their maximum potential.

The first —180-degree pulse applied to the cathode of the third diode of the tube 905 will cause the potential at the plates of the diodes to decrease sharply. This potential decrease is applied to the control grid of the right-hand section of the tube 903 and causes the flip-flop circuit 908 to go to its "off" state.

As the flip-flop circuit 908 goes to its "off" state from its "on" state, it causes the flip-flop circuit 909 to go to its "off" state also, by applying a negative pulse to both of the control grids of the tube 904. In going to its "off" state, the flip-flop circuit 909 develops a decrease in potential at the plate of the left-hand section of the tube 904. This potential decrease is used to perform two functions. It is applied through a capacitor 933 and a resistor 934 to the control grid of the left-hand section of the tube 902. Current flow through this section of the tube 902 is cut off, causing the flip-flop circuit 907 to go to its "on" state. This completes the restoring operation, as only the flip-flop circuit 907 will be in the "on" state, and so the accumulator stage will have assumed its zero condition. The potential decrease at the plate of the left-hand section of the tube 904 is also applied to the terminal 916.

When an accumulator stage is in any condition other than that associated with the count of ten, the restorer circuit 910 is prevented from reacting to the —180-degree pulses applied to the cathode of the third diode of the tube 905. Under other conditions for an accumulator stage, either one, or possibly both, of the flip-flop circuits 908 and 909 are in their "off" state. Consequently, the potential on the cathode of at least one of the first two diodes of the tube 905 is low enough to permit the diode to conduct. The flow of current through the diode circuit will decrease the potential on the plates of the diodes of the tube 905. When a —180-degree pulse is applied to the cathode of the last diode under this condition, the potential on the plates of the diodes will decrease still further, but the potential change will not be sufficiently great to affect the flip-flop circuit 908.

When the operating potentials are first applied to the accumulator stage, all but the Bank 0 accumulator stage assume the condition associated with the digit 0. The Bank 0 accumulator stage assumes the condition associated with the digit 5.

The initial condition for the accumulator stages is set up by withholding bias from the control grid of one section of each of the tubes 901 to 904 while applying it to the control grid of the other sections of these tubes. Under this unbalanced condition, current will flow through the unbiased section of each of the tubes. Once the desired conditions are set up this way, bias potential appearing at the terminal 913 is applied to the previously unbiased control grids. This delayed bias will not cause the flip-flop circuits 906 to 909 to change their state, but it establishes balanced conditions, so that the accumulator stage will respond to negative pulses subsequently applied thereto.

There are four lamps, 935 to 938, associated with each of the accumulator stages. These lamps visually identify the digit registered by the accumulator stage. The lamps 935 to 938 have assigned values of 1, 2, 4, and 8, respectively. The digit registered at any instant is the total of the values of the lamps which are lighted, less two.

*Miscellaneous Unit (FIG. 40)*

As shown in FIG. 23, the shift matrix 508 comprises seventy-seven diodes. The three diodes which appear at the bottom of the shift matrix diagram are the diodes 950 to 952 of the tube 953 of FIG. 40. These diodes do not function during the first multiplication operation, but they do function during the checking multiplication operation. The pulses which pass through the diodes 950 to 952 are the overflow pulses which are fed back to the Bank 1 and Bank 2 accumulator stages which had registered the hundredths, tenths, and units in the product of the first multiplication. The Bank 1, Bank 2, and Bank 3 accumulator stages are used to register the three highest digits of the checking product.

The pulses from the multiplicand gates 507 are applied to terminals 954 and 955. The terminal 954 is connected to the plate of the diode 951, while the terminal 955 is connected to the plates of the diodes 950 and 952. The positive potential signals from the shift ring 511 are applied to terminals 956 and 957. The terminal 956 is connected to the plates of the diodes 950 and 951, while the terminal 957 is connected to the plate of the diode 952. The cathodes of the diodes 950 to 952 are connected to a terminal 987, which in turn is connected to the terminal 664 (FIG. 42) in the power supply.

The end-around amplifiers 524 and 525 (FIG. 24) comprise both sections 958 and 959 of a duo-triode tube 960, and the section 961 of a duo-triode tube 962. These end-around amplifiers amplify the end-around pulses and apply them to the proper accumulator stages during the checking multiplication. These end-around amplifiers are prevented from operating during the first multiplication by the control circuit (FIG. 44).

During the checking multiplication, the end-around amplifier 524, for the Bank I accumulator stage, operates in the same manner as the input amplifiers 517. The positive pulses from the cathodes of the sections 951 and 952 of the shift matrix tube 953 are amplified by the section 959 of the tube 960, and these pulses appear at the terminal 963 as negative pulses. These negative pulses are applied to the Bank 1 accumulator stage. The negative carry pulses from the Bank 10 accumulator stage appear at the terminal 964 and are amplified by the sections 958 and 959 of the tube 960. These pulses also appear at the terminal 963 as negative pulses.

The positive pulses from the cathode of section 950 of the shift matrix tube 953 are amplified by section 961 of the tube 962, and these pulses appear at the terminal 965 as negative pulses. These negative pulses are applied to the Bank 2 accumulator stage. The end-around amplifier 525 is a single-stage amplifier, since no carry pulses are applied to it.

The carry storage circuit 527 (FIG. 24) comprises section 966 of the tube 962 and sections 967 and 968 of a duo-triode tube 969. The carry storage circuit operates to prevent two carry pulses from being applied simultaneously to the Bank I accumulator stage during a checking multiplication. If two carry pulses were applied simultaneously to the Bank I accumulator stage during a checking multiplication, the Bank I accumulator stage would count the two pulses as one, and the product would not check out. To demonstrate how this might occur if the carry storage circuit 527 were not provided, assume that the Bank 0 to Bank 10 accumulator stages register the digit 9 at some instant during the checking multiplication, and while in this condition a single pulse is applied to the Bank 0 accumulator stage. Immediately, the Bank 0 accumulator stage will develop a carry pulse, which will be applied to the Bank I input amplifier. This will start a chain reaction in which one accumulator stage after another will develop a carry pulse until finally the Bank 10 accumulator stage applies a carry pulse through the Bank I end-around amplifier 524 to the Bank I accumulator stage. This entire operation will take place so quickly that the second carry pulse would be applied to the Bank I accumulator stage before the first carry pulse ended. Since there would be no time interval between the two carry pulses, the Bank I accumulator stage would not recognize them as separate pulses.

The negative carry pulse from the Bank 0 accumulator stage, which appears at the terminal 970, is applied to the control grid of the normally conducting section 967 of the carry delay tube 969. This carry pulse will cut off current flow through the section 967, and, as a result, the potential on its plate will rise. This potential rise is applied through a capacitor and a resistor to the control grid of the section 968 of the tube 969, causing that section to start conducting. The tube 969 will remain in this state until an A0 pulse or trigger signal is applied thereto by way of the trigger amplifier, section 966 of the tube 962.

The input signal to the section 966 of the tube 962 is the positive potential developed at the cathode of the first tube 590 (FIG. 27) of the multiplicand ring 503. This signal is used for triggering the carry storage circuit 527 because it occurs at such a time that it will not coincide with the other pulses applied to the Bank I accumulator stage, and because it occurs at such a frequency that it will pick up every carry pulse.

The triggering signal will not coincide with other pulses applied to the Bank I accumulator stage because it is developed by a zero-degree pulse which follows the last pulse in the preceding pulse group by at least one pulse count, and it precedes the first pulse in the next pulse group by at least a two-pulse count. All the other pulses applied to the accumulator stages occur within the pulse group or a half-count after the last pulse of the pulse group.

The multiplicand ring 503 develops one triggering signal for every pulse group, or every time the multiplicand ring completes an operating cycle. While a single pulse group is applied to the accumulator 509, no accumulator stage thereof except the Bank I (hundredths) accumulator stage can develop more than one carry pulse. The smallest number which can be added to nine (the largest digit) to make twenty (or "zero and carry two") is eleven. In the multiplying device, the largest number of pulses in one pulse group which may be applied to an accumulator stage is nine. If the carry pulse which may be developed by the next lower accumulator stage is added to these nine pulses, the resulting total of ten pulses would still be insufficient to bring the number of carry pulses to two under any condition. Thus, one triggering signal is applied to the carry storage circuit 527 for every possible carry pulse which may be applied to this circuit.

The Bank I (hundredths) accumulator stage may develop as many as two carry pulses while a single pulse group is being applied to the accumulator 509, since it is the only accumulator stage which is designed to receive carry pulses from two sources. Consequently, the Bank I accumulator stage could develop two carry pulses if it received one carry pulse from each source and nine pulses through the shift matrix 508 while one pulse group was being applied to the accumulator 509. However, the Bank I accumulator stage is not coupled to the carry storage circuit 527, so it cannot cause that circuit to miss a pulse.

The carry storage circuit 527 operates in the following manner. The triggering signal or potential rise appearing at the cathode of the first tube 590 of the multiplicand ring 503 is applied through a capacitor 971 to the control grid of the section 966 of the tube 962. The control grid of the section 966 is biased near the cut-off point, and the triggering signal drives it to saturation, causing a negative pulse to be developed in the plate circuit of this section.

The negative pulse developed in the plate circuit of the section 966 of the tube 962 is applied to the control grid of the section 968 of the tube 969. If no carry pulses have been applied to the control grid of the section 967 of the tube 969 since the last triggering signal was received, the tube section 968 will not be conducting. If, however, a carry pulse has been applied to the control grid of the section 967, the negative pulse applied to the control grid of the section 968 will cut off current flow through that section, and current will begin to flow in the section 967, causing the potential in its plate circuit to decrease.

The potential decrease in the plate circuit of section 967 of the tube 969 appears at the terminal 972 and is applied to the Bank I accumulator stage, where it is transformed into a negative pulse which causes the Bank I accumulator stage to assume the state associated with the next higher digit.

The "Fugitive One" circuit comprises section 975 of the duo-triode tube 976, and both sections 668 and 672 of the tube 669 (FIG. 28).

The "Fugitive One" circuit functions to add a single pulse to every pulse group developed during a checking multiplication. As described heretofore, the transposing contacts (FIG. 34) of the transposing network 520 transpose just prior to a checking multiplication to change the numerical value of the multiplicand represented by the pulse groups from the multiplicand ring 503. This second or checking multiplicand is equal to the complement of the multiplicand of the original multiplication problem with respect to the number 999,999.99. By adding a single pulse group to the hundreds output lead from the multiplicand gates 507 each time a pulse group representing the second multiplicand is developed, the "Fugitive One" circuit increases the value of the second multiplicand so that it represents the complement of the first multiplicand with respect to the number $10^3$. This condition satisfies Equations 1, 2, and 3 previously set forth.

The initiating signal for the "Fugitive One" circuit is taken from the zero digit line, as shown in FIG. 23. During the first multiplication operation, this line is connected directly to ground potential, and, as a result, no initiating signal is applied to the "Fugitive One" circuit. Before the checking multiplication begins, however, the transposing contacts (FIG. 34) of the transposing network 520 are caused to operate under control of the control circuits in a manner to be described hereinafter. The various digit signals from the multiplicand ring 503 are switched to different digit lines. The timed D.C. potential associated with the digit 9 is switched to the digit 0 line and applied to the "Fugitive One" circuit as well as to the digit 0 contacts of the multiplicand switches 120.

The positive-going digit 9 signal from the multiplicand ring 503 is characterized in that its leading edge precedes all the other digit signals of a pulse group. The digit 9 or "Fugitive One" signal appearing at the terminal 977 is applied through a capacitor 978 to the control grid of the section 975 of the tube 976. The "Fugitive One" signal appears in amplified form at the terminal 674 as a negative pulse. This negative pulse is applied to the control grid of the section 672 of the tube 669 (FIG. 28). The amplifier section 672 reverses the polarity of the pulse, so that it appears on the plate of this section as a positive pulse. This positive pulse is applied to the control grid of the section 668 of the tube 669. The mixer section 668 is connected as a cathode follower with its cathode connected directly to the cathode of the right-hand section of the tube 643. Thus, either the right-hand section of the tube 643 or the section 668 of the tube 669 can develop an output pulse at the terminal 645 at different times. The positive pulses appearing at the terminal 645 are then applied to the 0.01 input line of the shift matrix 508.

The input amplifier for the Bank 000 accumulator stage comprises section 979 of the tube 976. The operation of the input amplifiers for the remaining accumulator stages was described heretofore in connection with FIG. 37. The positive pulses from one of the output lines 833 (FIG. 24) of the shift matrix 508 are applied to the control grid of the section 979 of the tube 976 by way of a terminal 980. No carry pulses are applied to this input amplifier, as is the case of the other input amplifiers. The negative pulse output of the section 979 appears on the terminal 981 and is applied to the Bank 00 accumulator stage.

Operating potential for the plates of the tubes 962, 953, 960, 976, and 969 is supplied from a terminal 983, which is connected to the lead 549 (FIG. 44) in the control circuit. The control grids of the section 966 of the tube 962 and the sections 975 and 979 of the tube 976 are connected to the terminal 984, which in turn is connected to the terminal 577 (FIG. 42) in the power supply. The control grids of section 961 of the tube 962 and section 959 of the tube 960 are connected to the terminal 986, which in turn is connected to the lead 982 (FIG. 44) in the control circuits.

*Power Supply (Figs. 41 and 42)*

The power supply in the multiplying device develops the following potentials: 5 volts A.C., 6.3 volts A.C., −105 volts D.C., −35 volts D.C., +75 volts D.C., +200 volts D.C., and +300 volts D.C. from the +117 volts A.C. power line potential applied to the leads 1063 and 1064.

The 5 volts A.C. potential is taken from three of the secondary windings of the transformer 1002 and is used to heat the filaments of the four full wave rectifiers 1003 to 1006 in the power supply. The 6.3 volts A.C. potential is taken from the five secondary windings of the transformers 1007 to 1009 and is used to heat the filaments of the other tubes of the multiplying device. A potential of +75 volts D.C. is applied to one of these filament windings, and a potential of +125 volts D.C. is applied to another. Those two windings supply the filaments of the tubes whose cathodes are maintained at fairly high D.C. potentials. The +75 and +125 volts D.C. potentials are applied to the windings, so that the difference in D.C. potential between the cathodes and the filaments in these tubes does not exceed the limits set by the tube manufacturer.

The output of the center tap secondary winding of the transformer 1002 is rectified to supply all the negative D.C. potentials required by the multiplying device. The ends of the winding are connected to the plates of the rectifier 1006, a duo-diode. The center tap is connected through a regulating circuit to a voltage divider from which the negative potentials are obtained. When either end of the secondary winding of the transformer 1002 goes positive, the corresponding plate of the rectifier 1006 will draw current through the load connected to the center tap, provided the circuit is closed. When one end of the secondary winding is positive, its other end is negative, so that the halves of the secondary windings are supplying power during alternate half-cycles. Both halves of the secondary winding will draw current in the same direction through the load connected to the center tap. The choke 1010, in series with the load, and the capacitor 1011, in parallel with the load, together form a filter in the rectifier circuit.

The −105 volts D.C. potential appears at the terminal 607 and is regulated. The other negative outputs of the rectifier circuit are derived from the −105 volts D.C. lead through a voltage divider 1012. The regulating circuit comprises the tubes 1013 and 1014, the resistors 1015, 1050, and 1017, and a potentiometer 1018. The tube 1013 is a gas tube connected in series with the resistor 1015 between the positive side of the potential supply, which is at ground potential, and the negative side or center tap of the transformer 1002. While the tube 1013 is conducting, the potential drop across it remains constant at −150 volts, even though the current through the tube may vary. The resistor 1015 is connected in series with the tube 1013 to absorb fluctuations in the supply potential.

The junction point between the tube 1013 and the resistor 1015 will remain at −150 volts D.C. The potentiometer 1018 and the resistor 1017 are connected from this junction point to ground potential. The arm of the potentiometer 1018 is connected to the control grid of the tetrode tube 1014. Since the potential at both ends of the potentiometer 1018 is fixed, the potential applied by the arm of the potentiometer to the control grid of the tube 1014 will also be fixed, as long as the position of the potentiometer arm is not readjusted. As the plate of the tube 1014 is connected directly to ground potential, the potential at the cathode is the only potential applied to an element of this tube which is not fixed. The cathode of the tube 1014 is connected directly to the output terminal 607.

The regulating circuit operates in the following manner. If the output of the rectifier circuit goes negative, the fluctuation is applied directly to the cathode of the tube 1014. If the potential at the cathode of the tube 1014 goes negative with respect to the potential at its control grid, the effect is the same as if the potential at its control grid went positive, and the current through the tube 1014 will increase. As the current increases, the potential drop across the resistor 1050 will increase to cause the potential at the cathode of the tube 1014 to return towards its original value. If the potential at the cathode of the tube 1014 goes positive with respect to its control grid, the regulating circuit will operate in the opposite direction.

The other negative potentials of −35 volts and −25 volts D.C. appear at the terminals 614 and 577, respectively, and are obtained from the voltage divider 1012, which comprises the resistor 1019, 1020, and 1039.

The output of the lower secondary winding of the transformer 1021 is rectified by the rectifiers 1004 and 1005 to provide D.C. potentials of +300 volts, +200 volts, +125 volts, and +75 volts at the output terminals 1022, 1023, 1024, and 664, respectively. The two sections of each of the rectifiers 1004 and 1005 are operated in parallel. The plates of the rectifier 1004 are connected to one end of the lower secondary winding of the transformer 1021, and the plates of the rectifier 1005 are connected to the other end. The center tap of the secondary winding is connected to ground potential.

When each end of the lower secondary winding of the transformer 1021 goes positive, both sections of the associated rectifier will conduct. As only one end of the winding is positive at one time, the rectifiers 1004 and 1005 will conduct alternately. Both of the rectifiers cause current to flow through their load when the circuit is complete. The choke 1025 and the capacitor 1026 form a filter. The +300 volts D.C. potential is obtained from the filter through a resistor 1027. The capacitor 1028 and the resistors 1029 and 1030 are connected in parallel with the load to reduce the effect of abrupt changes in the level of the supply potential.

The six sections of three duo-triode tubes 1031 to 1033 are connected in parallel with each other and in series with the load to which the terminal 551 is coupled. The regulation of the potential at the terminal 551 is effected by the tubes 1031 to 1033. One section of the duo-triode tube 1035 functions to sense fluctuations in the +200 volts D.C. supply. The control grid of this section of the tube 1034 is connected to the arm of a potentiometer 1035. The potentiometer 1035 is part of a voltage divider 1036 extending between the cathodes of the tube 1031 (+200 volts D.C.) and a point (−150 volts D.C.) between the cathode of the tube 1013 and the potentiometer 1018. The voltage divider is connected to this point rather than to ground potential, so that any fluctuation in the +200 volts D.C. supply will cause a greater proportioned potential swing at the control grid of the tube 1034.

The tube 1034 is connected in series with the resistor 1037 between the output of the rectifiers 1004 and 1005 and ground potential. The control grid potential for all six sections of the regulating tubes 1031 to 1033 is obtained from points between the resistor 1037 and the tube 1034. When the +200 volts D.C. supply potential rises above its nominal value, a proportional rise in potential will occur at the control grid of the tube 1034, causing current through this tube to increase, thereby causing a greater potential decrease across the resistor 1037. Because of this potential decrease, a lower potential will appear at the control grids of the regulating tubes 1031 to 1033. This lower potential will reduce the current flow through the regulating tubes, causing the potential applied by way of the terminal 551 to the load to approach the nominal value of +200 volts D.C. When the +200 volts D.C. supply potential falls below its nominal value, the regulating circuit will operate in the opposite direction and cause the potential to approach its nominal value.

The voltage divider 1038, comprising the resistors 1039 and 1040, extends between the +200 volts D.C. supply and ground potential to develop the unregulated +125 volts D.C. supply which is present at the terminal 1024.

The circuit which develops the regulated +75 volts D.C. potential extends between the +200 volts D.C. supply lead and ground potential. This circuit comprises the resistor 1041, which is connected in series with the gas tube 1042. The tube 1042 operates to maintain a constant potential of +75 volts D.C. at the terminal 664.

The upper secondary winding of the transformer 1021 provides operating potential for the product amplifiers 518 and the check amplifiers 528. The plates of the two sections of the rectifier 1003 are connected to the opposite ends of the secondary winding, so that the sections conduct on alternate half-cycles to provide full-wave rectification. During both half-cycles, the circuit is completed through the center tap. The choke 1043 and the capacitor 1046 form a filter in the output of the rectifier.

The rectifier circuit including the rectifier 1003 supplies operating potential for the plates of the product amplifiers 518 and the check amplifiers 528 by way of the terminals 1044 and 1045. The positive terminal 1044 is connected to the plates of these amplifiers through the product magnets 242. The negative terminal 1045 is connected to the cathodes of these amplifiers. The terminals 1044 and 1045 are isolated from ground potential, so that their potentials will not vary with respect to each other when the potential on the cathodes of these amplifiers varies with respect to ground potential and their control grids. The potential between the two terminals 1044 and 1045 of the isolated power supply is equal to approximately +300 volts D.C.

*Control Circuits (FIGS. 43 to 47)*

The control circuits of FIGS. 43 and 44 accomplish a number of functions. These control circuits condition or set up the multiplying device for operation when a multiplication problem is presented to it. When the problem is solved, these control circuits function to transfer the product from the accumulator 509 to the product switches 123. Then, these control circuits condition the multiplying device for performance of the checking multiplication operation. If the checking multiplication operation is completed satisfactorily, these control circuits return the multiplying device to its standby condition, and, if the entire operation comprising the first multiplication and the second or checking multiplication is not completed within a predetermined time, these control circuits start the sequence over again.

The control circuits of FIGS. 45 and 46 comprise, in general, a plurality of switches and contacts connected so as to coordinate the operation of the accounting machine and the multiplying device during the first multiplication and the checking multiplication operations.

The control circuit of FIG. 47 shows the manner in which the trip solenoid L101 (FIGS. 17 and 45) is energized prior to the transfer of a product from the product switches 123 to the accounting machine.

Starting with FIG. 45, an operating potential of 117 volts A.C. is supplied to the motor 18 in the accounting machine, when the "on" switch key 12 is depressed. The depression of the "on" switch key 12 will close the contacts SP101a1 and SP101a2 (FIG. 45). A plug 1060 is provided for making connection to a suitable source of operating potential. The light 18, which is located to the right of the typewriter keyboard, will light to indicate this condition.

When the multiplying device "on-off" switch 19, which is located to the right of the typewriter keyboard, is depressed, the contacts SP102ac are closed and the contacts SP102bc are opened, thereby applying the operating potential by way of the leads 1061 and 1062 across the blowers B101 and B102, and across the bridge rectifier CR101 (FIG. 43). The rectifier CR101 develops the supply voltage for the relays of FIGS. 43 and 44.

The output of the rectifier CR101 energizes the power relay K112. The power relay K112 closes the contacts K112a1 and K112a2, and the 117 volts A.C. operating potential is then applied by way of the leads 1063 and 1064 to all the transformers in the power supply (FIGS. 41 and 42), except the transformer 1021, which is included in the high-voltage circuit thereof. This operating potential is also applied across the fluorescent light 1065 and its ballast L112. The light 1065 will be lit during the time the operating potential is applied thereto to insure that the gas tubes of the multiplying device will ionize.

When the operating potential is applied to the primaries of the low-voltage transformers of the power supply, the transformer 1009 (FIG. 41) applies a potential of approximately 6.3 volts A.C. across the heating element of the time delay relay TD101. After a delay of approximately forty-five seconds, the contacts of the relay TD101 will close to connect the positive side of the rectifier CR101 to the supply lead 1069, from which the relays of FIG. 43 draw energizing current. This delay gives the tubes of the multiplying device time to warm up before a multiplication is allowed to begin. The light associated with the "on-off" switch 19 and located to the right of the typewriter keyboard is provided to indicate that the switch 19 has been operated. The light 24, located to the left of the typewriter keyboard, is provided to indicate that the multiplying device is ready to perform a multiplication. This ready condition is indicated when the light 24 is extinguished.

When the contacts of the relay TD101 are closed, the hold relay K111 is energized. When the hold relay K111 is energized, it closes the contacts K112a2 (FIG. 45) to partially complete the energizing circuit for the trip solenoid L101. By holding the energizing circuit for the trip solenoid L101 open until after the time delay relay TD101 operates, the contacts K111a2 prevent the accounting machine from initiating a multiplication operation before the tubes of the multiplying device are warmed up. The hold relay K111 closes the contacts K111a1 to complete a second path between the positive side of the rectifier CR101 and the relay supply lead 1069, and opens the contacts K111b1 to break the circuit between the 6.3 volts A.C. supply and the heating element of the time delay relay TD101. The hold relay K111 also opens the contacts K111b11, which causes the voltage to rise between the ends of the fluorescent tube 1065, thereby causing this tube to be lighted.

With the energization of the hold relay K111, the multiplying device assumes its ready condition. It remains in this condition until a signal initiates the first multiplication operation. After the checking multiplication operation which invariably follows the first multiplication operation, the multiplying device returns to this ready condition.

The multiply signal is a positive voltage signal of approximately +90 volts D.C. It is obtained from the supply lead 1069 (FIG. 43) and is applied by way of the lead 1070 through the contacts SC145b2 of the overdraft disable switch provided in the accounting machine, through the contacts SC141a of the upper stop switch SC141 (FIG. 20), either through the contacts SC140a1 of the multiply selector switch SC140 (not shown), which is included in the carriage position switch 454 (FIG. 20), or through the contacts SC102a2 of the right factor-multiply key switch SC102 (FIG. 14), and through the contacts SC117a of the multiply cam switch SC117, which is included in the set of switches 406 (FIG. 18), across the coil of the operate relay K101 by way of the lead 1071. The upper stop switch SC141 is closed by the upper ear 415 on the selector plates 412 (FIG. 21) at the various accounting machine carriage stops. The ear 415 indicates that an electrical operation, such as multiplying or recording, is to occur at that carriage stop. The contacts SC145b2 of the overdraft disable switch are normally closed. The contacts SC140a1 of the carriage position switch 454 are closed by a stud 413 located in the position #18 of the selector plate 412 at a carriage stop where a multiplication operation is to occur. The contacts SC102a2 of the right factor-multiply key switch SC102 are closed when that switch is manually operated by an operator of the multiplier apparatus. The contacts SC117a of the multiply cam switch SC117 are the last of the contacts in the circuit to close and the first to open. These contacts are closed by the cam 402 (FIG. 19) on the cam shaft 397 between 110 degrees and 145 degrees of this cam shaft cycle.

With the operate relay K101 energized, the contacts K101a1 are closed to hold this relay energized after the contacts SC117a of the multiply cam switch SC117 are opened. The contacts K101a2 are closed to complete or partially complete the path to the negative side of the rectifier CR101 for the relays K102, K104, K105, K106, and K107. The contacts K101b1 (FIG. 45) are opened to open the circuit through which the trip solenoid L101 is energized, so that the trip solenoid cannot be energized again before the operate relay K101 is deenergized at the end of the first multiplication and the checking multiplication operations. The contacts K101a4 and K101a5 (FIG. 41) are closed to apply the 117 volts A.C. operating potential to the primary of the high-voltage transformer 1021 in the power supply. The contacts K101a3 (FIG. 46) are closed to partially complete the A.C. supply path to the scan solenoid L108.

While the operate relay K101 is held energized, the supply lead 1069 (FIG. 43) is connected through the closed contacts K101a1 to the lead 1071. The lead 1071 is open at the contacts SC117a (FIG. 46) of the multiply cam switch SC117. However, between 250 degrees and 285 degrees of the cycle of the cam shaft 397 (FIG. 19), the contacts SC114a of the start cam switch SC114 (not shown) are closed by the start cam 400 (FIG. 18). The relay supply voltage is applied by way of the leads 1071 and 1072 across the coil of the start relay K102. The relay supply voltage is the start signal which energizes the start relay K102 at this time.

As the start relay K102 is energized, the contacts K102a1 close to hold the relay energized after the start cam switch SC114 opens. The contacts K102a3 (FIG. 44) are closed to apply the delayed bias of −105 volts D.C. to the accumulator stages by way of the lead 1016. The contacts K102a2 (FIG. 44) are closed to apply the zero-degree pulses from the pulse generator 500 by way of the lead 601 to the upper control grid of the first tube 590 (FIG. 27) of the multiplicand ring 503, causing the multiplicand ring to start cycling. The contacts K102ac2 are closed and the contacts K102bc2 (FIG. 44) are opened to disconnect the capacitor 1073 from its charging source, which includes the output of the duo-triode tube 1074, and connects this capacitor to the shift ring start lead 709. The charge on the capacitor 1073 primes the first tube 710 (FIG. 30) of the shift ring 511, so that the next zero-degree pulse will fire it. The contacts K102bc1 open to disconnect the capacitor 1075 (FIG. 44) in the control grid circuit of the tube 1076 from connection through the resistor 1077 to the −105 volts D.C. supply terminal 1078. This terminal is supplied from the terminal 607 (FIG. 42) in the power supply. The contacts K102ac1 close to connect the capacitor 1075 through the resistor 1079 to the +200 volts D.C. supply terminal 550. If the first and checking multiplication operations are not completed by the time that the capacitor 1075 has been charged to the point where the tube 1076 conducts, the remultiply set-up relay K109 (FIG. 44) in the plate circuit of the tube 1076 will cause the foregoing operational sequence to be started over again. The contacts K102b2 (FIG. 43) will open to open the energizing path to the remultiply start relay K110 to deenergize that relay at the start of a remultiplication operation. The manner in which this is accomplished will be explained hereinafter when the remultiply operation is described.

The first multiplication operation begins with the priming of the first tubes, 590 and 710, in the multiplicand and shift rings 503 and 511, respectively. From that point on, the multiplying device goes through the first multiplication operation without requiring any further control by the control circuits until the product is formed in the accumulator 509.

As the last tube 721 (FIG. 31) in the shift ring 511 fires, a positive voltage appears on its cathode. In the preceding tubes of the shift ring 511, this voltage is used to prime the next tube in line. The voltage appearing on the cathode of the last tube 721 is applied to the shift ring complete terminal 750 and indicates that the first multiplication operation has been completed. The voltage at the terminal 750 is applied by way of the lead 751 (FIG. 44) to the control grids of the duo-triode tube 1074, causing that tube to conduct. As the tube 1074 conducts, it energizes the scan relay K103 connected in its plate circuit.

The scan relay K103 starts the scanning operation. The contacts K103b1 (FIG. 44) open to open the circuit by which the zero-degree pulses from the pulse generator 500 are applied to the multiplicand ring 503. Thus, the zero-degree pulses do not appear on the lead 601, and so the operation of the multiplicand ring 503 is stopped at this time. The contacts K103a2 (FIG. 46) are closed, and the 117 volts A.C. potential is applied to the scan solenoid L108. Upon energization, the scan solenoid L108 operates the clutch mechanism (FIGS. 3B and 4), which causes the scan shaft 99 to rotate. The contacts K103a1 (FIG. 44) are closed to connect the terminal 1080 to the lead 1081, which extends to the cathodes of the product amplifiers 518. The contacts K103b2 (FIG. 43) open to hold open the energizing circuit for the check start relay K107.

When the wiper 227 of each product switch 123 (FIGS. 10 to 14) finds its proper position, the associated product magnet 242 (FIG. 6) is energized. Each of the product magnets 242, upon energization, closes one of the ten product magnet contacts L111a1 to L111a10 (FIGS. 45 and 46). The contacts L111a1 to L111a10 are connected in series with each other and with the contacts SC108 (FIG. 3B). The contacts SC108 are operated by the scan solenoid L108. Thus, when the scan solenoid L108 and all of the product magnets 242 are operated simultaneously, a positive voltage signal is applied through the contacts SC108, K114bc1, L111a1 to L111a10, and K113bc1 to the lead 1082, which applies this signal through the contacts K107bc1 (FIG. 43) to the scan halt relay K104. The energization of the scan halt relay K104 indicates that the product has been transferred from the multiplying device to the product switches 123.

As the scan halt relay K104 is energized, the contacts K104a1 (FIG. 43) close to hold the relay in its energized state. The contacts K104bc1 (FIG. 44) open to open at a second point the path including the lead 601 by which the zero-degree pulses from the pulse generator 500 were previously applied to the first tube in the multiplicand ring 503 when the start relay K102 was energized. The contacts K104ac1 (FIG. 44) close to partially complete a path including the lead 601, through which the zero-degree pulses are to be applied to the multiplicand ring 503 when the check start relay K107 is subsequently energized. The contacts K104a2 (FIG. 43) close to partially complete the energizing path for the relays K105, K106, and K107. The contacts K104a3 (FIG. 43) close to partially complete the path through which the end-of-check signal is to be applied when all of the product magnets 242 are energized again after the checking multiplication operation. The contacts K104b1 (FIG. 46) open to open the circuit through which the scan solenoid L108 is energized. The contacts K104bc2 and K104bc3 are opened, and the contacts K104ac2 and K104ac3 are closed (FIG. 34). These contacts form a part of the transposing network 520 of FIG. 23.

As the scan solenoid L108 is released upon the opening of the contacts K104b1, the contacts SC108 (FIG. 46) transfer to cause a positive voltage signal to be applied by way of the lead 1083 to the product magnets release relay K105 (FIG. 43), causing that relay to be energized. The contacts K105b1 (FIG. 44) open to disconnect the terminal 1080 from the lead 1081. As current flow between the terminals 550 and 1080 ceases, there is no voltage drop across the resistor 861, so the +200 volts D.C. potential appearing at the terminal 550 is applied by way of the lead 1081 to the cathodes of the product amplifiers 518. This +200 volts D.C. potential cuts off the flow of current through the product amplifier tubes, and, as a result, all of the product magnets 242 become deenergized. The contacts K105bc1 (FIG. 44) open to remove the −105 volts D.C. potential appearing at the terminal 1078 from the special bias lead 982, and the contacts K105ac1 close to apply the −25 volts D.C. potential appearing at the terminal 1084 to the special bias lead 982. The −105 volts D.C. potential is utilized to prevent the first "fugitive one" amplifier and the end-around amplifiers 524 and 525 from operating during the first multiplication operation, while the −25 volts D.C. potential permits these amplifiers to operate during the checking multiplication operation. The contacts K105ac2, K105ac3, K105ac4, and K105ac5 are closed, and the contacts K105bc2, K105bc3, K105bc4, and K105bc5 are opened (FIG. 34). These contacts form a further part of the transposing network 520 of FIG. 23.

The ten product magnets 242 have the series contacts L111b1 to L111b10 (FIG. 46) associated therewith. When all of the product magnets 242 are released upon deenergization of the release relay K105, these contacts are closed, and a positive voltage signal is applied by way of the lead 1085 to the check set-up relay K106 (FIG. 43) to energize it.

As the check set-up relay K106 energizes, the contacts K106a1 (FIG. 43) close to hold the relay energized. The contacts K106ac2 close and the contacts K106bc2 open (FIG. 44) to allow the +200 volts D.C. potential appearing at the terminal 550 to be applied directly by way of the lead 709 to the shift ring start terminal 728 (FIG. 30). This potential rise is transformed into a pulse by the capacitor 727 and is applied to the lower control grid of the first tube 710 (FIG. 30) in the shift ring. The tube 710 is fired by the next zero-degree pulse applied to its upper control grid from the pulse generator 500. The contacts K106ac1, K106ac3, K106ac4, and K106ac5 are closed, and the contacts K106bc1, K106bc3, K106bc4, and K106bc5 are opened (FIG. 34). These contacts constitute a further part of the transposing network of FIG. 23.

The transposing contacts of FIG. 34 operate to transfer the output signals developed by the multiplicand ring 503 from the prime digit lines to the complementary digit lines. There are ten sets of transposing contacts which are operated by the relays K104, K105, and K106. The relays K104, K105, and K106 are energized after the first multiplication operation and remain energized throughout the checking multiplication operation.

When the first tube 710 (FIG. 30) of the shift ring 511 is fired as a result of the operation of the check set-up relay K106 and the subsequent application to the tube 710 of a zero-degree pulse, the tube 710 will extinguish the last tube 721 in the shift ring. The tube 721 continues to conduct at the end of the first multiplication operation, but it will stop conducting when the tube 710 is conducting. The tube 721 will stop conducting because, with the tube 710 conducting, the plate voltage of the tube 721 will decrease below the voltage maintained on its cathode by the charged capacitor in its cathode circuit. The tube 710 does not stop conducting, because, since it has not been conducting, the capacitor 763 in its cathode circuit is not charged. As a result, when the plate voltage of the tube 710 decreases, the cathode voltage can decrease also in order to sustain current flow through this tube.

As the last tube 721 in the shift ring 511 is extinguished, the positive voltage developed in its cathode circuit is dissipated and is no longer applied to the control grids of the tube 1074 (FIG. 44). As the positive voltage developed in the cathode circuit of the tube 721 decreases, the control grids of the tube 1074 assume a negative potential because they are also connected through the resistor 1086 to the terminal 1078, at which a voltage of −105 volts D.C. appears. As a result, the tube 1074 is cut off, and the scan relay K103, which is connected in its plate circuit, is deenergized.

As the scan relay K103 deenergizes, the contacts K103b2 (FIG. 43) close again to apply a positive potential signal from the supply lead 1069 (FIG. 43) by way of the leads 1070 and 1083 to the check start relay K107 to energize it. Upon energization of the check start relay K107, the contacts K103b1 (FIG. 44) close to partially complete the circuit including the lead 601, through which the zero-degree pulses from the pulse generator 500 are applied to the first tube 599 in the multiplicand ring 503. The contacts K107a1 (FIG. 43) close to hold the relay K107 energized. The contacts K107a3 (FIG. 44) close to allow the zero-degree pulses from the pulse generator 500 to be applied by way of the lead 601 to the first tube 590 of the multiplicand ring 503 to start the checking multiplication operation. The contacts K107bc2 (FIG. 44) open to break the connection between the terminal 1087 and the cathodes of the product amplifiers 518, and the contacts K107ac2 close to make the connection by way of the lead 1088 to the cathodes of the check amplifiers 528. The contacts K107a2 (FIG. 44) close to partially complete the path by which the +125 volts D.C. terminal 1080 is later connected to the cathodes of the check amplifiers 528. The contacts K107ac1 (FIG. 43) close to cause the positive voltage signal on the supply lead 1069 (FIG. 43) to be routed, by way of the lead 1088, the contacts K114bc1, L111a1 to L111a10, and K113bc1, and the lead 1082, to the release relay K108. At the same time, the contacts K107bc1 (FIG. 43) open to cause deenergization of the scan halt relay K104.

When the checking operation is completed successfully, all of the check amplifiers 528 will conduct, causing the energization of the product magnets 242 in their plate circuits. The product magnets 242 close the contacts L111a1 to L111a10 (FIGS. 45 and 46) to furnish the energizing path for the release relay K108.

With the release relay K108 energized, the contacts K108b1 (FIG. 43) open to cause deenergization of the operate relay K101. The contacts K108b2 (FIG. 44) open to disconnect the terminal 1080 from the lead 1088, thereby allowing +200 volts D.C. to be applied to the cathodes of the check amplifiers 528. As the operate relay K101 is deenergized, the contacts K101a2 (FIG. 43) open, preventing energizing current from being supplied to the relays K102, K104, K105, K106, and K107. The contacts K101a4 and K101a5 (FIG. 41) open, preventing the 117 volts A.C. operating potential from being applied to the transformer 1021 in the power supply. As a result, plate voltage is removed from the various tubes of the multiplying device.

As the plate voltage is removed from the last tube 721 (FIG. 31) in the shift ring 511, this tube stops conducting. The positive voltage developed in its cathode circuit is dissipated, causing the tube 1074 to be cut off, which in turn causes deenergization of the scan relay K103. With the scan relay K103 deenergized, the multiplier apparatus has returned to its ready condition.

If the first multiplication and checking multiplication operations are not completed within approximately one second, the control circuits will start these operations over again. Thus, if something occurs that holds up operation of the multiplier apparatus, the first multiplication and checking multiplication operations will be continuously repeated until they are completed successfully or the operator stops the operation of the multiplier apparatus.

The timing for the multiplication and checking multiplication operations begins when the start relay K102 is energized in the process of setting up the multiplier apparatus for the first multiplication operation. The contacts K102bc1 (FIG. 44) open to disconnect the capacitor 1075 in the control grid circuit of the tube 1076 from the negative potential terminal 1078. The contacts K102ac1 close to connect this capacitor 1075 through the resistor 1079 to the positive potential terminal 550. The current flow through the resistor 1079 gradually dissipates the charge on the capacitor 1075, and this charge is applied through the resistor 1090 to the control grid of the tube 1076. Before the contacts K102ac1 were closed and the contacts K102bc1 were opened, the negative charge on the capacitor 1075 had been holding the control grid of the tube 1076 well below the cut-off point. When the contacts K102ac1 and K102bc1 are operated, however, a small current will flow through the resistor 1079, and it will gradually change the charge on the capacitor 1075 in the positive direction. If this current is sustained long enough, the charge on the capacitor 1075 will rise above the cut-off point of the tube 1076. About one second after the contacts K102ac1 and K102bc1 are operated, if the checking multiplication operation has been completed successfully, the tube 1076 will conduct sufficient current to energize the remultiply set-up relay K109 in its plate circuit.

As the remultiply set-up relay K109 becomes energized, the contacts K109b1 (FIG. 43) open to effect deenergization of the relays K102, K104, K105, K106, and K107. The contacts K109bc1 open and the contacts K109ac1 close to remove the +200 volts D.C. potential appearing at the terminal 550 from across the scan relay K103, and to apply this potential across the loading resistor 1091. The resistor 1091 prevents this potential from rising too high while the relay K103 is deenergized. The contacts K109a1 (FIG. 43) close to partially complete the energizing path for the remultiply start relay K110. Upon the deenergization of the start relay K102, the contacts K102a3 (FIG. 44) are opened to remove the delayed bias from the accumulator stages. As a result, the accumulator stages are reset to their zero states. In addition, the contacts K102b2 are closed to effect energization of the remultiply start relay K110.

At the time that the remultiply start relay is energized, the other relays of FIGS. 43 and 44, except the operate relay K101, are in their original condition, ready to start the first multiplication and checking multiplication operations over again.

When the remultiply start relay K110 is energized, the contacts K110a1 (FIG. 43) are closed to keep this relay energized. The contacts K110b3 (FIG. 44) are opened to cause deenergization of the remultiply set-up relay K109. The contacts K110b1 (FIG. 44) are opened to break the circuit through which the zero-degree pulses from the pulse generator 500 are applied to the first tube 590 of the multiplier ring 503. The contacts K110b2 (FIG. 44) are opened to insure that the delay bias is removed from the accumulator stages. The deenergization of the relay K102 causes the contacts K102a3 (FIG. 44) to open to remove the delayed bias from the accumulator stages, but the opening of the contacts K110b2 holds this delayed bias path open a longer period of time to insure that each accumulator stage is reset to its zero state. The contacts K110a2 (FIG. 43) are closed to cause energization of the start relay K102 again. With the start relay K102 energized again, the first multiplication and checking multiplication operations are performed again.

In the remultiplying operation, including another first multiplication and checking multiplication operation, the relays of FIGS. 43 and 44 operate in the same manner and sequence as described heretofore in the first multiplication and checking multiplication operations, but, in the remultiplying operation, the contacts K102b2 (FIG. 43) are opened by the start relay K102 to cause deenergization of the remultiply start relay K110. The relay K110 had not been energized at the same point in the first multiplication and checking multiplication operations.

If some trouble should develop which suspends the first multiplication and checking multiplication operations short of their completion, these operations would continue to be performed over again continuously until stopped by an operator of the multiplier apparatus. Normally, the operator will stop these continual restarting operations by actuating the reset button 23, located to the left of the typewriter keyboard. The reset button 23 operates the reset switch SP104 (FIG. 46).

One side of the contacts SP104a (FIG. 46) of the reset switch is connected by way of the lead 1092 to the release relay K108, while the other side is connected in series with the scan solenoid contacts SC108 and the lead 1070 to the supply lead 1069 (FIG. 43). The contacts SC108 (FIG. 46) are incorporated in the reset circuit to prevent release of the system while the product switches 123 are in the process of scanning. Otherwise, the mechanical portion of the multiplier apparatus might be damaged in the process of transferring a product from the product switches 123 to the accounting machine.

When both the scan solenoid contacts SC108 and the contacts SP104a of the reset switch are closed to complete the circuit, the positive potential appearing on the lead 1069 (FIG. 43) is applied by way of the lead 1092 across the release relay K108. As the relay K108 is energized, the contacts K108b1 (FIG. 43) open, causing deenergization of the operate relay K101, and, with the relay K101 deenergized, the multiplying device will have returned to its ready condition.

The multiplier apparatus accomplishes a multiplication either manually or automatically. In a manual operation, the operator introduces the multiplicand and the multiplier into the multiplier apparatus, initiates the first multiplication operation, and transfers the product to the accounting machine portion of the multiplier apparatus by operating the keys provided for these purposes. In an automatic operation, the studs 413 in the selector plates 412 (FIGS. 20 and 21), located at various positions of the accounting machine carriage, assume the functions of the manually-operated keys.

In both manual and automatic operation of the multiplier apparatus, the multiplicand is set into the multiplicand switches 120, and the multiplier is set into the multiplier switches 121. When the first multiplication operation is initiated, the multiplying device multiplies whatever factors are in these switches 120 and 121 and sets the product in the product switches 123.

The control circuits of FIGS. 45 to 47 will now be further described and their operation explained in connection with a manual operation of the multiplier apparatus.

The multiplicand or factor I is first set up on the keyboard of the accounting machine, and the Left Factor key 26 is depressed, causing the contacts SC101a (FIG. 46) of the Left Factor key switch SC101 (FIG. 14) to be closed. The motor bar 15 is then depressed, and the contacts SC105b (FIG. 45) of the machine trip switch SC105 (FIG. 17) are closed. The trip solenoid L101 (FIGS. 17 and 45) will normally be energized by a circuit path extending through the contacts SC105b, the contacts SC103b (FIG. 45) of the product key switch SC103 (FIG. 14), the contacts SC106b (FIG. 45) of the lower stop switch SC106 (FIG. 20), the contacts K111a2, the contacts K101b1, and the contacts of the recorder "on-off" switch SP103. With the trip solenoid L101 energized, the interfering member 378 (FIG. 17) is removed from the clutch release mechanism, causing the clutch to be released and the operating cycle to begin.

If the trip solenoid L101 is not energized when the motor bar 15 is depressed, the interfering member 378 will not be removed from the clutch release mechanism. Under this condition, some of the preliminary mechanical steps in the operating procedure are completed, but the actual operating cycle, the turning of the main cam shaft 14 and the cam shaft 397, does not commence. When the multiplier apparatus is in this condition, it is defined as being in the partial trip condition. This partial trip condition occurs when the normally-closed contacts in the energizing circuit of the trip solenoid L101 hold the circuit open. If any of the normally-closed contacts in the trip solenoid energizing circuit are open when the motor bar 15 is depressed, the multiplier apparatus assumes the partial trip condition.

When the energizing circuit of the trip solenoid L101 is completed, the trip solenoid removes the interfering member 378 from the clutch release mechanism, so that the operating cycle can begin. As the main cam shaft 14 (FIG. 17) rotates through the 35-degree point in its cycle, the cam 384 opens the contacts SC105b (FIG. 45) of the trip switch SC105 (FIG. 17), causing the trip solenoid L101 to be deenergized. The interfering member 378 is returned to the trip mechanism, but it is not permitted to reassume its blocking position until the clutch is restored to its disengaged condition.

When the contacts SC107a (FIG. 45) of the multiplicand cam switch SC107 (FIG. 18) are closed at the 150-degree point in the cycle of the cam shaft 397 (FIG. 19) by the cam 398, the multiplicand solenoid L103 is energized. The energizing current path for the multiplicand solenoid L103 extends through the contacts SP102ac to the solenoid and then through the contacts SC107a, the contacts SC101a, the contacts SC141c of the upper stop switch SC141 (FIG. 20), and the contacts SC145b1 of the overdraft sensing switch provided in the accounting machine. The contacts SC101a are then opened at the 185-degree point in the cycle of the cam shaft 397.

The energization of the multiplicand solenoid L103 causes the multiplicand or factor I to be set in the multiplicand switches 120.

The multiplier or factor II is then set up on the keyboard of the accounting machine, and the Right Factor, Multiply key 27 is depressed, causing the contacts SC102a1 and SC102a2 (FIG. 46) of the Right Factor, Multiply key switch SC102 (FIG. 14) to be closed. The motor bar 15 is again depressed, causing the turning of the main and auxiliary cam shafts 14 and 397, as previously described.

When the contacts SC110a of the multiplier cam switch SC110 (FIG. 18) and the contacts SC111a of the check cam switch SC111 (FIG. 18) are closed at the 150-degree point in the second cycle of the cam shaft 397 (FIG. 19) by the cam 398, the multiplier solenoid L104 and the check solenoid L105 are energized. The contacts SC110a and SC111a are then opened at the 185-degree point in the second cycle of the cam shaft 397. The energization of the multiplier solenoid L104 causes the multiplier or factor II to be set in the multiplier switches 121.

As the contacts SC117a of the multiply cam switch SC117 (FIG. 18) are closed at the 150-degree point in the second cycle of the cam shaft 397 (FIG. 19) by the cam 402, the first multiplication operation is initiated. The positive potential signal from the supply lead 1069 (FIG. 43) is routed by way of the lead 1070, the contacts SC145b2 of the overdraft sensing switch provided in the accounting machine, the contacts SC141a of the upper stop switch SC141 (FIG. 20), the contacts SC102a2 of the Right Factor, Multiply key switch SC102, the contacts SC117a of the multiply cam switch SC117, and the lead 1071 to the operate relay K101 (FIG. 43). The contacts SC145b2 of the overdraft sensing switch are always closed except during the first of the two cycles of the main cam line 14 in an overdraft operation. These contacts are located on the overdraft cam line provided in the accounting machine. The contacts SC141a of the upper stop switch SC141 are closed at carriage positions where a multiplication operation is to occur.

If all the conditions imposed by the other switch contacts in the energizing circuit for the operate relay K101 are satisfied, the multiply cam switch SC117 will cause the completion of this energizing circuit at the 150-degree point in the second cycle of the cam shaft 397 and will open the energizing circuit at the 185-degree point. In this manner, the control circuits of FIGS. 45 and 46 develop the multiply signal which energizes the relay K101.

Once the operate relay K101 is energized, it causes the positive potential signal from the supply lead 1069 (FIG. 43) to be applied to the lead 1071, by which the multiply signal was applied to the operate relay K101. Then, when the contacts SC114a (FIG. 46) of the start cam switch SC114 (FIG. 18) are closed by the cam 400 (FIG. 19) at the 250-degree point in the second cycle of the cam shaft 397, this positive potential is returned as the start signal by way of the lead 1071 (FIG. 43), the contacts SC114a, and the lead 1072 to the start relay K102. The contacts SC114a will open at the 285-degree point in the second cycle of the cam shaft 397.

When the start relay K102 is energized, the multiplying device continues through the multiplication procedure until the product is in the accumulator 509. At that time, the scan solenoid L108 (FIG. 46) is energized, and its contacts SC108 transfer.

The transferred scan solenoid contacts SC108 cause the positive potential on the supply lead 1069 (FIG. 43) to be applied as the end-of-scan signal by way of the lead 1070, the contacts K114bc1, the product magnet contacts L111a1 to L111a10, the contacts K113bc1, and the lead 1082 to the scan halt relay K104 (FIG. 43). The contacts L111a1 to L111a10 are closed when all of the product magnets 242 are energized.

As the scan halt relay K104 energizes, it causes the scan solenoid L108 to be deenergized. The scan solenoid contacts SC108 return to their normal condition. The positive potential on the supply lead 1069 (FIG. 43) is then applied as a scan solenoid release signal by way of the leads 1070 and 1083 to the release relay K105. The energization of the release relay K105 causes the product magnets 242 to be deenergized.

As the product magnets are deenergized, the contacts L111b1 to L111b10 (FIG. 46) are closed. These contacts are connected in series with the normally-closed side of the scan solenoid contacts SC108, so that they cause the positive potential on the supply lead 1069 (FIG.

43) to be applied by way of the leads 1070 and 1085 to the check set-up relay K106 (FIG. 46).

Once the check set-up relay K106 is energized, the multiplying device continues the checking multiplication operation until the total in the accumulator 509 is checked against the digits of the multiplier and the product magnets 242 are again energized. At that time, the positive potential on the supply lead 1069 (FIG. 43) is applied by way of the lead 1088, the contacts K114bc1, the contacts K111a1 to L111a10, the contacts K113bc1, the lead 1082, and the contacts K107ac1 to the release relay K108 (FIG. 43). Thus, the multiplier apparatus will be released automatically at the end of the checking multiplication operation if that operation is completed successfully.

In order to transfer the product from the product switches 123 into the racks of the accounting machine, the product key 28 is depressed, causing the contacts SC103a (FIG. 46) to be closed and the contacts SC103b to be opened. The energizing current path for the magnet pull-in relays K113 and K114 will be through the contacts SC103a to these relays and then through the contacts SC146b of the carriage reverse switch provided in the accounting machine and the contacts K101b2. Then the motor bar 15 is again depressed, causing the contacts SC105b of the machine trip switch SC105 to close.

As the magnet pull-in relays K113 and K114 are energized, the contacts K113ac1 and K114ac1 are closed, and the contacts K113bc1 and K114bc1 are opened. The energizing current path for the trip solenoid L101 will be through the contacts SC105b, the contacts SC104b of the keyboard interlock switch provided in the accounting machine, the contacts K113ac1, the contacts L111a1 to L111a10, the contacts K114ac1, the contacts K111a2, the contacts K101b1, and the contacts of the recorder "on-off" switch SC103. The contacts L111a1 to L111a10 are normally closed when the product magnets 242 are eneregized as the result of the energization of the magnet pull-in relays K113 and K114.

The contacts SC104b of the keyboard interlock switch prevent the multiplier apparatus from entering an operating cycle at a carriage stop where a product is to be transferred from the product switches 123 to the accounting machine whenever one or more amount keys are depressed.

Referring now to FIGS. 38 and 47, the energization of the magnet pull-in relays K113 and K114 (FIG. 46) will cause the contacts K113ac2, K113a1, to K113a5 and K114a1 to K114a5 to be closed and the contacts K113bc2 to be opened. The positive potential appearing on the supply lead 1069 (FIG. 43) will cause the product magnets 242 to be energized. The energizing current path for the product magnets 242 will be by way of the lead 856 (FIG. 43) and the contacts K113ac2 to the product magnets and then, by way of the contacts K113a1 to K113a5, the contacts K114a1 to K114a5, and the lead 855, to the negative side of the rectifier CR101 (FIG. 43).

If the contacts L111a1 to L111a10 are not closed upon the energization of the product magnets 242 as the result of the energization of the magnet pull-in relays K113 and K114, then this indicates that one or more of the pawls 243 of the product magnets 242 are not inserted between the teeth of the stop ratchets 233 (FIG. 6). In this condition, one or more of the contacts L111a1 to L111a10 are prevented from closing. If the teeth of the stop ratchets 233 are out of alignment, then the product transfer pinions 250 cannot mate properly with the rack extensions 125 when the product is transferred to the accounting machine, and damage to the multiplier apparatus might result. If all of the teeth of the stop ratchets 233 are properly aligned, then the contacts L111a1 to L111a10 will be closed upon energization of the magnet pull-in relays K113 and K114.

With the trip solenoid L101 energized, the turning of the main and auxiliary cam shafts 14 and 397 commences. At the 10-degree point in the third cycle of the cam shaft 397, the contacts SC113a (FIG. 46) of the product cam switch SC113 (FIG. 18) are closed by the cam 401, and the product solenoid L106 and the zero stop solenoid L107 are energized. The contacts SC113a are then opened at the 300-degree point in this cycle of the cam shaft 397.

The energization of the product solenoid L106 causes the product transfer pinions 250 (FIG. 6) to move out of engagement with the stop ratchet pinions 234 on the scan shaft 99 and into engagement with the rack extensions 125. In this manner, the product is transferred to the accounting machine portion of the multiplier apparatus.

In an automatic operation, the functions of the Left Factor key 26, the Right Factor, Multiply key 27, and the Product key 28 are assumed by studs 413 in the selector plates 412 (FIG. 21).

Whenever the accounting machine carriage assumes a position at which a multiplication and/or a recording operation is to occur, the lever 449 (FIG. 20) senses the presence of the ear 415 of the selector plate 412, causing the upper stop switch contacts SC141c (FIG. 45) to transfer and the upper stop switch contacts SC141a (FIG. 46) to close. The transfer of the contacts SC141c partially completes the energizing circuit for the carriage position solenoid L102. Then, at the 180-degree point in the cycle of the cam shaft 397 (FIG. 19), the contacts SC116a (FIG. 45) of the carriage position cam switch SC116 will be closed by the cam 399, causing the carriage position solenoid L102 to be energized.

As the carriage position solenoid L102 is energized, it causes the contact selector assembly to move towards the selector plate 412, causing the studs 413 to displace the corresponding plungers 414. Then, at the 115-degree point in the cycle of the cam shaft 397, the contacts SC116a (FIG. 45) of the carriage position cam switch SC116 are opened, causing the solenoid L102 to be deenergized. With the solenoid Y102 deenergized, the displaced plungers 414 close the corresponding contacts of the carriage position switch SC141. Thus, a stud 413 in position #15 on the selector plate 412 causes the contacts SC140a4 to be closed. A stud 413 in position #14 causes the contacts SC140a3 (FIG. 46) to be closed. A stud 413 in position #18 causes the contacts SC140a1 (FIG. 46) to be closed to initiate the first multiplication operation. A stud 413 in position #18 causes the contacts SC140a2 (FIG. 45) to be closed to partially complete the energizing circuit for the recorder solenoid L110.

If a recording operation is to be accomplished, the recorder "on-off" switch SP103 (FIG. 45) will be closed to supply operating potential to the recorder input terminals 1095. Then, at the 150-degree point in the cycle of the cam shaft 397 (FIG. 19), the contacts SC112a (FIG. 45) of the recorder cam switch SC112 will be closed by the cam 398, causing the recorder solenoid L110 to be energized. With the solenoid L110 energized, the recorder switches 124 will be caused to operate, so that the information in the accounting machine racks will be transferred to them. Then, at the 250-degree point in the cycle of the cam shaft 397, a start record cam switch (not shown) will be operated by the cam 400 (FIG. 19) to cause the information in the recorder switches 124 to be transferred to the recorder. While the form of multiplier apparatus herein shown and described is admirably adapted to fulfill the objects primarily stated, it is to be understood that it is not intended to confine the invention to the one form or embodiment disclosed herein, for it is susceptible of embodiment in various forms, all coming within the spirit and scope of the invention.

What is claimed is:

1. In a multiplying device, multiplying means for effecting a multiplication; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; means for determining identity or lack of identity between the significant digits of the total in said product accumulator resulting from the two multiplications and the digits of said other factor in order; and means to cause an operation of said determining means following the second multiplication whereby the product of the first multiplication may be verified.

2. In a multiplying device, multiplying means for effecting a multiplication; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; product storage means controlled by said product accumulator for storing the product of the first multiplication; means for determining identity or lack of identity between the significant digits of the total in said product accumulator resulting from the two multiplications and the digits of said other factor in order; and means to cause an operation of said determining means following the second multiplication whereby the product of the first multiplication stored in said product storage means may be verified.

3. In a multiplying device, multiplying means for effecting a multiplication; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; product storage means controlled by said product accumulator for storing the product of the first multiplications; means for determining identity or lack of identity between the significant digits of the total in said product accumulator resulting from the two multiplications and the digits of said other factor in order; means operable to prevent readout of the product from said product storage means until said identity is established; means to cause an operation of said determining means following the second multiplication; and means controlled by said determining means upon said identity being established for terminating operation of said product readout preventing means to allow the product of the first multiplication to be read out of said product storage means.

4. In a multiplying device, multiplying means for effecting a multiplication; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; product storage means controlled by said product accumulator for storing the product of the first multiplication; means for determining identity or lack of identity between the significant digits of the total in said product accumulator resulting from the two multiplications and the digits of said other factor in order; said multiplication-causing means including means for causing said multiplying means to effect the first and second multiplications repeatedly until said identity is established; means operable to prevent readout of the product from said product storage means until said identity is established; means to cause operation of said determining means following each of the second multiplications; and means controlled by said determining means upon said identity being established for terminating operation of said product readout preventing means to allow the checked product of a first multiplication to be read out of said product storage means.

5. In a multiplying device, multiplying means for effecting a multiplication; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; means for determining identity or lack of identity between the significant digits of the total in said product accumulator resulting from the two multiplications and the digits of said other factor in order; said multiplication-causing means including means for causing said multiplying means to effect the first and second multiplications over again if said identity is not established by said determining means within a predetermined time from the start of each of said first multiplications which may be effected; means operable to prevent readout of the product from said product storage means until said identity is established; means to cause an operation of said determining means following each of said second multiplications which may be effected; and means controlled by said determining means upon said identity being established for terminating operation of said product readout preventing means to allow the checked product of a first multiplication to be read out of said product storage means.

6. In a multiplying device, factor-receiving means for receiving two factors; multiplying means for effecting a multiplication under control of said factor-receiving means; a product accumulator for accumulating the products of multiplications under control of said multiplying means; means for causing said multiplying means to effect a multiplication of two factors to cause the product thereof to be accumulated in said product accumulator; means for converting one of said factors into its ten's complement; further means for causing said multiplying means to effect a multiplication of said ten's complement of said one factor and the other of said factors to cause the total of the products of the two multiplications to be accumulated in said product accumulator; product storage means controlled by said product accumulator for storing the product of the first multiplication; means for determining identity or lack of identity between the significant digits of the total in said product accumulator resulting from the two multiplications and the digits of said other factor in order; means to cause an operation of said determining means following the second multiplications; and means controlled by said determining means upon said identity being established for reading out the product of the first multiplication from said product storage means.

7. In a multiplier apparatus, a data entry and readout machine having a plurality of settable differential actuators for performing various types of operations; electronic multiplying means for effecting a multiplication; an electronic product accumulator for accumulating the products of multiplications under control of said electronic multiplying means; means for causing said electronic multiplying means to effect a multiplication of two factors to cause the product thereof to be accumulated in said electronic product accumulator; means for converting one of said factors into its ten's complement; further means for causing said multiplying means to effect a multiplication of said ten's complement of said one factor and the other of said factors to cause the total of the products of the two multiplications to be accumulated in said electronic product accumulator; product storage means controlled by said electronic product accumulator for storing the product of the first multiplication; means for determining identity or lack of identity between the significant digits of the total in said electronic product accumulator resulting from the two multiplications and the digits of said other factor in order; means to cause an operation of said determining means following the second multiplication; and means controlled by said determining means upon said identity being established for allowing said differential actuators to be set according to the product resulting from the first multiplication stored in said product storage means.

8. In a multiplier apparatus, a data entry and readout machine having a plurality of settable differential actuators for performing various types of operations; electronic multiplying means for effecting a multiplication; an electronic product accumulator for accumulating the products of multiplications under control of said electronic multiplying means; means for causing said electronic multiplying means to effect a multiplication of two factors to cause the product thereof to be accumulated in said electronic product accumulator; means for converting one of said factors into its ten's complement; further means for causing said multiplying means to effect a multiplication of said ten's complement of said one factor and the other of said factors to cause the total of the products of the two multiplications to be accumulated in said electronic product accumulator; means for determining identity or lack of identity between the significant digits of the total in said electronic product accumulator resulting from the two multiplications and the digits of said other factor in order; product storage means controlled by said electronic product accumulator for storing the product of the first multiplication; means operable to prevent setting of said differential actuators according to the product resulting from the first multiplication until said identity is established; means to cause an operation of said determining means following the second multiplication; and means controlled by said determining means upon said identity being established for terminating operation of said preventing means to allow said differential actuators to be set according to the product resulting from the first multiplication stored in said product storage means.

9. In a multiplier apparatus, a data entry and readout machine having a plurality of settable differential actuators for performing various types of operations and means to set said differential actuators in accordance with two factors; electronic multiplying means for effecting a multiplication; an electronic product accumulator for accumulating the products of multiplications under control of said electronic multiplying means; means for causing said electronic multiplying means first to effect a multiplication of two factors to cause the product thereof to be accumulated in said electronic product accumulator, and then a multiplication of the ten's complement of one of said factors and the other of said factors to cause the total of the products of the first and second multiplications to be accumulated in said electronic product accumulator; product storage means controlled by said electronic product accumulator for storing the product of the first multiplication; a factor-receiving means including a plurality of sets of switches and a plurality of switch-closing members, one for each of said switches, with said switches adapted to be closed to register the digits of said other factor; means on said differential actuators to select the switch-closing members of said factor-receiving means corresponding to the digits of said other factor; means for causing certain switches of said factor-receiving means to be closed by said selected switch-closing members to register the digits of said other factor; a control means associated with each of said plurality of sets of switches; means for causing each of said control means to be operated when a signal representing a digit of the total in said electronic product accumulator resulting from the first and second multiplications is transmitted thereto through the closed switch of said factor-receiving means which registers the same digit; means operable to prevent setting of said differential actuators according to the product stored in said product storage means; and means controlled by operation of all of said control means for terminating operation of said preventing means to allow said differential actuators to be set according to the product resulting from the first multiplication stored in said product storage means.

10. In a multiplier apparatus, a data entry and readout machine having a plurality of settable differential actuators for performing various types of operations and means to set said differential actuators in accordance with a multiplicand and a multiplier; multiplicand and multiplier receiving means, each including a plurality of sets of switches and a plurality of switch-closing members, one for each of said switches, with said switches adapted to be closed to register the digits of said multiplicand and said multiplier; means on said differential actuators to select the switch-closing members of said multiplicand and said multiplier receiving means corresponding to the digits of said multiplicand and said multiplier; electronic multiplying means for effecting a multiplication; means for causing certain switches of said multiplicand receiving means to be closed by said selected switch-closing members to register the digits of said multiplicand; means for causing certain switches of said multiplier receiving means to be closed by said selected switch-closing members to register the digits of said multiplier; an electronic product accumulator for accumulating the products of multiplications under control of said electronic multiplying means; means for causing said electronic multiplying means first to effect a multiplication of said multiplicand and said multiplier to cause the product thereof to be accumulated in said electronic product accumulator, and then a multiplication of the ten's complement of said multiplicand and said multiplier to cause the total of the products of the first and second multiplications to be accumulated in said electronic product accumulator; product storage means controlled by said electronic product accumulator for storing the product of the first multiplication; a supplemental multiplier receiving means including a plurality of sets of switches and a plurality of switch-closing members, one for each of said switches, with said switches adapted to be closed to register the digits of said multiplier; means on said differential actuators to select the switch-closing members of said supplemental multiplier receiving means corresponding to the digits of said multiplier; means for causing certain switches of said supplemental multiplier receiving means to be closed by said selected switch-closing members to register the digits of said multiplier; a control means associated with each of said plurality of sets of switches; means for causing each of said control means to be operated when a signal representing a digit of the total in said electronic product accumulator resulting from the first and second multiplications is transmitted thereto through the closed switch of said supplemental multiplier receiving means which registers the same digit; means operable to prevent setting of said differential actuators according to the product stored in said product storage means; and means controlled by operation of all of said control means for terminating operation of said preventing means to allow said differential actuators to be set according to the product resulting from the first multiplication stored in said product storage means.

11. In a multiplier apparatus, a data entry and readout machine having a plurality of settable differential actuators for performing various types of operations and means to set said differential actuators in accordance with a multiplicand and a multiplier; multiplicand and multiplier receiving means, each including a plurality of sets of switches and a plurality of switch-closing members, one for each of said switches, with a set of switches being provided for each denominational order of a multiplicand and a multiplier, and with a switch of each of said sets of switches being adapted to be closed to register the digit of the corresponding denominational order of multiplicand and a multiplier; means on said differential actuators to select the switch-closing members of said multiplicand and said multiplier receiving means corresponding to the digits of said multiplicand and said multiplier; electronic multiplying means for effecting a multiplication; means for causing certain switches of said multiplicand receiving means to be closed by said selected switch-closing members to register the digits of said multiplicand; means for causing certain switches of said multiplier receiving means to be closed by said selected switch-closing members to register the digits of said multiplier; an electronic product accumulator for accumulating the products of multiplications under control of said electronic multiplying means; means for causing said electronic multiplying means first to effect a multiplication of said multiplicand and said multiplier to cause the product thereof to be accumulated in said electronic product accumulator, and then a multiplication of the ten's complement of said multiplicand and said multiplier to cause the total of the products of the first and second multiplications to be accumulated in said electronic product accumulator; product storage means controlled by said electronic product accumulator for storing the product of the first multiplication; a supplemental multiplier receiving means including a plurality of sets of switches and a plurality of switch-closing members, one for each of said switches, with a set of switches being provided for each denominational order of a multiplier, and with a switch of each of said sets of switches being adapted to be closed to register the digit of the corresponding denominational order of a multiplier; means on said differential actuators to select the switch-closing members of said supplemental multiplier receiving means corresponding to the digits of said multiplier; means for causing certain switches of said supplemental multiplier receiving means to be closed by said selected switch-closing members to register the digits of said multiplier; and electronic control device associated with each of said plurality of sets of switches; a solenoid associated with each of said electronic control devices and adapted to be energized under control thereof, means for causing each of said electronic control devices to be operated when a signal representing a digit of the total in said electronic product accumulator resulting from the first and second multiplications is transmitted thereto through the closed switch of said supplemental multiplier reeciving means which registers the same digit, said electronic control devices being effective when operated to cause energization of said solenoids; and means effective upon energization of all of said solenoids for allowing said differential actuators to be set according to the product resulting from the first multiplication stored in said product storage means.

12. In a multiplier apparatus, a data entry and readout machine having a plurality of settable differential actuators for performing various types of operations and means to set said differential actuators in accordance with a multiplicand and a multiplier; multiplicand and multiplier receiving means, each including a plurality of sets of switches and a plurality of switch-closing members, one for each of said switches, with a set of switches being provided for each denominational order of a multiplicand and a multiplier, and with a switch of each of said sets of switches being adapted to be closed to register the digit of the corresponding denominational order of a multiplicand and a multiplier; means on said differential actuators to select the switch-closing members of said multiplicand and said multiplier receiving means corresponding to the digits of said multiplicand and said multiplier; electronic multiplying means for effecting a multiplication; means for causing certain switches of said multiplier receiving means to be closed by said selected switch-closing members to register the digits of said multiplier; an electronic product accumulator for accumulating the products of multiplications under control of said electronic multiplying means; means for causing said electronic multiplying means first to effect a multiplication of said multiplicand and said multiplier to cause the product thereof to be accumulated in said electronic product accumulator, and then a multiplication of the ten's complement of said multiplicand and said multiplier to cause the total of the products of the first and second multiplications to be accumulated in said electronic product accumulator; product storage means controlled by said electronic product accumulator for storing the product of the first multiplication; a supplemental multiplier receiving means including a plurality of sets of switches and a plurality of switch-closing members, one for each of said switches, with a set of switches being provided for each denominational order of a multiplier, and with a switch of each of said sets of switches being adapted to be closed to register the digit of the corresponding denominational order of a multiplier; means on said differential actuators to select the switch-closing members of said supplemental multiplier receiving means corresponding to the digits of said multiplier; means for causing certain switches of said supplemental multiplier receiving means to be closed by said selected switch-closing members to register the digits of said multiplier; an electronic control device associated with each of said plurality of sets of switches; a solenoid associated with each of said electronic control devices adapted to be energized under control thereof; means for causing each of said electronic control devices to be operated when a signal representing a digit of the total in said electronic product accumulator resulting from the first and second multiplications is transmitted thereto through the closed switch of said supplemental multiplier receiving means which registers the same digit, said electronic control devices being effective when operated to cause energization of said solenoids; means operable to prevent setting of said differential actuators according to the product stored in said product storage means; and means controlled by energization of all of said solenoids for terminating operation of said preventing means to allow said differential actuators to be set according to the product resulting from the first multiplication stored in said product storage means.

13. In a multiplier apparatus, a data entry and readout machine having a plurality of settable differential actuators for performing various types of operations and means to set said differential actuators in accordance with a multiplicand and a multiplier; multiplicand and multiplier receiving means each including a plurality of sets of switches and a plurality of switch-closing members, one for each of said switches, with said switches adapted to be closed to register the digits of said multiplicand and said multiplier; means on said differential actuators to select the switch-closing members of said multiplicand and said multiplier receiving means corresponding to the digits of said multiplicand and said multiplier; electronic multiplying means for effecting a multiplication; a cyclically operable sequence control means for controlling the sequence of operation of the multiplier apparatus; means controlled by said sequence control means during a cycle of operation thereof for causing certain switches of said multiplicand receiving means to be closed by said selected switch-closing members to register the digits of said multiplicand; means controlled by said sequence control means during a cycle of operation thereof for causing certain switches of said multiplier receiving means to be closed by said selected switch-closing members to register the digits of said multiplier; an electronic product accumulator for accumulating the products of multiplications under control of said multiplying means; means controlled by said sequence control means during a cycle of operation thereof for causing said electronic multiplying means to effect first a multiplication of said multiplicand and said multiplier under control of said multiplicand and said multiplier receiving means to cause the product thereof to be accumulated in said electronic product accumulator, and then a multiplication of the ten's complement of said multiplicand and said multiplier to cause the total of the products of the first and second multiplications to be accumulated in said electronic product accumulator; product storage means controlled by said electronic product accumulator for storing the product of the first multiplication; a supplemental multiplier receiving means including a plurality of sets of switches and a plurality of switch-closing members, one for each of said switches, with said switches adapted to be closed to register the digits of said multiplier; means on said differential actuators to select the switch-closing members of said supplemental multiplier receiving means corresponding to the digits of said multiplier; means controlled by said sequence control means during the cycle of operation thereof when the switches of said multiplier receiving means are closed for causing the certain switches of said supplemental multiplier receiving means to be closed by said selected switch-closing members to register the digits of said multiplier; a control device associated with each of said plurality of sets of switches; a solenoid associated with each of said control devices adapted to be energized under the control thereof; means for causing each of said control devices to be operated when a signal representing a digit of the total in said electronic product accumulator resulting from the first and second multiplications is transmitted thereto through the closed switch of said supplemental multiplier receiving means which registers the same digit, said control devices being effective when operated to cause energization of said solenoids; means for preventing a further cycle of operation of said sequence control means unless all of said solenoids are energized following the second multiplication; means effective upon energization of all of said solenoids following the second multiplication for overcoming the effect of said preventing means to allow said further cycle of operation of said sequence control means; and means controlled by said sequence control means during said further cycle of operation thereof for causing said differential actuators to be set according to the product stored in said product storage means.

14. In a multiplier apparatus, a data entry and readout machine having a plurality of settable differential actuators for performing various types of operations and means to set differential actuators in accordance with a multiplicand and a multiplier; multiplicand and multiplier receiving means each including a plurality of sets of switches, a shiftable frame, and a plurality of switch-closing members, one for each of said switches, displaceably mounted in said frame; means on the differential actuators to select the switch-closing members corresponding to the digits of said multiplicand and said multiplier; electronic multiplying means for effecting a multiplication; a cyclically-operable sequence control means for controlling the sequence of operation of the multiplier apparatus; means controlled by said sequence control means during a cycle of operation thereof for shifting said frame of said multiplicand receiving means to cause the selected switch-closing members first to engage the means on the differential actuators to be displaced thereby and thereafter to close said switches to register the digits of said multiplicand; means controlled by said sequence control means during a cycle of operation thereof for shifting said frame of said multiplier receiving means to cause the selected switch-closing members first to engage the means on the differential actuators to be displaced thereby and thereafter to close said switches to register the digits of said multiplier; an electronic product accumulator for accumulating the products of multiplications under control of said multiplying means; means controlled by said sequence control means during a cycle of operation thereof for causing said electronic multiplying means to effect first a multiplication of said multiplicand and said multiplier under control of said multiplicand and said multiplier receiving means to cause the product thereof to be accumulated in said electronic product accumulator, and then a multiplication of the ten's complement of said multiplicand and said multiplier to cause the total of the products of the first and second multiplications to be accumulated in said electronic product accumulator; product storage means controlled by said electronic product accumulator for storing the product of the first multiplication; a supplemental multiplier receiving means including a plurality of sets of switches, a shiftable frame, and a plurality of switch-closing members, one for each of said switches, displaceably mounted in said frame; means on said differential actuators to select the switch-closing members corresponding to the digits of said multiplier; means controlled by said sequence control means during the cycle of operation thereof when the switches of said multiplier receiving means are closed for shifting said frame of said supplemental receiving means to cause the selected switch-closing members first to engage the means on the differential actuators to be displaced thereby and thereafter to close said switches to register the digits of said multiplier; a control device associated with each of said plurality of sets of switches; a solenoid associated with each of said control devices adapted to be energized under the control thereof; means for causing each of said control devices to be operated when a signal representing a digit of the total in said electronic product accumulator resulting from the first and second multiplication is transmitted thereto through the closed switch of said supplemental multiplier receiving means which registers the same digit, said control devices being effective when operated to cause energization of said solenoids; means for preventing a further cycle of operation of said sequence control means unless all of said solenoids are energized following the second multiplication; means effective upon energization of all of said solenoids following the second multiplication for overcoming the effect of said preventing means to allow said further cycle of operation of said sequence control means; and means controlled by said sequence control means during said further cycle of operation thereof for causing said differential actuators to be set according to the product stored in said product storage means.

15. In a multiplying device,
multiplying means for effecting a multiplication;
a product accumulator for accumulating the products of multiplications under control of said multiplying means;
means for causing said multiplying means to effect a multiplication of two factors expressed to a given radix $n$ to cause the product thereof to be accumulated in said product accumulator;
means for converting one of said factors into its complement, mod $n^x$, where $x$ is the number of digits to the left of the radix point of said one factor;
further means for causing said multiplying means to effect a multiplication of said complement of said one factor and the other of said factors to cause the total of the products of the two multiplications to be accumulated in said product accumulator;
and means for determining whether the total of the products of the two multiplications is equal to $n^x$ times said other factor.

16. In a multiplying device,
multiplying means for effecting a multiplication;
a product accumulator for accumulating the products of multiplications under control of said multiplying means;
means for causing said multiplying means to effect a multiplication of two factors expressed to a given radix $n$ to cause the product thereof to be accumulated in said product accumulator;
means for converting one of said factors into its complement, mod $n^x$, where $x$ is the number of digits to the left of the radix point of said one factor;
further means for causing said multiplying means to effect a multiplication of said complement of said one factor and the other of said factors to cause the total of the products of the two multiplications to be accumulated in said product accumulator;
product storage means controlled by said product accumulator for storing the product of the first multiplication;
and means for determining whether the total of the products of the two multiplications is equal to $n^x$ times said other factor whereby the product of the first multiplication stored in said product storage means may be verified.

References Cited in the file of this patent
UNITED STATES PATENTS
2,789,759     Tootill et al. _____ Apr. 23, 1957

OTHER REFERENCES

Alt: Electronic Digital Computers, Academic Press Inc., New York (copyright 1958—pages 153–160).